(12) United States Patent
Kohn et al.

(10) Patent No.: US 7,216,004 B2
(45) Date of Patent: May 8, 2007

(54) METHOD AND SYSTEM FOR OPTIMIZATION OF GENERAL PROBLEMS

(75) Inventors: Wolf Kohn, Seattle, WA (US); Vladimir Brayman, Mercer Island, WA (US)

(73) Assignee: Clearsight Systems Inc., Bellevue, WA (US)

( * ) Notice: Subject to any disclaimer, the term of this patent is extended or adjusted under 35 U.S.C. 154(b) by 0 days.

(21) Appl. No.: 11/375,968

(22) Filed: Mar. 15, 2006

(65) Prior Publication Data

US 2006/0173661 A1 Aug. 3, 2006

Related U.S. Application Data

(63) Continuation of application No. 10/745,394, filed on Dec. 23, 2003, now Pat. No. 7,072,723, which is a continuation-in-part of application No. 10/693,729, filed on Oct. 23, 2003.

(60) Provisional application No. 60/420,921, filed on Oct. 23, 2002, provisional application No. 60/420,922, filed on Oct. 23, 2002.

(51) Int. Cl.
*G05B 13/02* (2006.01)

(52) U.S. Cl. ........................................... 700/28

(58) Field of Classification Search ............ 700/28, 700/29, 30, 31, 32, 33, 34
See application file for complete search history.

(56) References Cited

U.S. PATENT DOCUMENTS

| | | | | |
|---|---|---|---|---|
| 5,471,408 A * | 11/1995 | Takamoto et al. | ............ | 703/2 |
| 6,076,030 A * | 6/2000 | Rowe | ................... | 701/50 |
| 6,490,572 B2 * | 12/2002 | Akkiraju et al. | ............ | 706/19 |
| 6,606,529 B1 * | 8/2003 | Crowder et al. | ........... | 700/100 |
| 6,826,549 B1 * | 11/2004 | Marks et al. | ................. | 706/11 |
| 2003/0130970 A1 * | 7/2003 | Walster et al. | ............. | 706/19 |
| 2003/0220772 A1 * | 11/2003 | Chiang et al. | ................ | 703/2 |
| 2004/0101083 A1 * | 5/2004 | Russell et al. | ............ | 376/256 |
| 2004/0122317 A1 * | 6/2004 | Heim | ........................ | 600/437 |
| 2004/0257026 A1 * | 12/2004 | Rogers et al. | ............ | 318/696 |
| 2004/0267395 A1 * | 12/2004 | Discenzo et al. | ............ | 700/99 |

OTHER PUBLICATIONS

"Local Search in combinational optimization" Edited by E. Aarts and J.K. Lenstra, Wiley 1997.*

H.D. Chiang and L. Fekih-Ahmed, "Quasistability Regions of Nonlinear Dynamical Systems: Theory", IEEE Trans. on cirucits and Systems: I Fundametal Theroy and Applications, vol. CAS-43, Aug. 1996, pp. 627-635.*

(Continued)

*Primary Examiner*—Leo Picard
*Assistant Examiner*—Chad Rapp
(74) *Attorney, Agent, or Firm*—Olympic Patent Works PLLC

(57) ABSTRACT

Embodiments of the disclosed invention include optimization methods and systems that receive a mathematical description of a system, in symbolic form, that includes decision variables of various types, including real-number-valued, integer-valued, and Boolean-valued decision variables, and that may also include a variety of constraints on the values of the decision variables, including inequality and equality constraints. The objective function and constraints are incorporated into a global objective function. The global objective function is transformed into a system of differential equations in terms of continuous variables and parameters, so that polynomial-time methods for solving differential equations can be applied to calculate near-optimal solutions for the global objective function.

1 Claim, 60 Drawing Sheets

OTHER PUBLICATIONS

Hsiao-Dong Chiang and Chia-Chi Chu, :A Systematic Search Method for Obtaining Multiple Local Optimal Solutions of Non-linear Programming Problems, IEEE Trans. on Cirucits and Systems: I Fundametal Theroy and Applications, vol. 43, No. 2, Feb. 1996, pp. 99-109.*

H.D. Chiang, M Hirsch and F.F> Wu, "Stability Regions of Non-linear Autonomous Dynamical Systems", IEEE Trans. On Automatic Control vol. AC-33, Jan. 1988, pp. 16-27.*

* cited by examiner

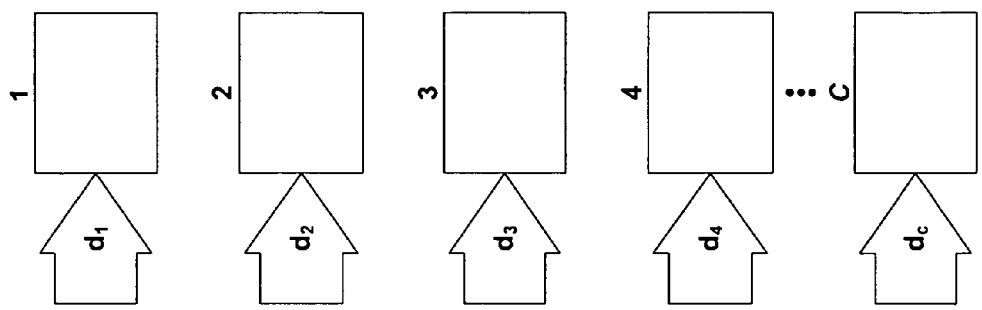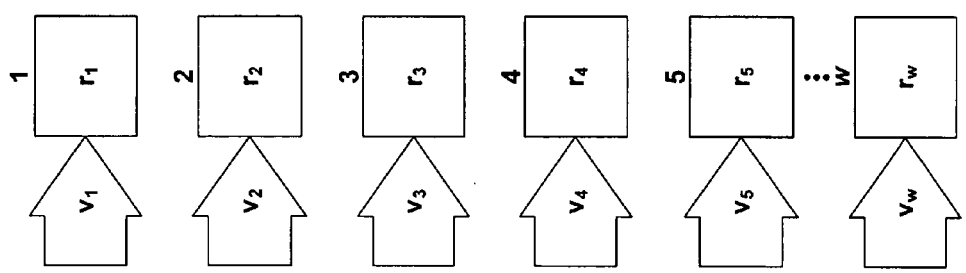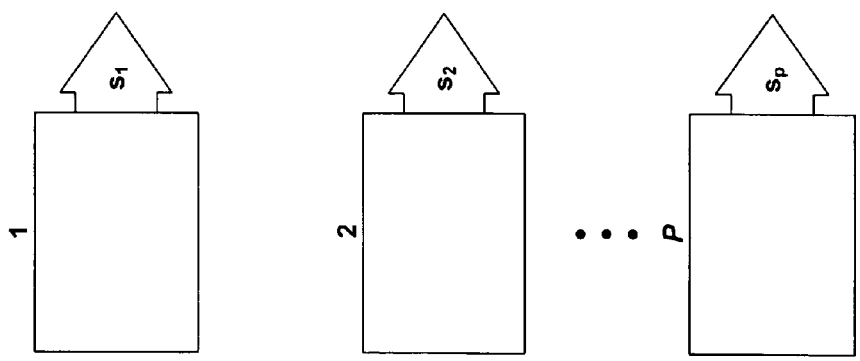
Figure 6

$$\text{minimize } C(\mathbf{x},\mathbf{b}) = \begin{cases} 9*1550x_{11}^{pw} + 10*1550x_{12}^{pw} + 3*1550x_{13}^{pw} + \\ 2*2050x_{21}^{pw} + 5*2050x_{22}^{pw} + 7*2050x_{23}^{pw} + \\ 4*200x_{11}^{wc} + 9*700x_{12}^{wc} + 9*550x_{12}^{wc} + 4*500x_{14}^{wc} + 4*500x_{15}^{wc} + \\ 2*200x_{21}^{wc} + 10*700x_{22}^{wc} + 7*550x_{23}^{wc} + 3*500x_{24}^{wc} + 5*500x_{25}^{wc} + \\ 7*200x_{31}^{wc} + 2*700x_{32}^{wc} + 1*550x_{33}^{wc} + 3*500x_{34}^{wc} + 4*500x_{35}^{wc} + \\ 8b_1 + 10b_2 + 9b_3 \end{cases}$$

↘ 902 subject to $$\left. \begin{array}{l} x_{11}^{pw} + x_{12}^{pw} + x_{13}^{pw} \le 1 \\ x_{21}^{pw} + x_{22}^{pw} + x_{23}^{pw} \le 1 \end{array} \right\} 904$$

$$\left. \begin{array}{l} x_{11}^{wc} + x_{21}^{wc} + x_{31}^{wc} = 1 \\ x_{12}^{wc} + x_{22}^{wc} + x_{32}^{wc} = 1 \\ x_{13}^{wc} + x_{23}^{wc} + x_{33}^{wc} = 1 \\ x_{14}^{wc} + x_{24}^{wc} + x_{34}^{wc} = 1 \\ x_{15}^{wc} + x_{25}^{wc} + x_{35}^{wc} = 1 \end{array} \right\} 906$$

$$\left. \begin{array}{l} 1550x_{11}^{pw} + 2050x_{21}^{pw} \ge 200x_{11}^{wc} + 700x_{12}^{wc} + 550x_{13}^{wc} + 500x_{14}^{wc} + 500x_{15}^{wc} \\ 1550x_{12}^{pw} + 2050x_{22}^{pw} \ge 200x_{21}^{wc} + 700x_{22}^{wc} + 550x_{23}^{wc} + 500x_{24}^{wc} + 500x_{25}^{wc} \\ 1550x_{13}^{pw} + 2050x_{23}^{pw} \ge 200x_{31}^{wc} + 700x_{32}^{wc} + 550x_{33}^{wc} + 500x_{34}^{wc} + 500x_{35}^{wc} \end{array} \right\} 908$$

$$\left. \begin{array}{l} x_{11}^{wc}, x_{12}^{wc}, x_{13}^{wc}, x_{14}^{wc}, x_{15}^{wc} \le b_1 \\ x_{21}^{wc}, x_{22}^{wc}, x_{23}^{wc}, x_{24}^{wc}, x_{25}^{wc} \le b_2 \\ x_{31}^{wc}, x_{32}^{wc}, x_{33}^{wc}, x_{34}^{wc}, x_{35}^{wc} \le b_3 \end{array} \right\} 910$$

$$b_1 + b_2 + b_3 \le 2 \quad \text{— 912}$$

914 ⟋ $x_{ij}^{pw}, x_{jk}^{wc} \ge 0$

916 ⟋ $b_1, b_2, b_3 \in \{0,1\}$ — b's are Boolean

Figure 9

$b_i(1-b_i) = 0$ and $0 \leq b_i \leq 1$ $$\underset{x,b}{\text{minimize}} \ C(\mathbf{x},\mathbf{b}) = \begin{cases} 13950x_{11}^{pw} + 15500x_{12}^{pw} + 4650x_{13}^{pw} + \\ 4100x_{21}^{pw} + 10250x_{22}^{pw} + 14350x_{23}^{pw} + \\ 800x_{11}^{wc} + 6300x_{12}^{wc} + 4950x_{13}^{wc} + 2000x_{14}^{wc} + 2000x_{15}^{wc} + \\ 400x_{21}^{wc} + 7000x_{22}^{wc} + 3850x_{23}^{wc} + 1500x_{24}^{wc} + 2500x_{25}^{wc} + \\ 1400x_{31}^{wc} + 1400x_{32}^{wc} + 550x_{33}^{wc} + 1500x_{34}^{wc} + 2000x_{35}^{wc} + \\ 8b_1 + 10b_2 + 9b_3 \end{cases}$$

subject to $-x_{11}^{pw} - x_{12}^{pw} - x_{13}^{pw} + 1 \geq 0$ $-x_{21}^{pw} - x_{22}^{pw} - x_{23}^{pw} + 1 \geq 0$ $1550x_{11}^{pw} + 2050x_{21}^{pw} - (200x_{11}^{wc} + 700x_{12}^{wc} + 550x_{13}^{wc} + 500x_{14}^{wc} + 500x_{15}^{wc}) \geq 0$ $1550x_{12}^{pw} + 2050x_{22}^{pw} - (200x_{21}^{wc} + 700x_{22}^{wc} + 550x_{23}^{wc} + 500x_{24}^{wc} + 500x_{25}^{wc}) \geq 0$ $1550x_{13}^{pw} + 2050x_{23}^{pw} - (200x_{31}^{wc} + 700x_{32}^{wc} + 550x_{33}^{wc} + 500x_{34}^{wc} + 500x_{35}^{wc}) \geq 0$ $b_1 - x_{11}^{wc} \geq 0$ $b_1 - x_{12}^{wc} \geq 0$ $b_1 - x_{13}^{wc} \geq 0$ $b_1 - x_{14}^{wc} \geq 0$ $b_1 - x_{15}^{wc} \geq 0$ $b_2 - x_{21}^{wc} \geq 0$ $b_2 - x_{22}^{wc} \geq 0$ $b_2 - x_{23}^{wc} \geq 0$ $b_2 - x_{24}^{wc} \geq 0$ $b_2 - x_{25}^{wc} \geq 0$ $b_3 - x_{31}^{wc} \geq 0$ $b_3 - x_{32}^{wc} \geq 0$ $b_3 - x_{33}^{wc} \geq 0$ $b_3 - x_{34}^{wc} \geq 0$ $b_3 - x_{35}^{wc} \geq 0$ $-b_1 - b_2 - b_3 + 2 \geq 0$ $x_{11}^{wc} + x_{21}^{wc} + x_{31}^{wc} - 1 = 0$ $x_{12}^{wc} + x_{22}^{wc} + x_{32}^{wc} - 1 = 0$ $x_{13}^{wc} + x_{23}^{wc} + x_{33}^{wc} - 1 = 0$ $x_{14}^{wc} + x_{24}^{wc} + x_{34}^{wc} - 1 = 0$ $x_{15}^{wc} + x_{25}^{wc} + x_{35}^{wc} - 1 = 0$ $b_1(1 - b_1) = 0$ $b_2(1 - b_2) = 0$ $b_3(1 - b_3) = 0$ $0 \leq b_1, b_2, b_3 \leq 1$ $x_{ij}^{pw}, x_{jk}^{wc} \geq 0$

Figure 10

$$\underset{\mathbf{x},\mathbf{b}}{\text{minimize}} \quad C(\mathbf{x},\mathbf{b}) = \begin{cases} 13950x_{11}^{pw} + 15500x_{12}^{pw} + 4650x_{13}^{pw} + \\ 4100x_{21}^{pw} + 10250x_{22}^{pw} + 14350x_{23}^{pw} + \\ 800x_{11}^{wc} + 6300x_{12}^{wc} + 4950x_{12}^{wc} + 2000x_{14}^{wc} + 2000x_{15}^{wc} + \\ 400x_{21}^{wc} + 7000x_{22}^{wc} + 3850x_{23}^{wc} + 1500x_{24}^{wc} + 2500x_{25}^{wc} + \\ 1400x_{31}^{wc} + 1400x_{32}^{wc} + 550x_{33}^{wc} + 1500x_{34}^{wc} + 2000x_{35}^{wc} + \\ 8b_1 + 10b_2 + 9b_3 \end{cases}$$

subject to $-x_{11}^{pw} - x_{12}^{pw} - x_{13}^{pw} + 1 \geq 0$ $-x_{21}^{pw} - x_{22}^{pw} - x_{23}^{pw} + 1 \geq 0$ $1550x_{11}^{pw} + 2050x_{21}^{pw} - \left(200x_{11}^{wc} + 700x_{12}^{wc} + 550x_{13}^{wc} + 500x_{14}^{wc} + 500x_{15}^{wc}\right) \geq 0$ $1550x_{12}^{pw} + 2050x_{22}^{pw} - \left(200x_{21}^{wc} + 700x_{22}^{wc} + 550x_{23}^{wc} + 500x_{24}^{wc} + 500x_{25}^{wc}\right) \geq 0$ $1550x_{13}^{pw} + 2050x_{23}^{pw} - \left(200x_{31}^{wc} + 700x_{32}^{wc} + 550x_{33}^{wc} + 500x_{34}^{wc} + 500x_{35}^{wc}\right) \geq 0$ $b_1 - x_{11}^{wc} \geq 0$ $b_1 - x_{12}^{wc} \geq 0$ $b_1 - x_{13}^{wc} \geq 0$ $b_1 - x_{14}^{wc} \geq 0$ $b_1 - x_{15}^{wc} \geq 0$ $b_2 - x_{21}^{wc} \geq 0$ $b_2 - x_{22}^{wc} \geq 0$ $b_2 - x_{23}^{wc} \geq 0$ $b_2 - x_{24}^{wc} \geq 0$ $b_2 - x_{25}^{wc} \geq 0$ $b_3 - x_{31}^{wc} \geq 0$ $b_3 - x_{32}^{wc} \geq 0$ $b_3 - x_{33}^{wc} \geq 0$ $b_3 - x_{34}^{wc} \geq 0$ $b_3 - x_{35}^{wc} \geq 0$ $-b_1 - b_2 - b_3 + 2 \geq 0$ $x_{11}^{wc} + x_{21}^{wc} + x_{31}^{wc} - 1 = 0$ $x_{12}^{wc} + x_{22}^{wc} + x_{32}^{wc} - 1 = 0$ $x_{13}^{wc} + x_{23}^{wc} + x_{33}^{wc} - 1 = 0$ $x_{14}^{wc} + x_{24}^{wc} + x_{34}^{wc} - 1 = 0$ $x_{15}^{wc} + x_{25}^{wc} + x_{35}^{wc} - 1 = 0$ $x_{ij}^{pw}, x_{jk}^{wc} \geq 0$ $b_1, b_2, b_3 \in \{0,1\}$

Figure 11

$$\underset{x,b,s}{\operatorname{minimize}} \quad \tilde{C}(x,b,s,r) = \begin{pmatrix} 13950 x_{11}^{pw} + 15500 x_{12}^{pw} + 4650 x_{13}^{pw} + \\ 4100 x_{21}^{pw} + 10250 x_{22}^{pw} + 14350 x_{23}^{pw} + \\ 800 x_{11}^{wc} + 6300 x_{12}^{wc} + 4950 x_{13}^{wc} + 2000 x_{14}^{wc} + 2000 x_{15}^{wc} + \\ 400 x_{21}^{wc} + 7000 x_{22}^{wc} + 3850 x_{23}^{wc} + 1500 x_{24}^{wc} + 2500 x_{25}^{wc} + \\ 1400 x_{31}^{wc} + 1400 x_{32}^{wc} + 550 x_{33}^{wc} + 1500 x_{34}^{wc} + 2000 x_{35}^{wc} + \\ 8 b_1 + 10 b_2 + 9 b_3 + \\ r_1 s_1 + r_2 s_2 + r_3 s_3 + r_4 s_4 + r_5 s_5 + r_6 s_6 + r_7 s_7 + r_8 s_8 \end{pmatrix}$$

subject to $-x_{11}^{pw} - x_{12}^{pw} - x_{13}^{pw} + 1 \geq 0$ $-x_{21}^{pw} - x_{22}^{pw} - x_{23}^{pw} + 1 \geq 0$ $1550 x_{11}^{pw} + 2050 x_{21}^{pw} - (200 x_{11}^{wc} + 700 x_{12}^{wc} + 550 x_{13}^{wc} + 500 x_{14}^{wc} + 500 x_{15}^{wc}) \geq 0$ $1550 x_{12}^{pw} + 2050 x_{22}^{pw} - (200 x_{21}^{wc} + 700 x_{22}^{wc} + 550 x_{23}^{wc} + 500 x_{24}^{wc} + 500 x_{25}^{wc}) \geq 0$ $1550 x_{13}^{pw} + 2050 x_{23}^{pw} - (200 x_{31}^{wc} + 700 x_{32}^{wc} + 550 x_{33}^{wc} + 500 x_{34}^{wc} + 500 x_{35}^{wc}) \geq 0$ $b_1 - x_{11}^{wc} \geq 0$ $b_1 - x_{12}^{wc} \geq 0$ $b_1 - x_{13}^{wc} \geq 0$ $b_1 - x_{14}^{wc} \geq 0$ $b_1 - x_{15}^{wc} \geq 0$ $b_2 - x_{21}^{wc} \geq 0$ $b_2 - x_{22}^{wc} \geq 0$ $b_2 - x_{23}^{wc} \geq 0$ $b_2 - x_{24}^{wc} \geq 0$ $b_2 - x_{25}^{wc} \geq 0$ $b_3 - x_{31}^{wc} \geq 0$ $b_3 - x_{32}^{wc} \geq 0$ $b_3 - x_{33}^{wc} \geq 0$ $b_3 - x_{34}^{wc} \geq 0$ $b_3 - x_{35}^{wc} \geq 0$ $-b_1 - b_2 - b_3 + 2 \geq 0$ $s_1 + x_{11}^{wc} + x_{21}^{wc} + x_{31}^{wc} - 1 \geq 0$ $s_2 + x_{12}^{wc} + x_{22}^{wc} + x_{32}^{wc} - 1 \geq 0$ $s_3 + x_{13}^{wc} + x_{23}^{wc} + x_{33}^{wc} - 1 \geq 0$ $s_4 + x_{14}^{wc} + x_{24}^{wc} + x_{34}^{wc} - 1 \geq 0$ $s_5 + x_{15}^{wc} + x_{25}^{wc} + x_{35}^{wc} - 1 \geq 0$ $s_1 - (x_{11}^{wc} + x_{21}^{wc} + x_{31}^{wc} - 1) \geq 0$ $s_2 - (x_{12}^{wc} + x_{22}^{wc} + x_{32}^{wc} - 1) \geq 0$ $s_3 - (x_{13}^{wc} + x_{23}^{wc} + x_{33}^{wc} - 1) \geq 0$ $s_4 - (x_{14}^{wc} + x_{24}^{wc} + x_{34}^{wc} - 1) \geq 0$ $s_5 - (x_{15}^{wc} + x_{25}^{wc} + x_{35}^{wc} - 1) \geq 0$ $s_6 - b_1(1 - b_1) \geq 0$ $s_7 - b_2(1 - b_2) \geq 0$ $s_8 - b_3(1 - b_3) \geq 0$ $b_1 \geq 0$ $b_2 \geq 0$ $b_3 \geq 0$ $1 - b_1 \geq 0$ $1 - b_2 \geq 0$ $1 - b_3 \geq 0$ $x_{ij}^{pw}, x_{jk}^{wc}, s_i \geq 0$

Figure 13

$$\underset{x,b,s,z}{\text{minimize}}\ z$$

subject to $-x_{11}^{pw} - x_{12}^{pw} - x_{13}^{pw} + 1 \geq 0$ $-x_{21}^{pw} - x_{22}^{pw} - x_{23}^{pw} + 1 \geq 0$ $1550 x_{11}^{pw} + 2050 x_{21}^{pw} - \left(200 x_{11}^{wc} + 700 x_{12}^{wc} + 550 x_{13}^{wc} + 500 x_{14}^{wc} + 500 x_{15}^{wc}\right) \geq 0$ $1550 x_{12}^{pw} + 2050 x_{22}^{pw} - \left(200 x_{21}^{wc} + 700 x_{22}^{wc} + 550 x_{23}^{wc} + 500 x_{24}^{wc} + 500 x_{25}^{wc}\right) \geq 0$ $1550 x_{13}^{pw} + 2050 x_{23}^{pw} - \left(200 x_{31}^{wc} + 700 x_{32}^{wc} + 550 x_{33}^{wc} + 500 x_{34}^{wc} + 500 x_{35}^{wc}\right) \geq 0$ $b_1 - x_{11}^{wc} \geq 0$ $b_1 - x_{12}^{wc} \geq 0$ $b_1 - x_{13}^{wc} \geq 0$ $b_1 - x_{14}^{wc} \geq 0$ $b_1 - x_{15}^{wc} \geq 0$ $b_2 - x_{21}^{wc} \geq 0$ $b_2 - x_{22}^{wc} \geq 0$ $b_2 - x_{23}^{wc} \geq 0$ $b_2 - x_{24}^{wc} \geq 0$ $b_2 - x_{25}^{wc} \geq 0$ $b_3 - x_{31}^{wc} \geq 0$ $b_3 - x_{32}^{wc} \geq 0$ $b_3 - x_{33}^{wc} \geq 0$ $b_3 - x_{34}^{wc} \geq 0$ $b_3 - x_{35}^{wc} \geq 0$ $-b_1 - b_2 - b_3 + 2 \geq 0$ $s_1 + x_{11}^{wc} + x_{21}^{wc} + x_{31}^{wc} - 1 \geq 0$ $s_2 + x_{12}^{wc} + x_{22}^{wc} + x_{32}^{wc} - 1 \geq 0$ $s_3 + x_{13}^{wc} + x_{23}^{wc} + x_{33}^{wc} - 1 \geq 0$ $s_4 + x_{14}^{wc} + x_{24}^{wc} + x_{34}^{wc} - 1 \geq 0$ $s_5 + x_{15}^{wc} + x_{25}^{wc} + x_{35}^{wc} - 1 \geq 0$ $s_1 - \left(x_{11}^{wc} + x_{21}^{wc} + x_{31}^{wc} - 1\right) \geq 0$ $s_2 - \left(x_{12}^{wc} + x_{22}^{wc} + x_{32}^{wc} - 1\right) \geq 0$ $s_3 - \left(x_{13}^{wc} + x_{23}^{wc} + x_{33}^{wc} - 1\right) \geq 0$ $s_4 - \left(x_{14}^{wc} + x_{24}^{wc} + x_{34}^{wc} - 1\right) \geq 0$ $s_5 - \left(x_{15}^{wc} + x_{25}^{wc} + x_{35}^{wc} - 1\right) \geq 0$ $s_6 - b_1(1 - b_1) \geq 0$ $s_7 - b_2(1 - b_2) \geq 0$ $s_8 - b_3(1 - b_3) \geq 0$ $b_1 \geq 0$ $b_2 \geq 0$ $b_3 \geq 0$ $1 - b_1 \geq 0$ $1 - b_2 \geq 0$ $1 - b_3 \geq 0$ $x_{ij}^{pw}, x_{jk}^{wc}, s_i \geq 0$ $z - \bar{C}(x,b,s,r) \geq 0$

Figure 15

$$\underset{x,b,s,z}{\text{minimize}} \quad F(\mathbf{x}, \mathbf{b}, \mathbf{s}, \mathbf{r}, z, \mathbf{u}) =$$

$$z -$$

$$u_1 \ln\left(-x_{11}^{pw} - x_{12}^{pw} - x_{13}^{pw} + 1\right) -$$

$$u_2 \ln\left(-x_{21}^{pw} - x_{22}^{pw} - x_{23}^{pw} + 1\right) -$$

$$u_3 \ln\left(1550 x_{11}^{pw} + 2050 x_{21}^{pw} - \left(200 x_{11}^{wc} + 700 x_{12}^{wc} + 550 x_{13}^{wc} + 500 x_{14}^{wc} + 500 x_{15}^{wc}\right)\right) -$$

$$u_4 \ln\left(1550 x_{12}^{pw} + 2050 x_{22}^{pw} - \left(200 x_{21}^{wc} + 700 x_{22}^{wc} + 550 x_{23}^{wc} + 500 x_{24}^{wc} + 500 x_{25}^{wc}\right)\right) -$$

$$u_5 \ln\left(1550 x_{13}^{pw} + 2050 x_{23}^{pw} - \left(200 x_{31}^{wc} + 700 x_{32}^{wc} + 550 x_{33}^{wc} + 500 x_{34}^{wc} + 500 x_{35}^{wc}\right)\right) -$$

$$u_6 \ln\left(b_1 - x_{11}^{wc}\right) - u_7 \ln\left(b_1 - x_{12}^{wc}\right) - u_8 \ln\left(b_1 - x_{13}^{wc}\right) - u_9 \ln\left(b_1 - x_{14}^{wc}\right) - u_{10} \ln\left(b_1 - x_{15}^{wc}\right) -$$

$$u_{11} \ln\left(b_2 - x_{21}^{wc}\right) - u_{12} \ln\left(b_2 - x_{22}^{wc}\right) - u_{13} \ln\left(b_2 - x_{23}^{wc}\right) - u_{14} \ln\left(b_2 - x_{24}^{wc}\right) - u_{15} \ln\left(b_2 - x_{25}^{wc}\right) -$$

$$u_{16} \ln\left(b_3 - x_{31}^{wc}\right) - u_{17} \ln\left(b_3 - x_{32}^{wc}\right) - u_{18} \ln\left(b_3 - x_{33}^{wc}\right) - u_{19} \ln\left(b_3 - x_{34}^{wc}\right) - u_{20} \ln\left(b_3 - x_{35}^{wc}\right) -$$

$$u_{21} \ln\left(-b_1 - b_2 - b_3 + 2\right) -$$

$$u_{22} \ln\left(s_1 + x_{11}^{wc} + x_{21}^{wc} + x_{31}^{wc} - 1\right) - u_{23} \ln\left(s_2 + x_{12}^{wc} + x_{22}^{wc} + x_{32}^{wc} - 1\right) -$$

$$u_{24} \ln\left(s_3 + x_{13}^{wc} + x_{23}^{wc} + x_{33}^{wc} - 1\right) - u_{25} \ln\left(s_4 + x_{14}^{wc} + x_{24}^{wc} + x_{34}^{wc} - 1\right) -$$

$$u_{26} \ln\left(s_5 + x_{15}^{wc} + x_{25}^{wc} + x_{35}^{wc} - 1\right) - u_{27} \ln\left(s_1 - \left(x_{11}^{wc} + x_{21}^{wc} + x_{31}^{wc} - 1\right)\right) -$$

$$u_{28} \ln\left(s_2 - \left(x_{12}^{wc} + x_{22}^{wc} + x_{32}^{wc} - 1\right)\right) - u_{29} \ln\left(s_3 - \left(x_{13}^{wc} + x_{23}^{wc} + x_{33}^{wc} - 1\right)\right) -$$

$$u_{30} \ln\left(s_4 - \left(x_{14}^{wc} + x_{24}^{wc} + x_{34}^{wc} - 1\right)\right) - u_{31} \ln\left(s_5 - \left(x_{15}^{wc} + x_{25}^{wc} + x_{35}^{wc} - 1\right)\right) -$$

$$u_{32} \ln\left(s_6 - b_1(1 - b_1)\right) - u_{33} \ln\left(s_7 - b_2(1 - b_2)\right) -$$

$$u_{34} \ln\left(s_8 - b_3(1 - b_3)\right) - u_{35} \ln(b_1) - u_{36} \ln(b_2) - u_{37} \ln(b_3) -$$

$$u_{38} \ln(1 - b_1) - u_{39} \ln(1 - b_2) - u_{40} \ln(1 - b_3) -$$

$$u_{41} \ln\left(x_{11}^{pw}\right) - u_{42} \ln\left(x_{12}^{pw}\right) - u_{43} \ln\left(x_{13}^{pw}\right) -$$

$$u_{44} \ln\left(x_{21}^{pw}\right) - u_{45} \ln\left(x_{22}^{pw}\right) - u_{46} \ln\left(x_{23}^{pw}\right) -$$

$$u_{47} \ln\left(x_{11}^{wc}\right) - u_{48} \ln\left(x_{12}^{wc}\right) - u_{49} \ln\left(x_{13}^{wc}\right) - u_{50} \ln\left(x_{14}^{wc}\right) - u_{51} \ln\left(x_{15}^{wc}\right) -$$

$$u_{52} \ln\left(x_{21}^{wc}\right) - u_{53} \ln\left(x_{22}^{wc}\right) - u_{54} \ln\left(x_{23}^{wc}\right) - u_{55} \ln\left(x_{24}^{wc}\right) - u_{56} \ln\left(x_{25}^{wc}\right) -$$

$$u_{57} \ln\left(x_{31}^{wc}\right) - u_{58} \ln\left(x_{32}^{wc}\right) - u_{59} \ln\left(x_{33}^{wc}\right) - u_{60} \ln\left(x_{34}^{wc}\right) - u_{61} \ln\left(x_{35}^{wc}\right) -$$

$$u_{62} \ln(s_1) - u_{63} \ln(s_2) - u_{64} \ln(s_3) - u_{65} \ln(s_4)$$

$$- u_{66} \ln(s_5) - u_{67} \ln(s_6) - u_{68} \ln(s_7) - u_{69} \ln(s_8) -$$

$$u_{70} \ln\left(z - \tilde{C}(\mathbf{x}, \mathbf{b}, \mathbf{s}, \mathbf{r})\right)$$

Figure 17

$$G^j = \sum_{i=0}^{5} H^{i,j} \times w^i$$

$$[G^i] = [H^{i,0}] \times [w^0] + [H^{i,1}] \times [w^1] + [H^{i,2}] \times [w^2] + [H^{i,3}] \times [w^3] + [H^{i,4}] \times [w^4] + [H^{i,5}] \times [w^5]$$

when $i = 1$, for example

3804

$$[G^1] = \underbrace{[H^{1,1}] \times [w^1]} + [H^{1,0}] \times [w^0] + [H^{1,2}] \times [w^2] + [H^{1,3}] \times [w^3] + [H^{1,4}] \times [w^4] + [H^{1,5}] \times [w^5]$$

3806

$$[G^1] - [H^{1,0}] \times [w^0] + [H^{1,2}] \times [w^2] + [H^{1,3}] \times [w^3] + [H^{1,4}] \times [w^4] + [H^{1,5}] \times [w^5] = \underbrace{[H^{1,1}] [w^1]}$$

3812

3808                                           3814        3815        3816        3817        3818           3810

$$[H^{1,1}]^{-1} \left\{ [G^1] - \underbrace{[H^{1,0}] \times [w^1]} + [H^{1,2}] \times [w^2] + [H^{1,3}] \times [w^3] + [H^{1,4}] \times [w^4] + [H^{1,5}] \times [w^5] \right\} = [w^1]$$

Figure 38

METHOD AND SYSTEM FOR OPTIMIZATION OF GENERAL PROBLEMS

CROSS-REFERENCES TO RELATED APPLICATIONS

This application is a continuation of U.S. application Ser. No. 10/745,394, filed Dec. 23, 2003, now U.S. Pat. No. 7,072,723, which is a continuation-in-part application of U.S. application Ser. No. 10/693,729, filed Oct. 23, 2003, which claims the benefit of provisional patent application Nos. 60/420,921 and 60/420,922, both filed Oct. 23, 2002.

TECHNICAL FIELD

The present invention is related to general optimization methods employed to determine relatively optimal solutions for various types of problems and to control of computational processes and construction of computational approaches to solving complex problems and, in particular, to a general computational method and system for minimizing a general class of objective functions, for adjusting solutions to optimization over time, and for constructing and achieving relatively optimal computational control over a wide range of computational processes.

BACKGROUND OF THE INVENTION

Significant research-and-development effort is currently being applied to the mathematical and computational field of optimization. Optimization techniques are applied to a wide variety of everyday and complex theoretical problems in order to find solutions to those problems, including cost-effective and time-efficient control strategies for complex systems and organizations. For example, optimization techniques may be applied to schedule labor and equipment resources within a large manufacturing organization in order to most cost-effectively produce a given amount of manufactured product to meet a projected demand for the product at various points in time. As another example, optimization techniques may be applied to a large control problem, such as the control of traffic lights within a city, in order to allow for as large a volume of traffic to move through the city as possible without generating unreasonable delays at various intersections and for those traveling on various secondary and tertiary routes within the city. Many natural systems can be viewed as seeking relatively optimal solutions to complexly defined problems governed by physical characteristics and principles and constrained by a large number of physical constraints. For example, complex chemical reactions can be considered to be governed by rather simple, thermodynamic principles by which individual components, such as molecules, seek minimum energy states and maximum entropy, constrained by various ways in which molecules can reconfigure themselves and exchange energy amongst themselves according to quantum mechanics. Even more complex biological systems can also be considered to be governed by chemical and thermodynamic principles as well as by analogous principles involving information content and exchange, compartmentalization and modular design, and other considerations. Thus, optimization problems may encompass an extremely wide variety of mathematically and computationally expressed models of natural phenomena, design, organization, and control of complex systems, and organization, transmission, and processing of information.

Current approaches for finding near optimal and optimal solutions for mathematically modeled problems are limited. When the number of decision variables and constraints in such problems increases from the small number of variables and constraints normally employed in simple, textbook problems to the large number of variables and constraints normally encountered in real-world systems, the computational resources required for seeking near optimal and optimal solutions increase exponentially in most cases. Current techniques cannot be satisfactorily applied to any but the simplest types of problems. Many currently available techniques involve applying oppressive constraints to optimization models, such as requiring variables to be continuous and requiring the hyper-dimensional volume representing the set of possible solutions of optimizations problems, or problem domain, to be convex.

Researchers, developers, system modelers, and investigators of many different types of complex system behavior have therefore recognized the need for more generally applicable and efficient methods and systems for optimization.

SUMMARY OF THE INVENTION

Various embodiments of the present invention include methods and systems for generic optimization of problems by an approach to minimizing functions over high-dimensional domains that mathematically model problems for which near optimal or optimal solutions are sought. These embodiments receive a mathematical description of a system, in symbolic form, that includes decision variables of various types, including real-number-valued, integer-valued, and Boolean-valued decision variables. The objective function with high dimensional domain that is minimized in order to find near optimal and optimal solutions may be accompanied by a variety of constraints on the values of the decision variables, including inequality and equality constraints. Various embodiments of the present invention incorporate the objective function and constraints into a global objective function. The local and global minima of this function occur at critical points. One or more of these critical points is a near optimal or optimal solution for the modeled problem. Various embodiments of the present invention transform the global objective function and a procedure for finding critical points into a system of differential equations in terms of continuous variables and parameters, so that powerful, polynomial-time methods for solving differential equations can be applied for identifying critical points of the function. These embodiments undertake an interior-point-based method and employ a global gradient-descent field formulation in order to efficiently traverse the hyperdimensional domain of the global objective function to find local minima. Near a local critical point, where the global descent field is ineffective in providing better approximants of the variables, embodiments of the present invention provides a steering method that generates a local descent-field across the local critical point towards the solution. Once the vicinity of the local critical point is left behind, the global gradient descent method is resumed, and various embodiments of the present invention employ a method to establish a reasonable direction for resuming a descent path through the hyper-dimensional domain toward local minima. One of these local minima may represent a near optimal solution of the problem. Embodiments of the present invention also provide for distribution and decomposition of the global gradient descent-field and local gradient descent-field optimization methods using multiple threads and agents, respectively, in order to allow for parallel computation and increased time efficiency. Various embodiments of the present invention further include approaches for adjusting solutions to optimization problems relatively continuously in time, without needing to recompute the optimization solution de novo. While many embodiments of the present invention are specifically directed to various classes of optimization problems, other embodiments of the present invention provide a more general approach for constructing complex hierarchical computational processes and for optimally or near optimally controlling general computational processes.

BRIEF DESCRIPTION OF THE DRAWINGS

FIGS. 4–7 illustrate further aspects and characteristics of the hypothetical problem using the illustration conventions of FIG. 3.

FIG. 5 illustrates costs associated with shipping goods from a manufacturing plant to warehouses and from warehouses to customers.

FIG. 6 illustrates additional characteristics of the hypothetical problem.

FIG. 7 shows a simple two-manufacturing-plant, three-potential-warehouse, five-customer hypothetical problem associated with numerical costs, capacities, and demands.

FIG. 9 shows an initial symbolic, mathematically expressed model for the specific optimization problem illustrated in FIG. 7.

FIG. 10 shows transformation of the hypothetical mathematical model into a model employing only floating point variables.

FIG. 11 shows the mathematical model for the hypothetical problem transformed to standard form.

FIG. 13 shows the symbolic, mathematically expressed model for the hypothetical problem following transformation of equality constraints to inequality constraints.

FIG. 15 shows the mathematical model for the hypothetical problem following introduction of the envelope variable z.

FIG. 17 shows the symbolic, mathematical model for the hypothetical problem following addition of barrier constraints.

FIG. 32 illustrates data flow during a next step of the inner loop (2205 in FIG. 22).

FIG. 33 indicates that the date-exchange steps illustrated in FIGS. 31 and 32 are successively repeated in a number of inner-loop iterations.

FIG. 34 illustrates the data exchange involved in costate vector calculations undertaken by the p module 2810 in step 2209 of FIG. 22.

Figure 37:
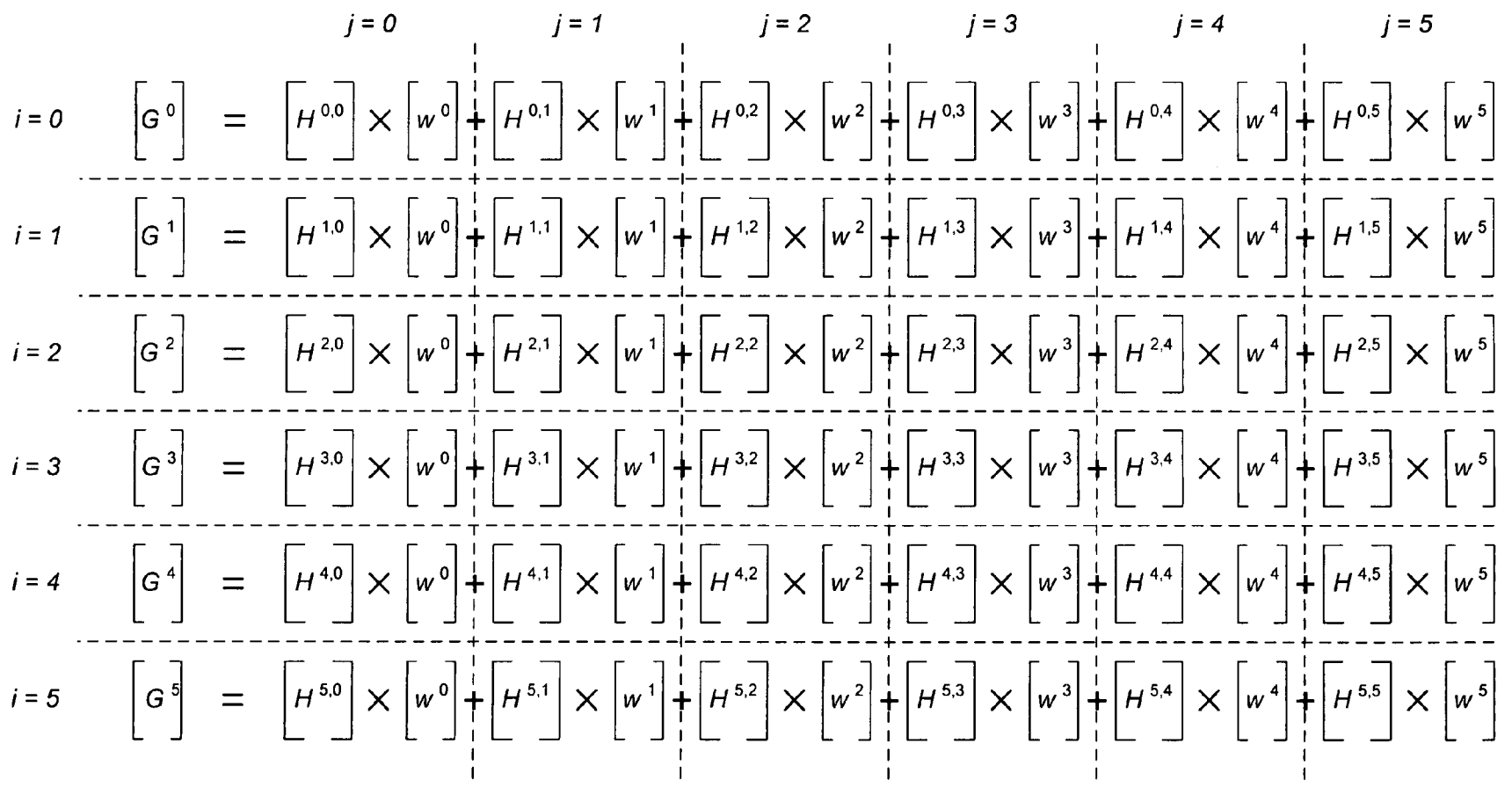

FIG. 37 shows a decomposed multiplication of the Hessian matrix by the w vector.

FIG. 38 shows a mathematical manipulation of the computation of a G-vector partition that facilitates decomposition of the Hessian-matrix inversion by y-module agents.

DETAILED DESCRIPTION OF THE INVENTION

The present invention relates to the generic optimization of mathematically-formulated problems, relatively continuous adjustment of solutions to optimization control problems, and to a more abstract, higher-level hierarchical construction of, an optimal or near-optimal control of computational processes. Various embodiments of the present invention include complex software programs running on a single-processor computer system, or running, in parallel, on multi-processor computer systems, or on a large number of distributed, interconnected single-and/or-multiple processor computer systems. These programs are quite mathematical in nature, and involve elaborate and difficult-to-describe mathematical techniques. For this reason, the present invention is described in part, below, with reference to a concrete problem, with reference to many hundreds of equations, and with reference to many graphical illustrations and control-flow diagrams. Although mathematical expressions, alone, may be sufficient to fully describe and characterize the programs that implement processes that represent various embodiments of the present invention to those skilled in the art of software development, the more graphical, concrete-problem-oriented, and control-flow-diagram approaches included in the following discussion are intended to illustrate various embodiments of the present invention in a variety of different ways that may be particularly accessible to readers with particular backgrounds. The present invention is described below in the following subsections: (1) Optimization; (2) Repair; and (3) Meta-Control and Hierarchical Process Construction.

Optimization

Figure 1A:
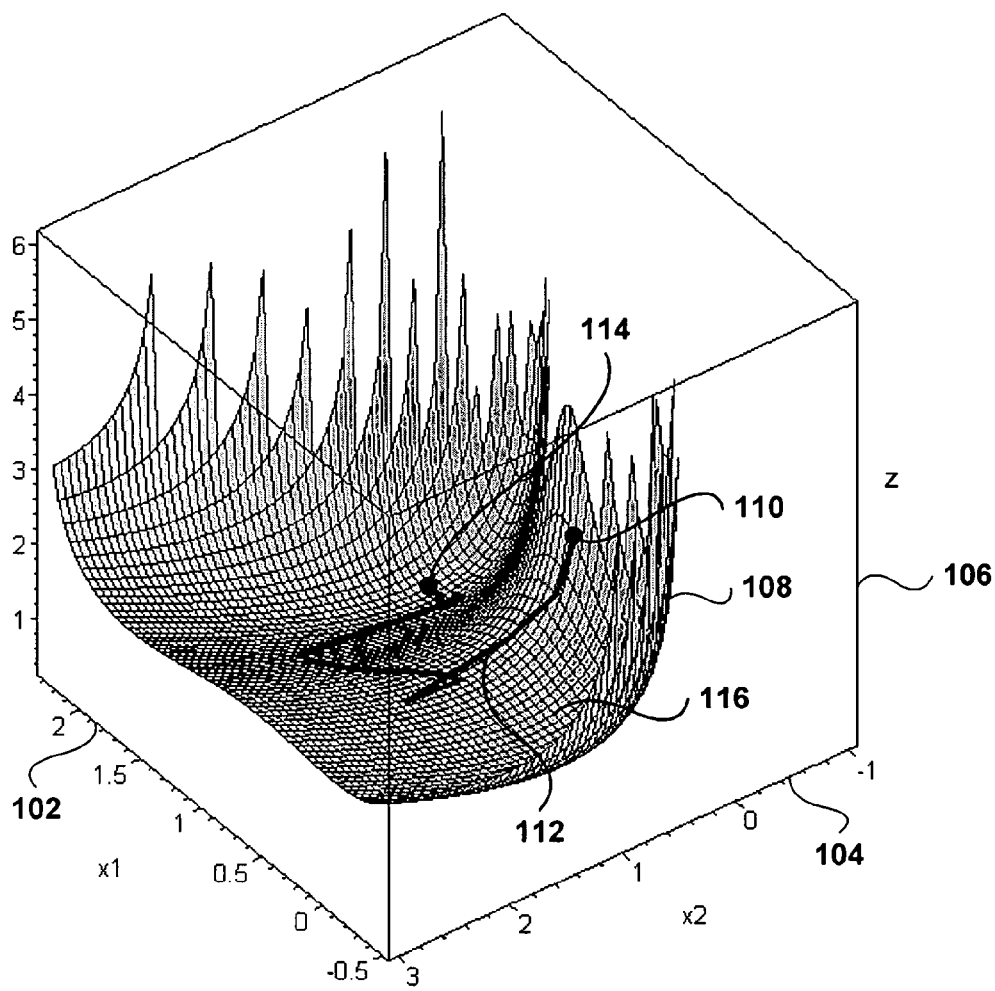
FIGS. 1A–B illustrate a very simple, two-dimensional optimization problem.
Figure 1B:
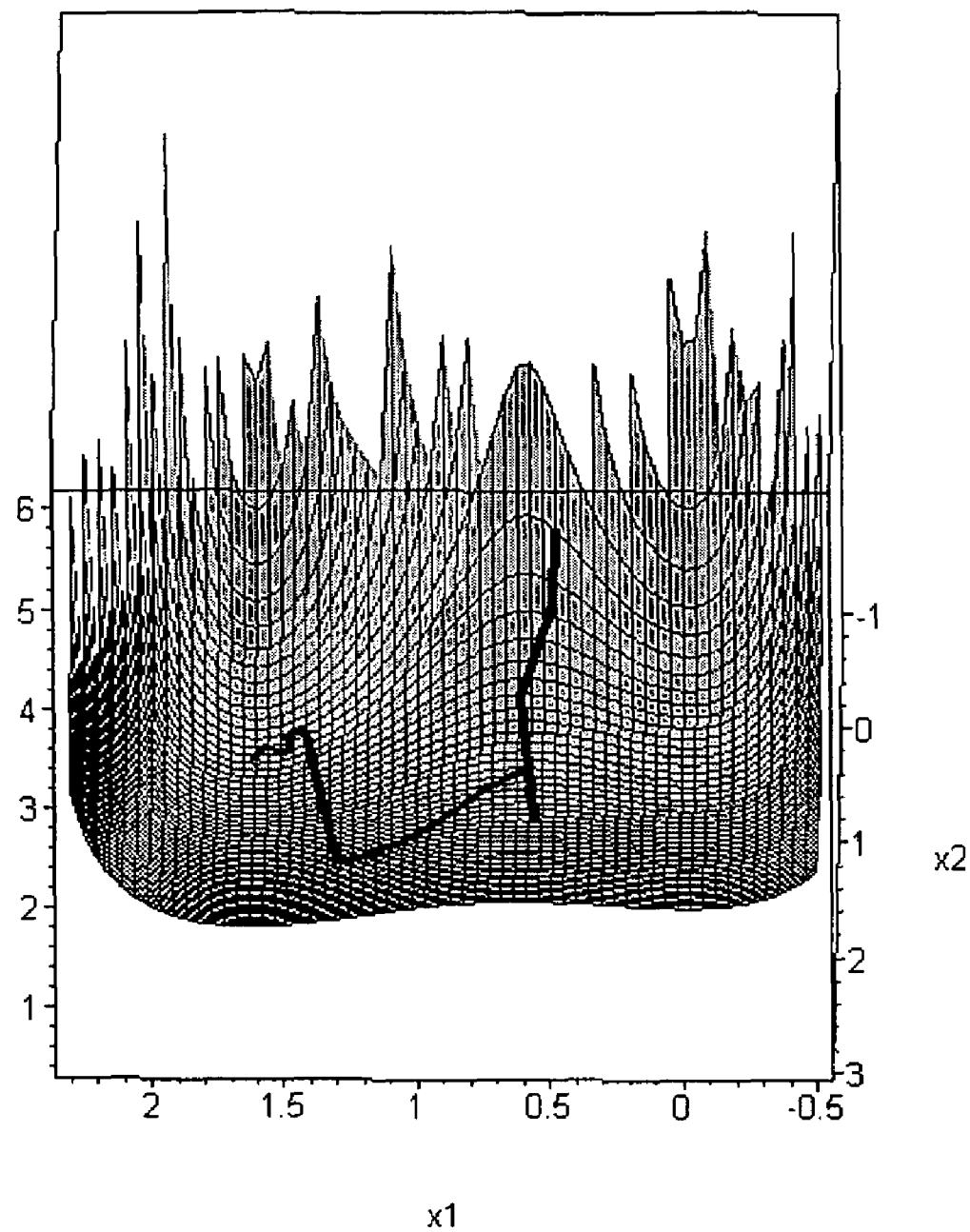

FIGS. 1A–B illustrate a very simple, two-dimensional optimization problem. FIGS. 1A–B show two different views of a two-dimensional surface, with the surface mathematically expressed as follows:

$$z = f(x1, x2)$$

where the domain of the problem is the two-dimensional surface and the goal of the problem is to identify values of x1 and x2 for which the dependent variable z is minimal. In other words, the graph of the surface is a collection of points (x1, x2, z) characterized by a function of two variables, x1 and x2, plotted with respect to the x1-axis 102, the x2-axis 104, and the z-axis 106. As a concrete example, z might represent the cost associated with manufacturing widgets of length x1 and width x2. An optimization problem with regard to this model may be to find the optimal widget length and widget width in order to reduce the cost of manufacturing a widget to the lowest possible value. In most cases, a closed-form expression for the solution, or even a mathematical model, for an optimization problem is not available. Instead, one may begin with some initial, feasible values for the decision variables, in the present case x1 and x2 values corresponding to a point on the two-dimensional surface 110, and then attempt to find a path, denoted in FIG. 1A by the dark curve 112, from the initial, feasible position 110, to a local or global minimum value of the function $z_{min}$ that occurs at a point 114 on the surface with coordinates $(x1_{min}, x2_{min}, \text{ and } z_{min})$.

Note that one possible approach for finding a near-optimal or optimal solution to the problem would be to compute z for every possible pair (x1, x2). However, in general, even for extremely simple problems, such an approach would be computationally prohibitive. In many cases, the domains for decision variables, such as decision variables x1 and x2, are subsets of the real numbers, or subsets of other natural domains, which may greatly decrease the potential number of decision-variable-values for which the function would need to be evaluated in order to conduct a complete, combinatory search. However, even in these cases, the combinatory search method is generally not feasible.

It should be noted that, although many two-dimensional-surface illustrations, such as FIGS. 1A–B are used in the following discussion, they are provided only for illustration purposes. In real-world problems, there may be thousands, hundreds of thousands, or millions of variables and constraints, leading to extremely high-dimensional problem domains. In general, these problem domains may be considered to be hyper-dimensional volumes, or manifolds, bounded by hyper-dimensional surfaces specified by the constraints. It is not possible to illustrate such problem domains, but techniques used to address hyper-dimensional problem domains may analogized to 3-dimensional illustrations. For example, a feasible point in a two-dimensional problem domain is a point of a two-dimensional surface, while a feasible point in a hyper-dimensional problem domain is a point within the hyper-dimensional volume, or manifold, enclosed by the hyper-dimensional boundary surface.

Many other approaches are possible for traversing the domain of a mathematical model from an initial, feasible point to a local or global minimum point. One can, for example, compute the gradient for the function at each point, and proceed along the surface in the direction of the gradient in order to most steeply descend along the surface to a local or global minimum. This approach is best suited for convex problems, in which a single global minimum exists. The hyper-dimensional volume domain for a real-word optimization problem is quite often non-convex, and includes many critical points, including saddle points, local maxima, and local minima in addition to a global minimum. Therefore, a steepest-descent approach using gradients may be used to traverse the hyper-dimensional problem domain to a local minimum, but a searching method must nonetheless be employed in order to visit and evaluate multiple local minima. For example, in FIG. 1A, had the trajectory dictated by the steepest-descent method ended at the local minimum represented by point 116, then some other approach would be needed in order to detect and evaluate the global minimum at point 112. FIG. 1B shows the problem-domain surface and path to the global minimum shown in FIG. 1A rotated by approximately forty-five degrees about the z-axis.

Figure 2:
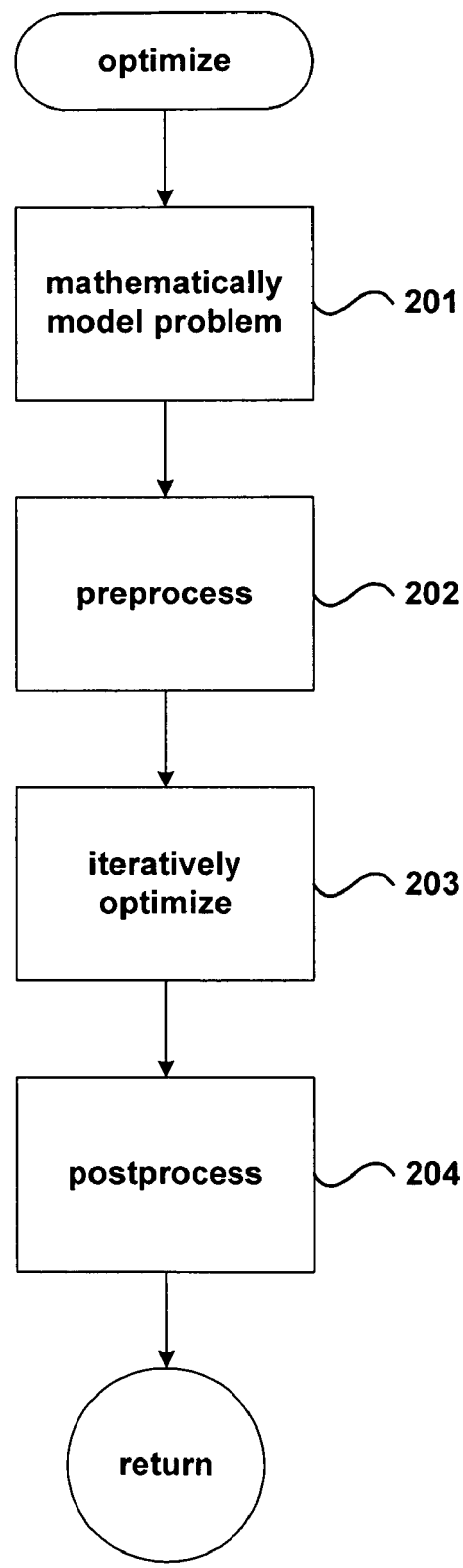
FIG. 2 is a control-flow diagram for a highest level view of an optimization method and system that represents one embodiment of the present invention.

FIG. 2 is a control-flow diagram for a highest level view of an optimization method and system that represents one embodiment of the present invention. In a first step, 201, a particular system or problem to be optimized is mathematically modeled, and the mathematical model serves as input to subsequent optimization steps. Many of the embodiments of the present invention include graphical user interfaces, text-based interpreters, and other such interfaces in order to facilitate mathematical modeling of problems. Below, a particular mathematical model for a hypothetical problem is provided as an example of a mathematical model for an optimization problem. In general, the mathematical model is provided in symbolic form, comprising a set of mathematical expressions including symbolic terms and operators. Next, in step 202, the method and system undertake a preprocessing step in order to transform the symbolically expressed mathematical model to a standard form needed by methods that represent embodiments of the present invention. Preprocessing steps are discussed below with respect to the hypothetical mathematical model, and the preprocessing steps are formally described. Next, in step 203, the symbolic standard form of the mathematical model is used to set up an iteration and to iteratively optimize the function obtained using an instance of the interior-point method and a gradient-steered descent-field trajectory in order to identify one or more local minima within a hyper-dimensional problem domain. Various strategies and descent-field mechanisms are employed to find and evaluate a possibly large number of local minima in order to identify a near-optimal solution to the mathematically modeled problem. Various embodiments of the present invention employ different search strategies. It is important to note that neither the methods that represent the embodiments of the present invention, nor any other optimization methods currently employed, are guaranteed to always find a global minimum within a given tolerance or a reasonable amount of time using a reasonable amount of computer resources. However, most practical optimization problems are bounded, in that the number of local minima is finite. Finally, once a best solution is found within some specified tolerance or the maximum amount of time using a specified amount of computing resources, this solution is transformed, in a post-processing step 204, in order to provide one or more near-optimal solutions in the context of the mathematical model for the problem originally provided in step 201.

Figure 3:
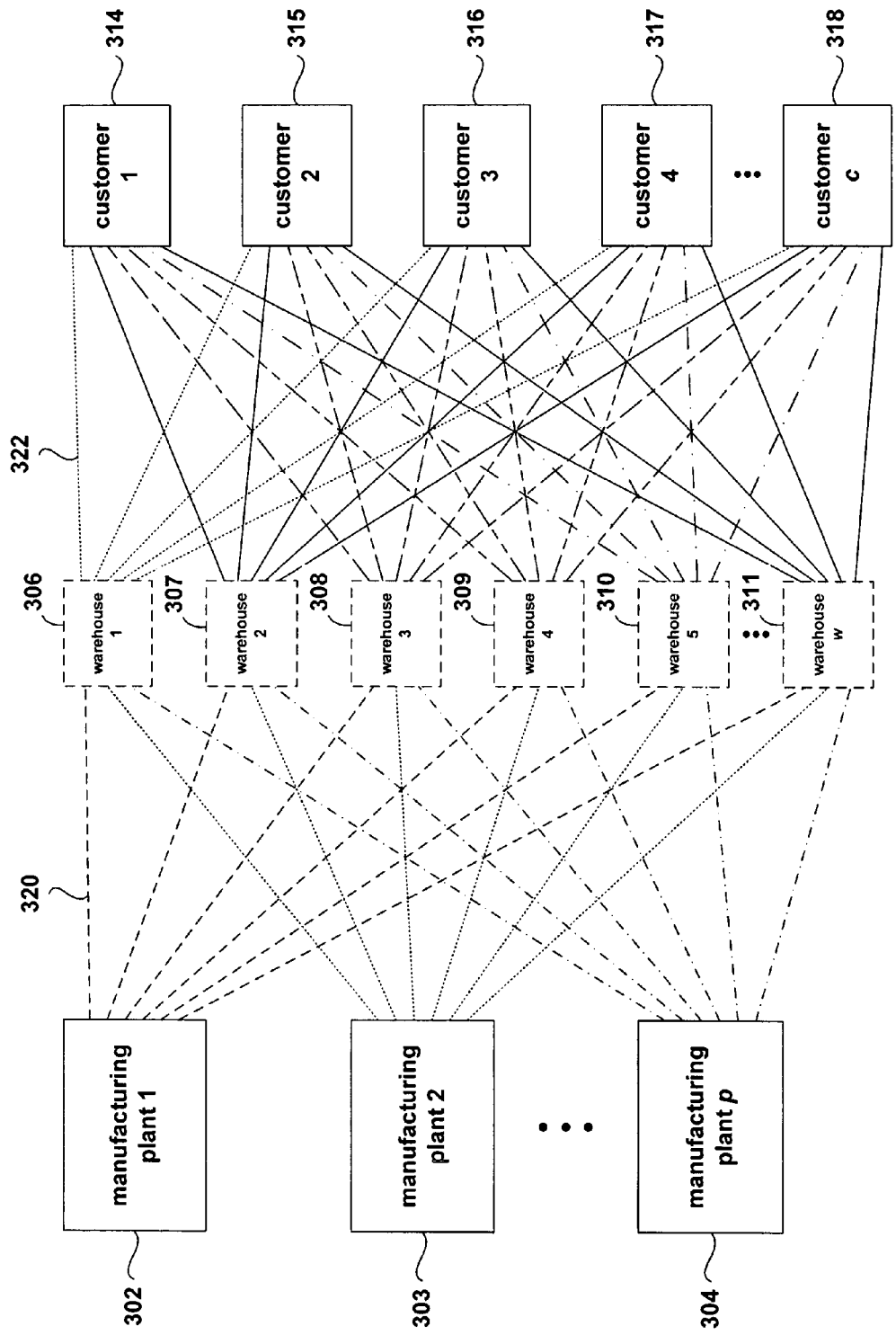
FIG. 3 illustrates a hypothetical problem used to illustrate modeling and preprocessing.

The mathematical modeling step and preprocess step, 201 and 202 in FIG. 2, respectively, are perhaps best appreciated using a concrete, hypothetical problem. FIG. 3 shows a hypothetical problem used to illustrate the mathematical modeling and preprocessing steps. The hypothetical problem involves p manufacturing plants, 302–304, w warehouses, 306–311, and c customers, 314–318. A manufacturing plant, such as manufacturing plant 302, can ship goods to any of the w warehouses, indicated in FIG. 3 by various types of lines, such as dashed line 320 connecting manufacturing plant 302 and warehouse 306. Each warehouse, in turn, can ship goods to any of the c customers, with paths between warehouses and customers indicated by various types of lines, such as the dash line 322 interconnecting warehouse 306 and customer 314. In FIG. 3, a different style of line is used to show the path from a particular manufacturing plant to the various warehouses, and from a particular warehouse to the various customers.

Figure 4:
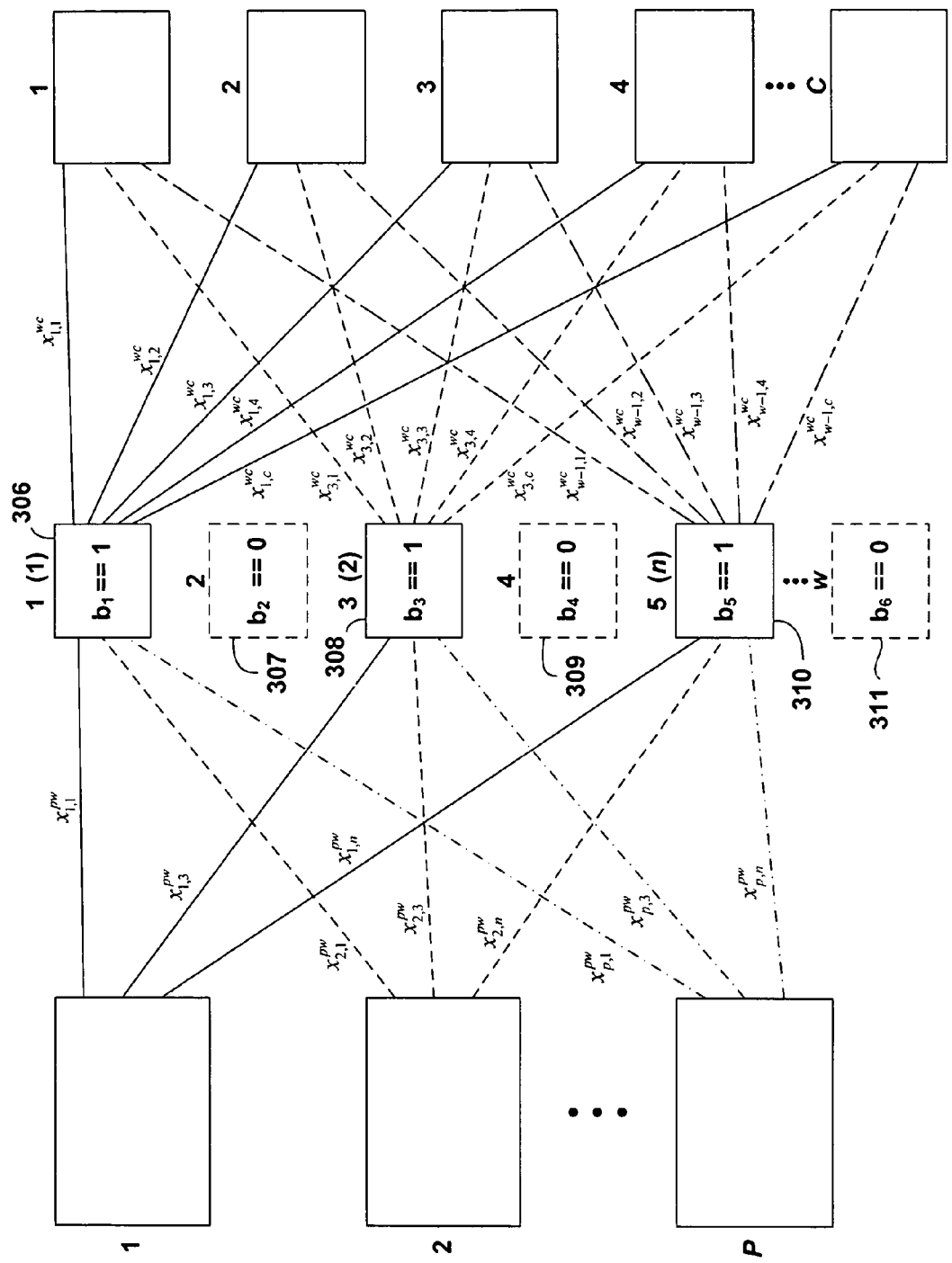

FIGS. 4–7 illustrate further aspects and characteristics of the hypothetical problem using the illustration conventions of FIG. 3. For example, the notation $x_{ij}^{pw}$ indicates the amount of goods shipped from manufacturing plant i to warehouse j and terms of the form $x_{jk}^{wc}$ indicate the amount of goods shipped from warehouse j to customer k. Although there are w potential warehouses, not all w warehouses need to be used. A Boolean variable $b_j$ indicates whether or not warehouse j is employed, with the Boolean value "1" or "TRUE" indicating that the warehouse is used, and the Boolean value "0" of "FALSE" indicating that the warehouse is not used. In FIG. 4, for example, warehouses 1 (306), 3 (308), and 5 (310) are used, as indicated by the solid borders of the squares representing used warehouses and the Boolean values "1" associated with the used warehouses, and warehouses 2 (307), 4 (309), and all warehouses following warehouse 5, including warehouse w 311, are not used. The used warehouses are alternatively numbered, in FIG. 4, with sequential numbers in parentheses so that the three used warehouses are sequentially numbered 1, 2, and n, where n is the total number of used warehouses and equals 3 in the example shown in FIG. 4.

Figure 5:
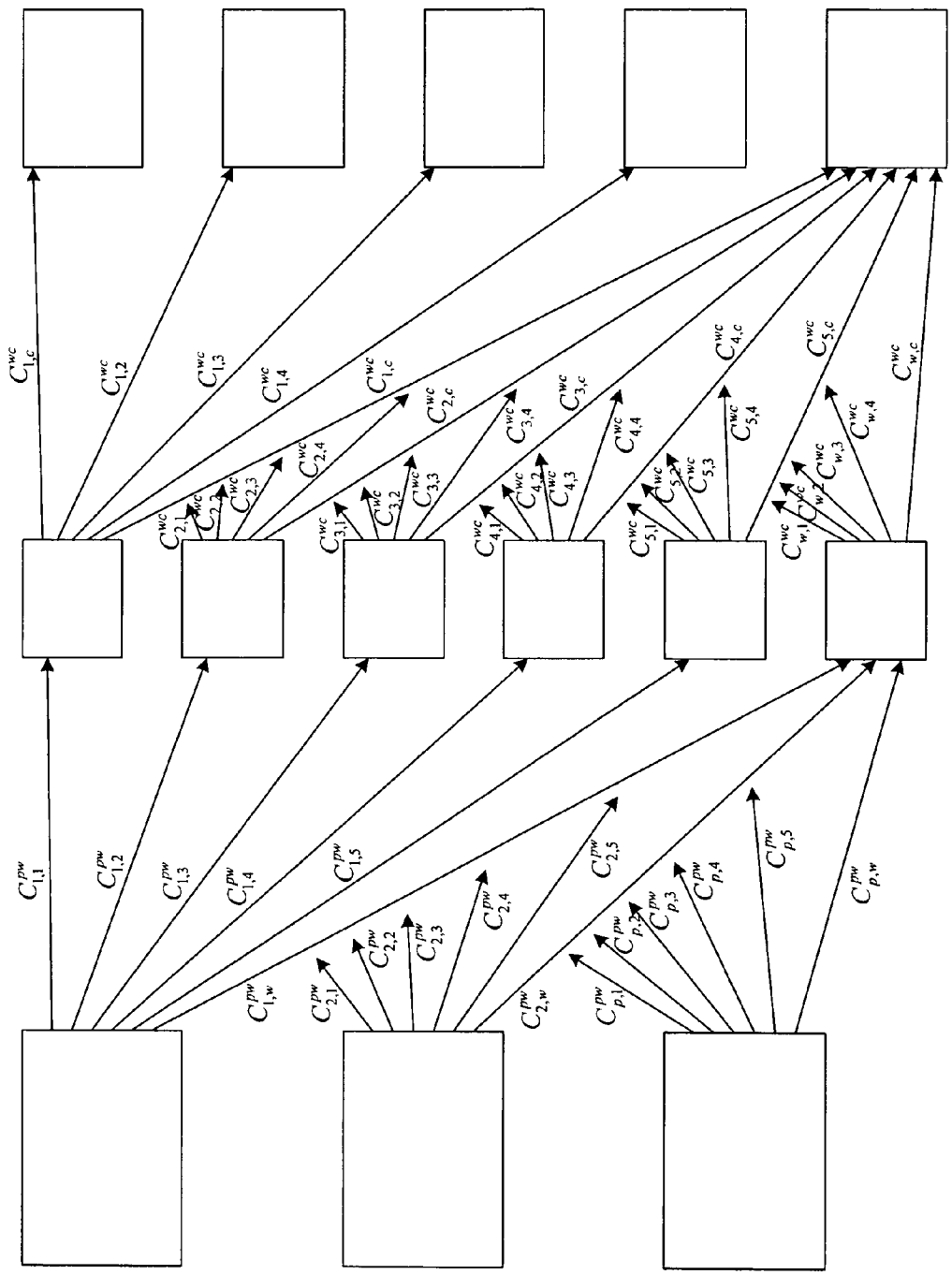

FIG. 5 illustrates costs associated with shipping goods from manufacturing plants to warehouses and from warehouses to customers. A term of the form $c_{ij}^{pw}$ indicates the per item cost of shipping goods from a manufacturing plant i to warehouse j, and a term of the form $c_{jk}^{wc}$ indicates the per item cost of shipping goods from warehouse j to customer k. In FIG. 5, each of the shipping routes is labeled with the corresponding per-item cost.

Figure 7:
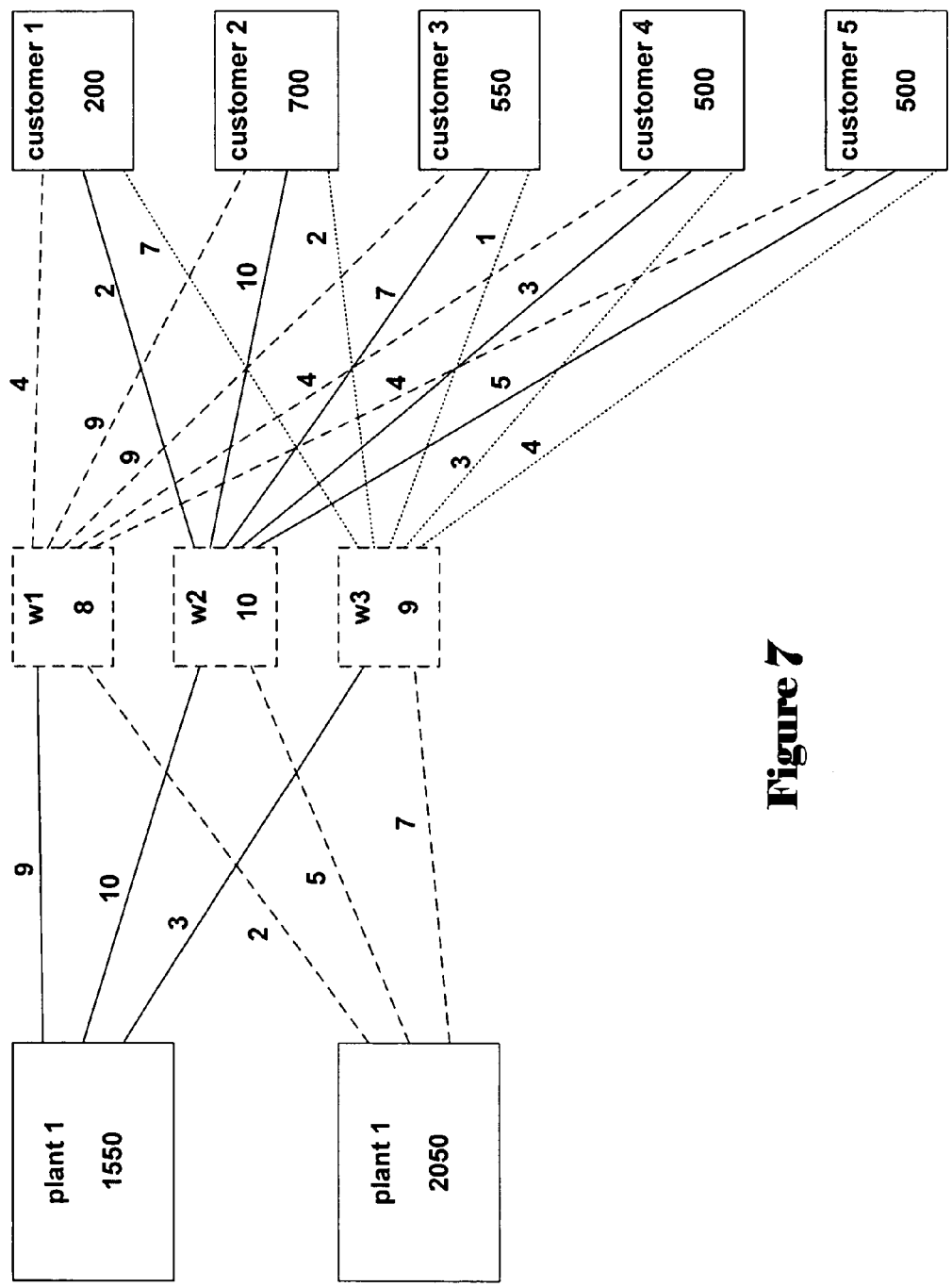

FIG. 6 illustrates additional characteristics of the hypothetical problem. With each manufacturing plant, there is an associated manufacturing capacity, with a term having the form $s_i$ indicating the shipping capacity of manufacturing plant i. Each warehouse has a receiving capacity, expressed by a term $v_j$ indicating the capacity of warehouse j to receive goods. Also, there is a cost of operation for each warehouse, with a term of the form $r_j$ indicating the cost of operating warehouse j. Finally, there is a demand of goods associated with each customer. A term of the form $d_k$ indicates the demand for goods by customer k. In FIG. 6, the supply capacities, receiving capacities, cost of operations, and demands associated with manufacturing plants, warehouses, and customers are all explicitly detailed. Finally, FIG. 7 shows a simple two-manufacturing-plant, three-potential-warehouse, five-customer hypothetical problem associated with numerical costs, capacities, and demands.

The optimization problem illustrated in FIGS. 3–7 is to figure out the lowest cost configuration of operating warehouses, manufacturing-plant-to-warehouse shipping volumes, and warehouse-to-customer shipping volumes such that all the customer demands are met and no capacity is exceeded. A more formal, symbolic mathematical expression of the optimization problem follows.

First, the total cost associated with any particular system configuration is expressed as:

$$\text{total cost} = \sum_{i=1}^{p} \sum_{j=1}^{n} c_{ij}^{pw} x_{ij}^{pw} + \sum_{j=1}^{n} \sum_{k=1}^{c} c_{jk}^{wc} x_{jk}^{wc} + \sum_{j=1}^{w} r_j b_j$$

In other words, the total cost is the sum of the costs associated with all shipments from manufacturing plants to warehouses, from warehouses to customers, and the costs of operating warehouses. A minimum is sought in the hypothetical optimization problem for the total cost. In addition, the model includes various constraints. First, a manufacturing plant cannot ship a greater amount of goods than the capacity of the manufacturing plant, expressed as follows:

$$\sum_{j=1}^{n} x_{ij}^{pw} \le s_i$$

Customers all receive at least an amount of goods equal to their demands, expressed as follows:

$$\sum_{j=1}^{n} x_{jk}^{wc} \ge d_k$$

Furthermore, the amount of goods sent by a manufacturing plant to each warehouse is less than or equal to the warehouse's capacity for receiving goods, expressed as follows:

$$\sum_{i=1}^{p} x_{ij}^{pw} \le v_j$$

Similarly, a warehouse ships an amount of goods less than or equal to the warehouse's capacity to receive goods, expressed as follows:

$$\sum_{k=1}^{c} x_{jk}^{wc} \le v_j$$

Warehouses do not store goods. Each warehouse ships out everything that it receives, expressed by the conservation constraint that follows:

$$\sum_{i=1}^{p} x_{ij}^{pw} - \sum_{k=1}^{c} x_{jk}^{wc} = 0$$

The shipment pathways illustrated in FIGS. 3–7 are unidirectional or, in other words, goods are not returned, expressed as follows:

$x_{ij}^{pw} \ge 0$ and $x_{jk}^{wc} \ge 0$

For the hypothetical problem it is assumed that there is sufficient manufacturing capacity and warehouse-receiving capacity to satisfy the customer demands, expressed as follows:

$$\sum_{i=1}^{p} s_i \ge \sum_{j=1}^{w} v_j \ge \sum_{k=1}^{c} d_k$$

Goods may be shipped to and from only operating warehouses, expressed by the following two constraints:

$x_{ij}^{pw}(1-b_j)=0$ $x_{jk}^{wc}(1-b_j)=0$

The number of operating warehouses is less than or equal to the total potential number of warehouses w:

$$\sum_{j=1}^{n} b_j \le w$$

Finally, the terms $y_j$ are Boolean values, expressed as follows:

$b \in \{0,1\}$

The above mathematical model may be slightly transformed to more concisely express the cost function and associated constraints. First, the amount-of-goods-shipped parameters of the types $x_{ij}^{pw}$ and $x_{jk}^{wc}$ may be replaced by scaled shipment terms as follows:

$$m_{ij}^{pw} = \frac{x_{ij}^{pw}}{s_i}, 0 \le m_{ij}^{pw} \le 1$$

$$m_{jk}^{wc} = \frac{w_{jk}^{wc}}{d_k}, 0 \le m_{jk}^{wc} \le 1$$

The warehouse-capacity-based constraints, provided above, turn out to be redundant, and can therefore be removed from the set of constraints without affecting the problem model or solutions obtained for the model. The conservation constraint indicating the warehouses do not store goods is modified to use scaled shipment terms, as follows:

$$\sum_{i=1}^{p} s_i m_{ij}^{pw} \ge \sum_{k=1}^{c} d_k m_{jk}^{wc}$$

Non-operable warehouses do not ship goods, as expressed by the following constraint:

$m_{jk}^{wc} \le b_j$

The total cost may be expressed, using the scaled shipment of goods terms, as follows:

$$\sum_{i=1}^{p}\sum_{j=1}^{n} s_i c_{ij}^{pw} m_{ij}^{wc} + \sum_{j=1}^{n}\sum_{k=1}^{c} d_j c_{jk}^{wc} m_{jk}^{wc} + \sum_{j=1}^{n} r_j b_j$$

The capacity constraints are expressed, in terms of the scaled shipment of goods terms, as follows:

$$\sum_{j=1}^{n} m_{ij}^{pw} \le 1$$

$$\sum_{j=1}^{n} m_{jk}^{wc} = 1$$

The above-listed capacity constraints can be recast as an inequality with respect to 0, as follows:

$$\sum_{i=1}^{p} s_i r_{ij}^{pw} - \sum_{k=1}^{c} d_k m_{jk}^{wc} \geq 0$$

The fact that the number of operating warehouses must be less than or equal to the total potential number of warehouses, that goods cannot be returned, and that the $b_j$ terms are Booleans, are now represented as:

$$\sum_{j=1}^{n} b_j \leq w$$

$$m_{ij}^{pw}, m_{jk}^{wc} \geq 0$$

$$b_j \in \{0, 1\}$$

Figure 8:
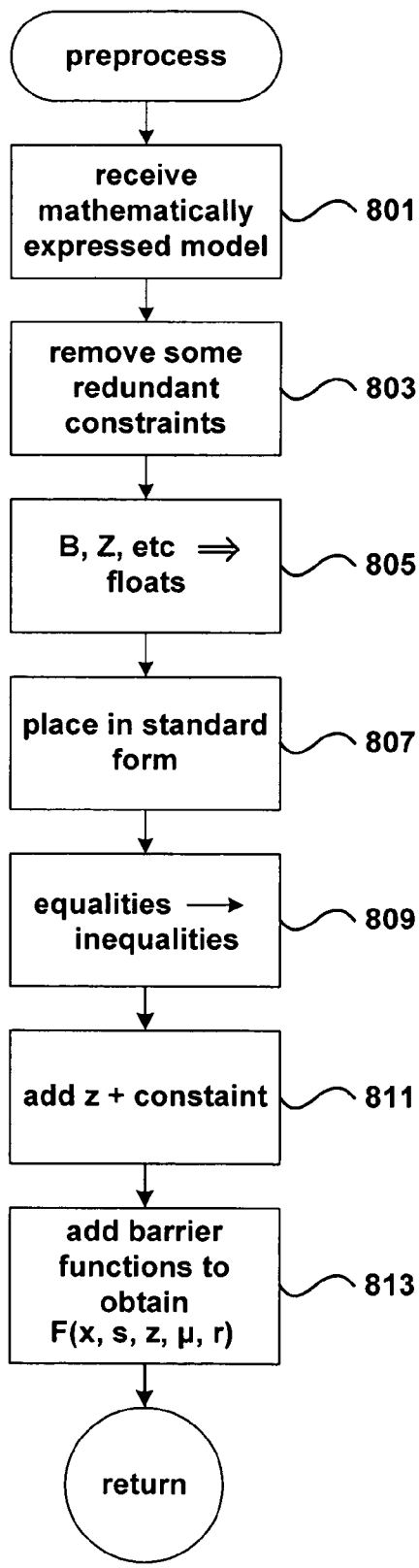
FIG. 8 is a more detailed, control-flow diagram for the preprocess step of the high-level control-flow diagram shown in FIG. 2.

FIG. 8 is a more detailed control-flow diagram for the preprocess routine invoked in step 202 of the high-level control-flow diagram shown in FIG. 2. Each step of the preprocess routine illustrated in FIG. 8 is further discussed below with reference to corresponding transformations of the hypothetical mathematical model described above. First, in step 801, the preprocess routine receives the initial, symbolic, mathematically expressed model for the optimization problem, including constraints. In step 803, the preprocessing routine attempts to remove as many redundant constraints as possible. An example of the removal of redundant constraints occurs in the above transformed model, with the warehouse-capacity constraints in the original form of the model recognized as redundant and removed from the transformed model. Next, in step 805, all Boolean and integer-value decision variables, such as the Boolean variables $b_j$, in the hypothetical example, are transformed into floating-point variables. In step 807, the resulting symbolic, mathematically expressed model is placed in a standard form. In step 809, equality constraints are replaced by relaxed inequality constraints. Each equality constraint is relaxed with three inequality constraints using an additional positively valued variable. In step 811, an additional variable z is added, along with an additional constraint to convert the criterion into an additional constraint. Finally, in step 813, the transformed optimization problem is converted into an Interior Point Method barrier function by adding together terms. Each term is an evaluation of a barrier function in terms of an expression representing a constraint multiplied by a control variable. This Interior Point Method Barrier function contains two sets of control variables u and r. As a result of the preprocessing routine, the mathematical model is symbolically expressed in a form that can be optimized by the iterative optimization technique shown as step 203 in FIG. 2.

FIG. 9 shows the initial symbolic, mathematically expressed model for the specific optimization problem illustrated in FIG. 7. The cost function, 902, is to be optimized with respect to vectors of integer variables x and Boolean variables b. The constraints include manufacturing-plant-capacity constraints 904, customer-demand constraints 906, conservation constraints 908, constraints 910 that model the fact that no flow can occur to or from a warehouse that is not selected by the optimization, the corresponding Boolean variable being zero, a constraint that only two of the three warehouses may be operational 912, a constraint specifying that there are no return shipments of goods from customers to warehouses or from warehouses to manufacturing plants 914, and the constraint that the $b_j$ are Boolean-valued variables 916.

The third step of the preprocessing routine, step 805 in FIG. 8, involves transforming Boolean, integer, and other non-floating-point variables to floating-point variables. Each Boolean variable $b_i$ is replaced with a floating-point value $y_i$ in the range [0,1] and with an additional constraint:

$$y_i(1-y_i)=0$$

The additional constraint implies that the floating-point variable $y_i$ can only have one of the two values 0 or 1. Each integer variable is replaced by an equivalent base-2 polynomial with k terms, where k is approximately equal to the base-2 logarithm of the maximum value that the integer variable can have. Each term of the base-2 polynomial comprises a power of 2 multiplied by a Boolean coefficient, and thus the base-2 polynomial is, in turn, replaced with k floating-point variables $y_0, y_1, \ldots y_{k-1}$, all within the range [0,1] along with k constraints in the form:

$$y_i(1-y_i)=0$$

The conversion of decision variables of various types to floating-point numbers is summarized formally as follows:

$x_i \in R \Rightarrow x_i$ is float $x_i \notin R \rightarrow x_i$ is transformed to float:

$\forall x_i \in \text{Bool}, x_i \Rightarrow y_i \in [0, 1], y_i(1 - y_i) = 0$ $\forall x_i \in Z^+, x_i \Rightarrow \sum_{i=0}^{k} b_i 2^i = b_0 2^0 + b_1 2^1 + b_2 2^2 + \ldots + b_{k-1} 2^{k-1}$ where $maxvalue(x_i) = 2^k - 1$ $\log_2(maxvalue(x_i)) \cong k$ $y_0, y_1, y_2 \ldots y_{k-1} \in [0, 1]$ and $x_i = \sum_{j=0}^{k-1} y_j 2^j$ $y_0(1 - y_0) = 0$ $y_1(1 - y_1) = 0$ $\vdots$ $y_{k-1}(1 - y_{k-1}) = 0$ $x_i \in R \Rightarrow x_i$ is float $x_i \notin R \rightarrow x_i$ is transformed to floats:

$\forall x_i \in \text{Bool}, x_i \Rightarrow y_i \in [0, 1], y_i(1 - y_i) = 0$ $\forall x_i \in Z^+, x_i \Rightarrow \sum_{i=0}^{k} b_i 2^i = b_0 2^0 + b_1 2^1 + b_2 2^2 + \ldots + b_{k-1} 2^{k-1}$ where $maxvalue(x_i) = 2^k - 1$ $\log_2(maxvalue(x_i)) \cong k$ $y_0, y_1, y_2 \ldots y_{k-1} \in [0, 1]$ and $x_i = \sum_{j=0}^{k-1} y_j 2^j$ $y_0(1 - y_0) = 0$ $y_1(1 - y_1) = 0$ $\vdots$ $y_{k-1}(1 - y_{k-1}) = 0$ FIG. 10 shows transformation of the hypothetical mathematical model into a model employing only floating-point variables.

Next, the mathematical model is placed in standard form. The formal definition for a standard-form symbolic problem representation is provided as follows:

minimize C(x)

subject to:

$$\tilde{g}_i(x) \geq 0 \text{ for } i = 0 \text{ to } M_1 - 1$$

$$\tilde{h}_i(x) = 0 \text{ for } i = M_1 \text{ to } M_2 - 1$$

where $$x = \begin{bmatrix} x_0 \\ x_0 \\ x_0 \\ \vdots \\ x_0 \end{bmatrix} \text{ and } x_0 \in \mathcal{R}$$

In other words, a standard form model includes a cost function C(x), a number $M_1$ of inequality constraints of the form $$\tilde{g}_i(x) \geq 0$$

and a number of equality constraints of the form:

$$\tilde{h}_i(x) = 0$$

FIG. 11 shows the mathematical model for the hypothetical problem transformed to standard form. Note that transformation of the original equality and inequality constraints to constraints with 0 on the right-hand side, as needed for the standard form, is a simple matter of adding terms to both sides of the constraint equations that are not already in standard form.

The next step in the preprocessing routine (809 in FIG. 8) is to change all equality constraints to inequality constraints. In order to do so, each equality constraint is transformed to two inequality constraints, each inequality constraint involving the left-hand expression of the original equality constraint and a positive binding variable. Transformation of an equality constraint $h_j(x)$ to two inequality constraints is formally expressed as follows:

$$h_j(x) \to \begin{bmatrix} h_j(x) + s_j \geq 0 \\ -h_j(x) + s_j \geq 0 \end{bmatrix} \to \begin{bmatrix} g_{m+j}(x, s_j) \\ g_{m+j+1}(x, , s_j) \end{bmatrix}$$

In addition for each j, the constraint $$s_j \geq 0$$

is added to ensure that the constraints expressing $h_j(x)$ are feasible.

Figure 12A:
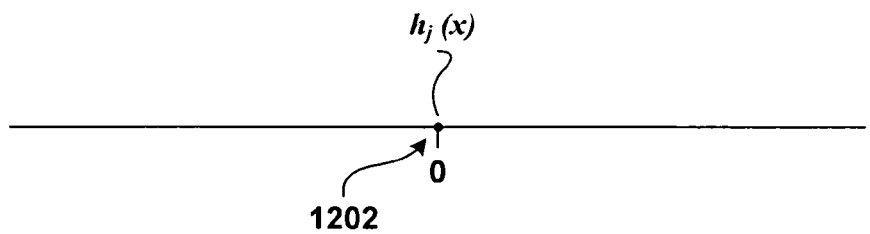
FIGS. 12A–D illustrate the effect of binding variables on transformed equality constraints.
Figure 12B:
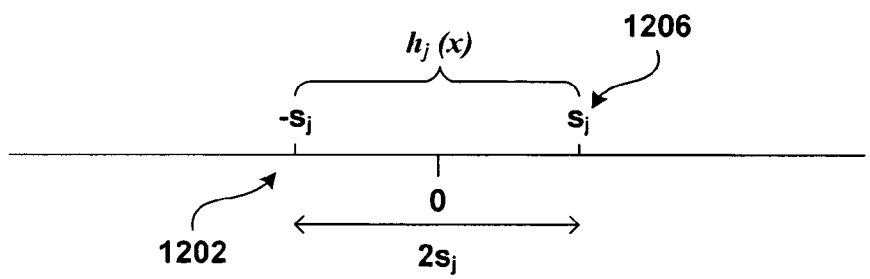
Figure 12C:
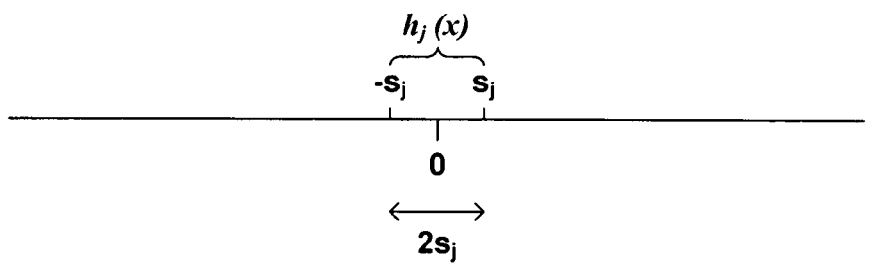
Figure 12D:
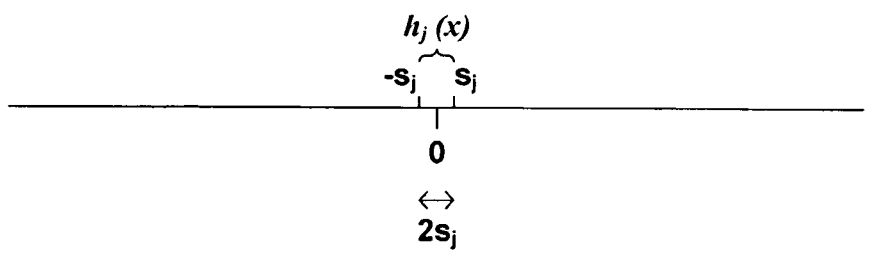

Thus, following transformation of equality constraints to inequality constraints, the total number of constraints increases by a number 2k equal to the original number of equality constraints in the standard-form model of the problem. FIGS. 12A–D illustrate the effect of binding variables on transformed equality constraints. FIG. 12A shows the original inequality constraint $h_j(x)$ with the value 0 (1202). When the equality constraint $h_j(x)$ is transformed to three inequality constraints, as discussed above, then the range of values for $h_j(x)$ expands about 0 to include all values between $-s_j$ 1204 and $s_j$ 1206. Thus, transforming an equality into three inequality constraints essentially relaxes the equality constraint from a point to an interval. Relaxing equality constraints facilitates the iterative optimization methods, to be described below, by preventing equality constraints from overconstraining, or dominating, the initial descent towards one or more local minima. Relaxing equality constraints also facilitates an interior-point descent, since equality constraints force optimization trajectories to problem-domain boundaries. However, as the optimization begins to converge, the relaxation of equality constraints needs to be removed. This is accomplished, as shown in FIGS. 12C and 12D, by decreasing the absolute value of the barrier variable sj in order to more and more tightly constrain the value of $h_j(x)$ to a small region symmetrically disposed about 0. The degree of relaxation of an equality constraint can be expressed by a coefficient $r_i$ for each binding variable $s_j$ added to the criterion. Transformation of equality constraints to inequality constraints can be formally expressed as:

minimize C(x)

constrained by:

$$g_i(x) \geq 0 \quad i = 0, 1, \ldots, m-1$$

$$h_j(x) = 0 \quad j = m, 1, \ldots, m+k-1$$

⇓

$$\text{minimize } \tilde{C}(x) = C(x) + \sum_{i=0}^{2k-1} r_i s_i$$

constrained by:

$$g_i(x) \geq 0 \quad i = 0, 1, \ldots, m+2k-1$$

Figure 14:
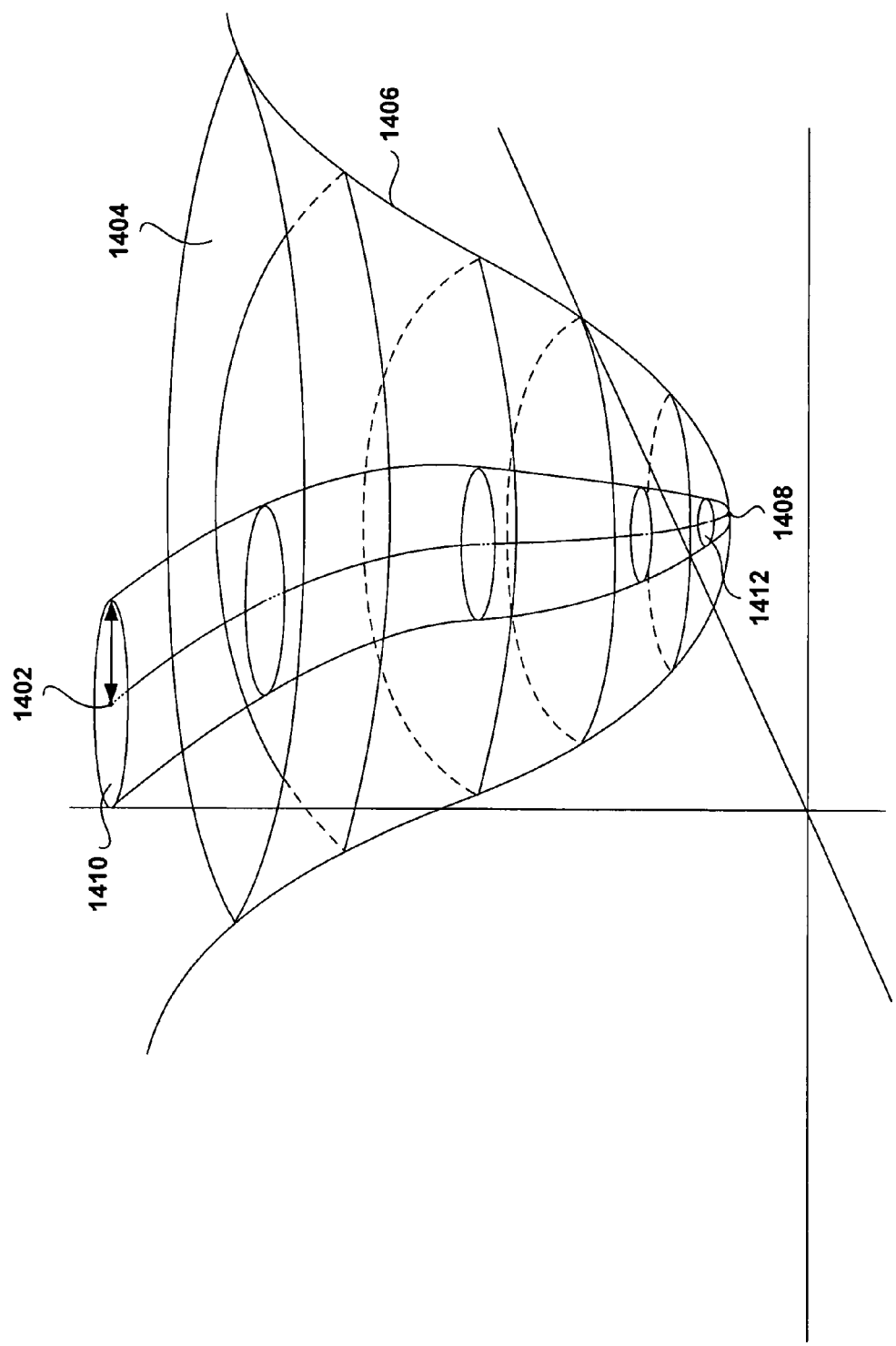
FIG. 14 graphically illustrates the effect of the binding variables.

FIG. 13 shows the symbolic, mathematically expressed model for the hypothetical problem following transformation of equality constraints to inequality constraints. FIG. 14 graphically illustrates the effect of the binding variables $r_i$. In FIG. 14, the optimization method begins at initial point 1402 and descends through a problem-domain 1404 bounded by the cup-shaped surface 1406 towards a minimum 1408. Initially, the coefficients $r_i$ for the binding variables $s_i$ are small, providing a large total range of values, shown in FIG. 14 by the disk-shaped region 1410, about the initial point 1402. As the descent through the problem domain approaches the minimum 1408, the coefficients $r_i$ of the binding variables se are increased, more and more tightly constraining the solution sets until, near the optimum 1408, the transformed equality constraints again become extremely tightly constrained 1412 because as the optimization method proceeds the $s_i$ become smaller and smaller.

The next step of the preprocessing routine involves adding an envelope variable z along with an additional constraint to the mathematical model of the problem (811 in FIG. 8). The envelope variable z is defined as follows:

$$z \geq \tilde{C}(x)$$

This leads to the following inequality constraint:

$$z - \tilde{C}(x) \geq 0$$

Following introduction of the envelope variable z, the formal statement of the problem becomes:
minimize z
with respect to $x_0, x_1, \ldots, x_{n-1}, s_0, s_1, \ldots, s_{k-1}, z$
constrained by:

$$g_i(x) \; i=0 \text{ to } m-1$$

$$g_j(x,s_j) \; j=0 \text{ to } 2k-1$$

$$z - \tilde{c}(x) \geq 0$$

FIG. 15 shows the mathematical model for the hypothetical problem following introduction of the envelope variable z.

Figure 16B:
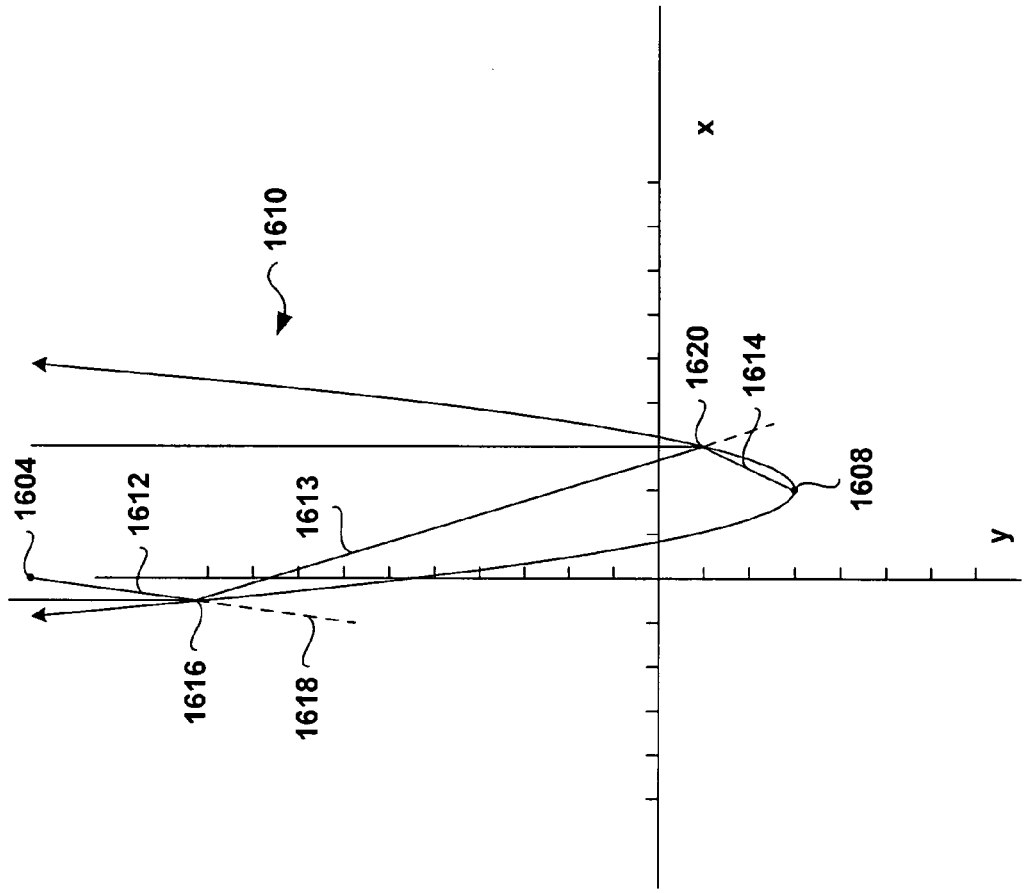
FIGS. 16A–D illustrate the concept of barrier functions.
Figure 16A:
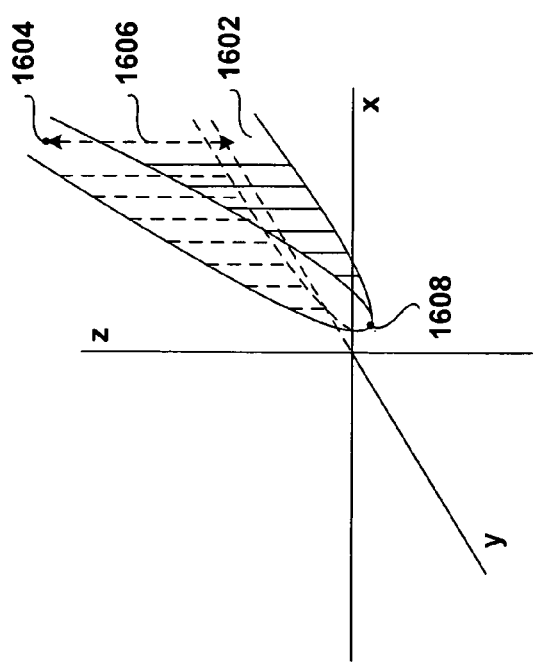

FIGS. 16A–D illustrate the concept of barrier functions. Assume, for example, that the problem domain for an optimization problem is the wedge-shaped volume with a parabolic base 1602 shown on FIG. 16A. An initial point for an optimization 1604 has a relatively large z-value 1601, which decreases to 0 at the minimum 1608. In FIG. 16B shows an x-y plane projection 1610 of the problem domain 1602. The optimization trajectory from the initial point 1604 to the minimal point 1608 is shown as three line segments 1612–1614. In an interior point method, when traversing the problem domain, the optimization trajectory must remain within the problem domain. In other words, the current point in a descent trajectory through the problem domain to a minimum must always remain within the problem domain, interior to the boundary of the manifold in a hyper-dimensional problem domain. For example, as shown in FIG. 16B, the initial trajectory 1612 is angled towards the edge of the volume corresponding to the problem domain, and would intersect the boundary at point 1616 and, if continued in the same direction, would pass through the boundary to points exterior to the problem domain along the dashed line segment 1618. In order to keep the trajectory of the optimization within the problem domain, it is necessary to include barrier functions within a problem model that have little or no effect within the problem domain, but rise to large values as the optimization trajectory nears the boundary surface of the problem domain, in order to deflect the trajectory back from the boundary into the problem domain. For example, in FIG. 16B, as the optimization trajectory 1612 approaches point 1616, the barrier functions added to the mathematical model begin to rapidly increase in order to drive the value of the envelope variable z to high values and therefore deflect the optimization trajectory away from the inner surface of the problem domain. Following deflection, a new optimization trajectory 1613 is established which leads, through continued optimization, to a new second approach to a boundary point 1620, just prior to which the barrier constraints again force the value of the objective function z to large values in order to again deflect the optimization trajectory back into the interior of the problem domain and to a new, final trajectory 1614.

Figure 16D:
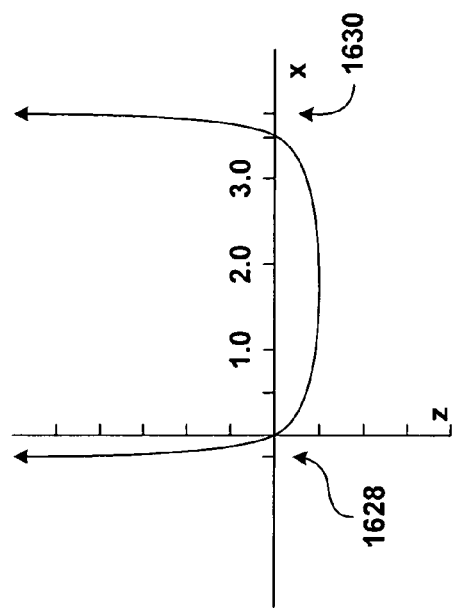
Figure 16C:
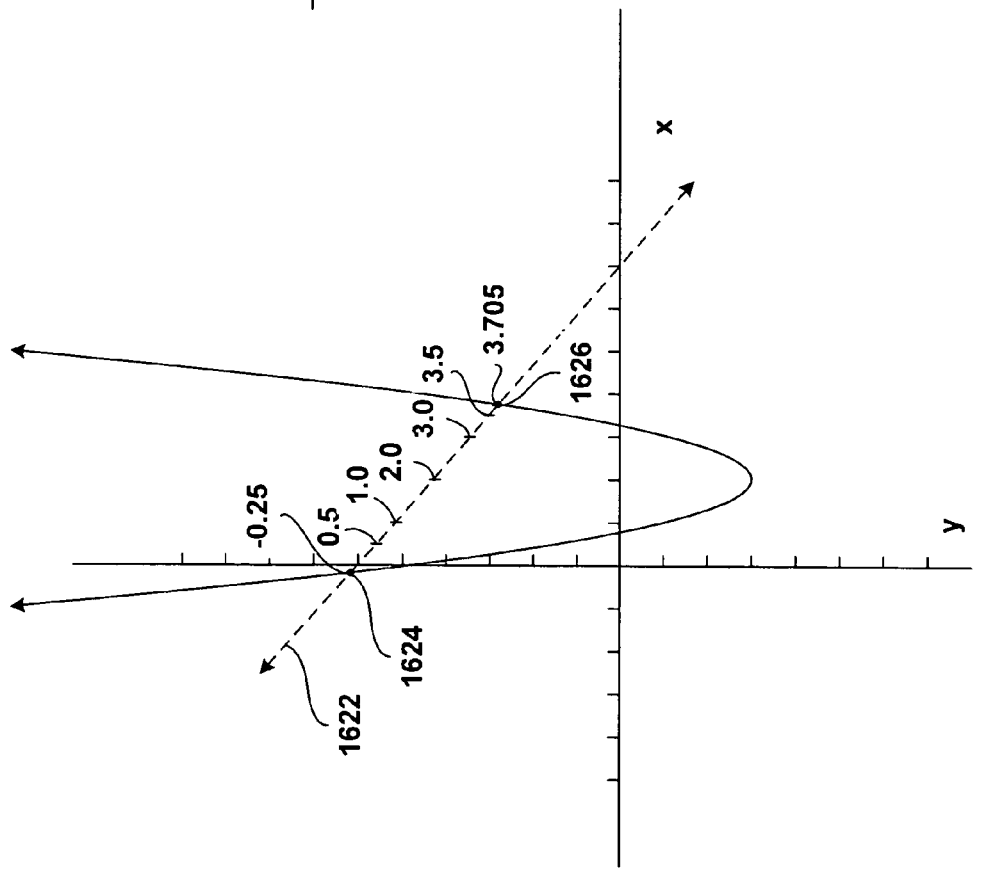

FIGS. 16C–D illustrate the operation of the barrier functions. Assuming a current optimization trajectory 1622, as shown in FIG. 16C, consider the value of the objective function z with respect to the x-coordinate, shown in FIG. 16D, for a traversal of the problem of the domain along the current trajectory 1622 shown in FIG. 16C. As can be seen in FIG. 16D, the value of z is relatively low for values of x within the interior of the problem domain along the current trajectory 1622. However, as x decreases towards the left boundary point 1624 or increases towards the right boundary point 1626, the barrier functions have the effect of rapidly increasing the value of z 1628 and 1639, respectively. In other words, for each inequality in the model, a term involving a barrier function is added to the interior point objective function in order to constrain trajectories to the interior of the problem domain. If a trajectory leaves the problem domain, or reaches the exterior of the enclosing surface of the problem domain, the optimization methods that represent some of the embodiments of the present invention could fail.

Adding terms involving barrier functions to the model is a simple way to ensure that the optimization-trajectory stays within the problem domain. A barrier function is added for each constraint, since it is the constraints that specify the surface enclosing the problem domain. A suitable barrier-function term for the optimization techniques employed in various embodiments of the present invention is the negative of a positive variable coefficient $u_i$, the control variable associated with the term, times the logarithm of the constraint expression $g_i$, or, in other words:

$$-u_i \log(g_i)$$

As the value of the constraint expression $g_i$ decreases towards 0, the value of the logarithm of the constraint $\log(g_i)$ decreases rapidly with a corresponding rapid increase in absolute value. By taking the negative of the log $(g_i)$, a rapidly increasing value is obtained as the constraint expression $g_i$ closely approaches 0, approaching infinity in the limit, thus preventing the constraint from ever decreasing to 0. The variable coefficients $u_i$ can be considered to be control variables, much like the coefficients $r_i$ of the above-described binding variables. The $u_i$ and $r_i$ coefficients are modified, during an optimization, in order to steer the optimization trajectory in a most efficient manner towards local minima. However, unlike the $r_i$ coefficients, the $u_i$ coefficients are initially large, and are decreased by one of the embodiments of this invention. as the optimization trajectory approaches a local minimum, since local minima often fall close to, or on the surface of, the problem domain. A formal expression the addition of barrier functions to the objective function is provided as follows:

$$\underset{x,s,z}{\text{minimize}} F(x, s, z, u, r) = z - \sum_{i=0}^{i=m+2k} u_i \log(g_i(x, s, z, r))$$

FIG. 17 shows the symbolic, mathematical model for the hypothetical problem following addition of barrier constraints. The addition of the barrier functions completes the preprocessing steps embodied in the preprocessing routine in a first, described embodiment.

Figure 18:
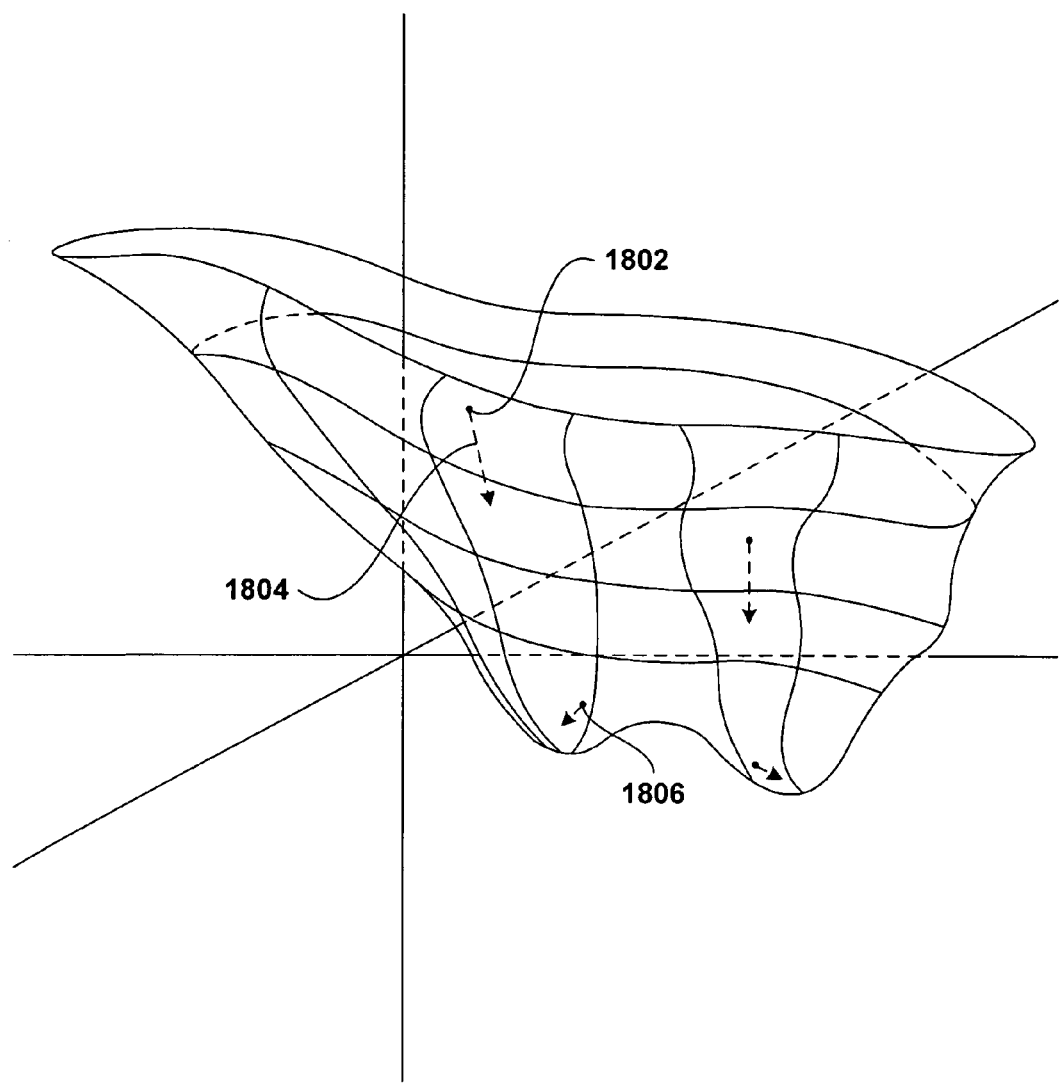
FIG. 18 illustrates the use of a gradient field within a problem domain in order to provide a direction for an optimization trajectory leading from an initial point to a local minimum.

Next, an overview of the core optimization method that represents one embodiment of the present invention is provided. FIG. 18 illustrates the use of a global gradient descent field within a problem domain in order to provide a direction for an optimization trajectory leading from an initial point to a local minimum. At each point within the problem domain, such as point 1802, the partial derivative vector of the objective function $F(x,s,z,u,r)$ may be calculated as a vector of first partial derivatives of the objective function with respect to the decision variables $x_i$, the binding variables $s_i$, and the envelope variable z. Similarly the Hessian of the function $F(x,s,z,u,r)$ given as the matrix of second partial derivatives of $F(x,s,z,u,r)$ with respect to the decision variables $x_i$, the binding variables $s_j$, and the envelope variable z can be computed at every point of the domain The gradient of the objective function is defined as the vector at each point in the domain computed as the product of the inverse of the Hessian and the partial derivative of F(x,s,z,u,r). It provides a direction 1804 from the point 1802 representing a descent direction in the value of the objective function with respect to the decision variables and binding variables. Since a gradient can be calculated for each point within the problem domain, the gradient of the objective function specifies a vector field, pointing in a direction of descent and, specifying a path to a minimum within the problem domain. In general, gradients for points, such as point 1802 in FIG. 18, far from local minima have relatively large absolute values, while gradients for points close to a local minima, such as point 1806, have gradients with relatively small absolute values.

The mathematical description of the optimization methods is facilitated by a number of notational conventions. First, the objective function F(x,s,z,u,r)

can be expressed as:

$$f(y, u, r)$$

with $$\begin{bmatrix} x \\ s \\ z \end{bmatrix} = y$$

$$\begin{bmatrix} u_0 \\ u_1 \\ \vdots \\ u_{m+2k} \end{bmatrix} = u$$

$$\begin{bmatrix} r_0 \\ r_1 \\ \vdots \\ r_{2k-1} \end{bmatrix} = r$$

Thus, the objective function can be thought of as a function of a vector y of decision variables, binding variables, and the envelope variable, the vector u, a vector of barrier-function coefficients, and the vector r, a vector of binding variable coefficients. The vector y is referred to as the "state vector," and the vectors u and r are referred to as "control vectors." The vector y has N elements, where N=n (decision variables)+k (binding variables)+1 (envelope variable).

Figure 19:
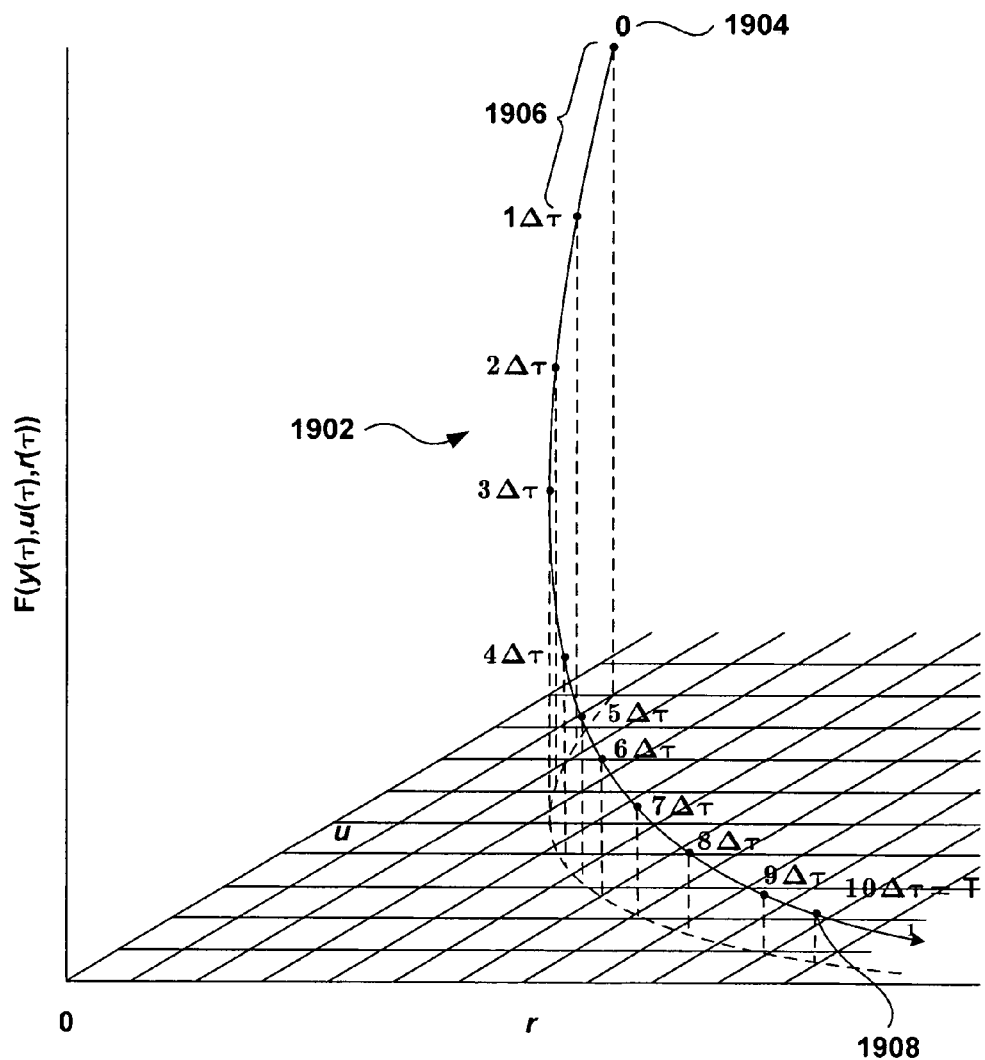
FIG. 19 illustrates an optimization trajectory.

FIG. 19 illustrates an optimization trajectory. The trajectory 1902 is plotted with respect to the lengths of vectors r and u as horizontal axes, and the value of the objective function F as a vertical axis. The optimization trajectory begins at an initial point 1904 and descends in the value of the objective function F towards a local minimum. During the descent, the value of the barrier functions expressed by the length of vector u, decreases towards 0, while the value of the coefficients of the binding variables, as expressed as the length of vector r, increases. The trajectory is divided into segments of length $\Delta\tau$, such as a first segment 1906. During optimization, the vectors y and u are continuously recalculated to drive the value of the objective function lower. In FIG. 19, the value of the binding variable coefficients, represented as vector r, is also shown to be recalculated during each $\Delta\tau$ interval, although in the described embodiment of the present invention, the binding variable coefficients are adjusted only towards the end of an optimization trajectory.

The discrete optimization technique may be expressed as follows:

$$y_{k+1} = y_k + \phi_k(y_k, r_k, u_k)$$

where k=0, 1, . . . , $k_{convergence}$. In other words, a new state-vector value $y_{k+1}$ is computed, in each iteration of a computational optimization method, from a current state-vector value $y_k$ and a discrete function $\phi_k$ that depends on $y_k$, $r_k$, and $u_k$, with the iteration count k ranging from 0 to a value $k_{convergence}$ at which point the state vector for a local minimum of the objective function might be determined. In a first step of optimization, the state and control vectors, y, u, and r may be parameterized by a continuous iteration parameter $\tau$, where $\tau$ ranges from 0 to an iteration horizon T. By parameterizing vectors y, U, and r by the continuous iteration variable $\tau$, the iteration above is transformed to a first order differential equation in which the y variable is the dependent variable and u, and r are control variables. Well-known differential-equation-based mathematical technique can be used for computing efficient optimization trajectories as solutions of this differential equation. This is discussed below. The objective function is now expressed formally as:

$$F(y(\tau), u(\tau), r(\tau))$$

where $0 \leq \tau \leq T$. For example if iteration $y_{k+1} = y_k + \phi_k(y_k, r_k, u_k)$ is the Newton iteration, the corresponding differential equation has the following form $$\frac{dy}{d\tau} = H^{-1}(y(\tau), u(\tau), r(\tau)) G(y(\tau), u(\tau), r(\tau))$$

It should be noted that Newton's method is but one approach to construct the differential equation providing an expression for $$\frac{dy}{d\tau}.$$

It was chosen for simplicity and for ease of computation. However, any of many other approaches may be used in embodiments of the present invention for approximating $$\frac{dy}{d\tau}.$$

In the following discussion, the partial derivative vector G and Hessian matrix H for the objective function F are frequently used. The partial derivative vector G is defined as follows:

$$G(y(\tau), u(\tau), r(\tau)) = \left( \frac{\partial F(y(\tau), u(\tau), r(\tau))}{\partial y(\tau)} \right)^T$$

-continued $$= \begin{bmatrix} \frac{\partial F(y(\tau), u(\tau), r(\tau))}{\partial y_0(\tau)} \\ \frac{\partial F(y(\tau), u(\tau), r(\tau))}{\partial y_1(\tau)} \\ \vdots \\ \frac{\partial F(y(\tau), u(\tau), r(\tau))}{\partial y_{N-1}(\tau)} \end{bmatrix}$$

The Hessian matrix H is a matrix of size N×N, defined as follows:

$$H(y(\tau), u(\tau), r(\tau)) = \left[\frac{\partial G}{\partial y}\right]^T (y(\tau), u(\tau), r(\tau))$$

$$= \begin{bmatrix} \frac{\partial G_0}{\partial y_0} & \frac{\partial G_1}{\partial y_0} & \frac{\partial G_2}{\partial y_0} & \cdots & \frac{\partial G_{N-1}}{\partial y_0} \\ \frac{\partial G_0}{\partial y_1} & \frac{\partial G_1}{\partial y_1} & \frac{\partial G_2}{\partial y_1} & \cdots & \frac{\partial G_{N-1}}{\partial y_1} \\ \vdots & \vdots & \vdots & & \vdots \\ \frac{\partial G_0}{\partial y_{N-1}} & \frac{\partial G_1}{\partial y_{N-1}} & \frac{\partial G_2}{\partial y_{N-1}} & \cdots & \frac{\partial G_{N-1}}{\partial y_{N-1}} \end{bmatrix}$$

$(y(\tau), u(\tau), r(\tau))$ $$= \begin{bmatrix} \frac{\partial G_0}{\partial y_0} & \frac{\partial G_0}{\partial y_1} & \cdots & \cdots & \frac{\partial G_0}{\partial y_{N-1}} \\ \frac{\partial G_1}{\partial y_0} & \frac{\partial G_1}{\partial y_1} & \cdots & \cdots & \frac{\partial G_1}{\partial y_{N-1}} \\ \frac{\partial G_2}{\partial y_0} & \frac{\partial G_2}{\partial y_1} & \cdots & \cdots & \frac{\partial G_2}{\partial y_{N-1}} \\ \vdots & \vdots & & & \vdots \\ \frac{\partial G_{N-1}}{\partial y_0} & \frac{\partial G_{N-1}}{\partial y_1} & \cdots & \cdots & \frac{\partial G_{N-1}}{\partial y_{N-1}} \end{bmatrix}^T$$

$(y(\tau), u(\tau), r(\tau))$ $$= \begin{bmatrix} \frac{\partial^2 F(y(\tau), u(\tau), r(\tau))}{\partial y_0^2} & \cdots & \frac{\partial^2 F(y(\tau), u(\tau), r(\tau))}{\partial y_0 \partial y_{N-1}} \\ \vdots & & \vdots \\ \frac{\partial^2 F(y(\tau), u(\tau), r(\tau))}{\partial y_{N-1} \partial y_0} & \cdots & \frac{\partial^2 F(y(\tau), u(\tau), r(\tau))}{\partial y_{N-1} \partial y_{N-1}} \end{bmatrix}$$

The normalized rate of change of the state vector y with respect to the continuous iteration variable $\tau$, $$\frac{dy}{d\tau} = -\frac{H^{-1}G}{G^T H^{-1} G}(y(\tau), u(\tau), r(\tau))$$

when expressed in terms of the Hessian matrix H and vector G, or as:

$$\frac{dy}{d\tau} = -\frac{w(\tau)}{\rho(y(\tau), u(\tau), r(\tau))}$$

where $w(\tau) = H^{-1} G(y(\tau), u(\tau), r(\tau))$ and $\rho(y(\tau), u(\tau), r(\tau)) = G^T H^{-1} G(y(\tau), u(\tau), r(\tau))$.

The optimization problem can be recast into a minimum time problem which is a special case of a generic, optimal control problem. In other words, by continualization of the objective function F(y,U,r), continuous methods can be used to obtain a computational approach for computing an optimization trajectory y(τ) consisting of state-variable changes that bring the value of the objective function F(y,u,r) from an initial point to a minimum. However, the problem domain is enormous, and hyper-dimensional, and so, without further computational constraints, or meta-level constraints, although a method for descending the gradient field within the problem domain has been obtained, the problem of computationally descending the gradient field is slow convergent.

An optimal control problem is formulated. It seeks to speed-up the convergence by minimizing the convergence horizon and satisfying the requirements on the control variables. In order to control minimization of the objective function F(y(τ), u(τ), r(τ)) the optimal control formulation is used to steer, using the control variables u(τ), r(τ), the optimization trajectory by selecting values for the control variables that minimize the convergence horizon. The optimal control problem for controlling the optimization trajectory is formally expressed as follows:

$$\min_{u,r} \mathcal{J}(u(\tau), r(\tau), T) = \int_o^T d\tau + \frac{1}{2} G^T Q G(y(T), u(T), r(T))$$

with respect to u(τ), r(τ), τ∈[0, T], where, Q is a symmetric positive definite matrix, subject to the constraints:

$$\frac{\partial y}{\partial \tau} = -\frac{w(\tau)}{\rho(y(\tau), u(\tau), r(\tau))} \text{ for } \tau \in [0, T] \quad (1)$$

$$u_i \in (0, u_{max_i}) \; \forall i \quad (2)$$

$$u_i(\tau + \Delta \tau) \leq u_i(\tau) \; \forall i \quad (3)$$

$$r_i \in [r_{min_i}, \infty) \; \forall i \quad (4)$$

$$r_i(\tau + \Delta \tau) \geq r_i(\tau) \; \forall i \quad (5)$$

Minimization of the objective functional for the minimum convergence horizon problem, $\mathcal{J}(u(\tau), r(\tau), T)$, forces F(y(τ), u(τ), r(τ)) to converge to a minimum, where G=0, in the smallest computational horizon T, where the convergence interval is the integral of the continuous iteration variable. The solution to the optimal control problem provides an optimal control policy u*(τ) and r*(τ), τ∈[0, T] that generates a state-vector-change optimization trajectory y*(τ). The first term in the integral defining the objective function $\mathcal{J}(u(\tau), r(\tau), T)$ forces the optimization trajectory to an efficient as possible trajectory y* with respect to the continuous iteration variable τ. The second term within the integral forces the vector G towards 0, thereby forcing the objective function F to a minimum. The combination of these terms therefore produces an optimal control policy u*(τ) and r*(τ) to force the objective function F to a local minimum through an optimal state-vector-change trajectory y*(τ). Now the constraints of the optimal control problem (1)–(5) are discussed. The first constraint involves the normalized steepest descent for the state-vector-change trajectory, and is the primary vehicle by which the original optimization problem is incorporated into the new minimum-time control problem. The second and third constraints ensure that the control vector values u remains non-negative and less than some maximal control value $u_{max_i}$ and that the u-vector values do not increase during the optimization process. The fourth and fifth constraints are analogous to the second interior constraints with respect to the binding variable coefficients $r_i$. The fourth and fifth constraints ensure that the binding variable coefficients $r_i$ do not fall below a minimum value $r_{min_i}$, and that the binding variable coefficients $r_i$ do not decrease during the optimization process.

A primary result of optimal control theory, known as the Pontryagin "Minimum Principle," provides a framework for the minimum convergence horizon problem to produce an optimal control policy u*(τ) and r*(τ)τ∈[0, T] for finding an optimal state-vector-change optimization trajectory y*(r). This approach involves the Hamiltonian function, defined as follows:

$$\mathcal{H} = 1 - p^T(\tau) \frac{w(\tau)}{\rho(y(\tau), u(\tau), r(\tau))}$$

The Hamiltonian has a minimum value as a function of u and r at u*(τ) and r*(τ). In other words, the Hamiltonian has a minimum value for the optimal control policy. When the control policy u*(τ) is optimal, there exists an absolutely continuous function p(τ), called the costate, such that the derivatives of the state and costate functions y(τ) and p(τ) are as follows for all τ∈[0, T]:

$$\frac{dy^*(\tau)}{d\tau} = \frac{\partial \mathcal{H}(y^*(\tau), u^*(\tau), p(\tau))}{\partial p}$$

$$\frac{dp(\tau)}{d\tau} = -\left(\frac{\partial \mathcal{H}(y^*(\tau), u^*(\tau), p(\tau))}{\partial y}\right)$$

satisfying the boundary conditions:

$$y^*(0) = y_0$$

$$p(T) = \frac{\partial G^T(y(T), u(T), r(T))QG(y(T), u(T), r(T))}{\partial y}$$

for all $u(\tau)$, $\mathcal{H}(y^*(\tau), u^*(\tau), p(\tau)) \leq \mathcal{H}(y^*(\tau), u(\tau), p(\tau))$.

The control problem solution is summarized as follows:

$$\frac{dy^*}{d\tau} = -\frac{w}{\rho}$$

$$\frac{dp}{d\tau} = \frac{\partial}{\partial y}\left(\frac{w}{\rho}\right)p(\tau)$$

$$y^*(0) = y_0$$

$$p(T) = H(T)QG(T)$$

-continued $$p^T \frac{w(y^*(\tau), u^*(\tau), r^*(\tau))}{\rho(y^*(\tau), u^*(\tau), r^*(\tau))} \geq p^T \frac{w(y^*(\tau), u(\tau), r(\tau))}{\rho(y^*(\tau), u(\tau), r(\tau))}$$

The Hamiltonian is analogous to the Hamiltonian of a mechanical system, which expresses the total energy of a mechanical system. The function y*(τ) is analogous to specifying the lowest energy positions of the components of a mechanical system in a continuous time interval, and the costate function p*(τ) is analogous to specifying the lowest energy momentum of components of a mechanical system in a continuous time interval. Using the above-derived results allows for computation, in a forward direction, along the optimization trajectory, of the partial derivative $$\frac{\partial y^*}{\partial \tau}$$

The partial derivative $$\frac{\partial p}{\partial \tau}$$

can be computed backward from τ=T from the forward-computed y*(τ). Again, with analogy to a classical mechanical problem, the momentum of the components of a mechanical system are essentially determined from the change in position of the components, over time. Thus, momentum, or costate, needs to be computed backwards from forward computed positions.

Minimization of the Hamiltonian is itself an optimization problem, and produces the optimal control policy when the Hamiltonian is minimized. This minimization problem can also be solved using Newton's approximation method, as follows:

$$\frac{\partial \mathcal{H}}{\partial u} = 0 \text{ and } \frac{\partial \mathcal{H}}{\partial r} = 0$$

$$\begin{bmatrix} u(\tau_{k+1}) \\ r(\tau_{k+1}) \end{bmatrix} = \begin{bmatrix} u(\tau_k) \\ r(\tau_k) \end{bmatrix} -$$

$$\begin{bmatrix} \frac{\partial^2 \mathcal{H}}{\partial u^2} & \frac{\partial^2 \mathcal{H}}{\partial u \partial r} \\ \frac{\partial^2 \mathcal{H}}{\partial r \partial u} & \frac{\partial^2 \mathcal{H}}{\partial r^2} \end{bmatrix}^{-1} \begin{bmatrix} \frac{\partial \mathcal{H}}{\partial u} \\ \frac{\partial \mathcal{H}}{\partial r} \end{bmatrix} (y(\tau_k), u(\tau_k), r(\tau_k), p(\tau_k))$$

where $$\Phi_\kappa(y(\tau_k), u(\tau_k), r(\tau_k), p(\tau_k)) =$$

$$\begin{bmatrix} \frac{\partial^2 \mathcal{H}}{\partial u^2} & \frac{\partial^2 \mathcal{H}}{\partial u \partial r} \\ \frac{\partial^2 \mathcal{H}}{\partial r \partial u} & \frac{\partial^2 \mathcal{H}}{\partial r^2} \end{bmatrix}^{-1} \begin{bmatrix} \frac{\partial \mathcal{H}}{\partial u} \\ \frac{\partial \mathcal{H}}{\partial r} \end{bmatrix} (y(\tau_k), u(\tau_k), r(\tau_k), p(\tau_k))$$

Thus, formulation of the minimum time problem and optimal control problem provides a method for computing state vector y and control vectors u and r in a forward direction, and computing the costate vector p in a backward direction, over a range of the continuous iteration variable τ between 0 and a horizon T. This then leads to an iterative optimization method by which the objective function F is forced to a local minimum via an optimal state-vector-trajectory y*(τ) under an optimal control policy u*(τ) and r*(τ).

Figure 20:
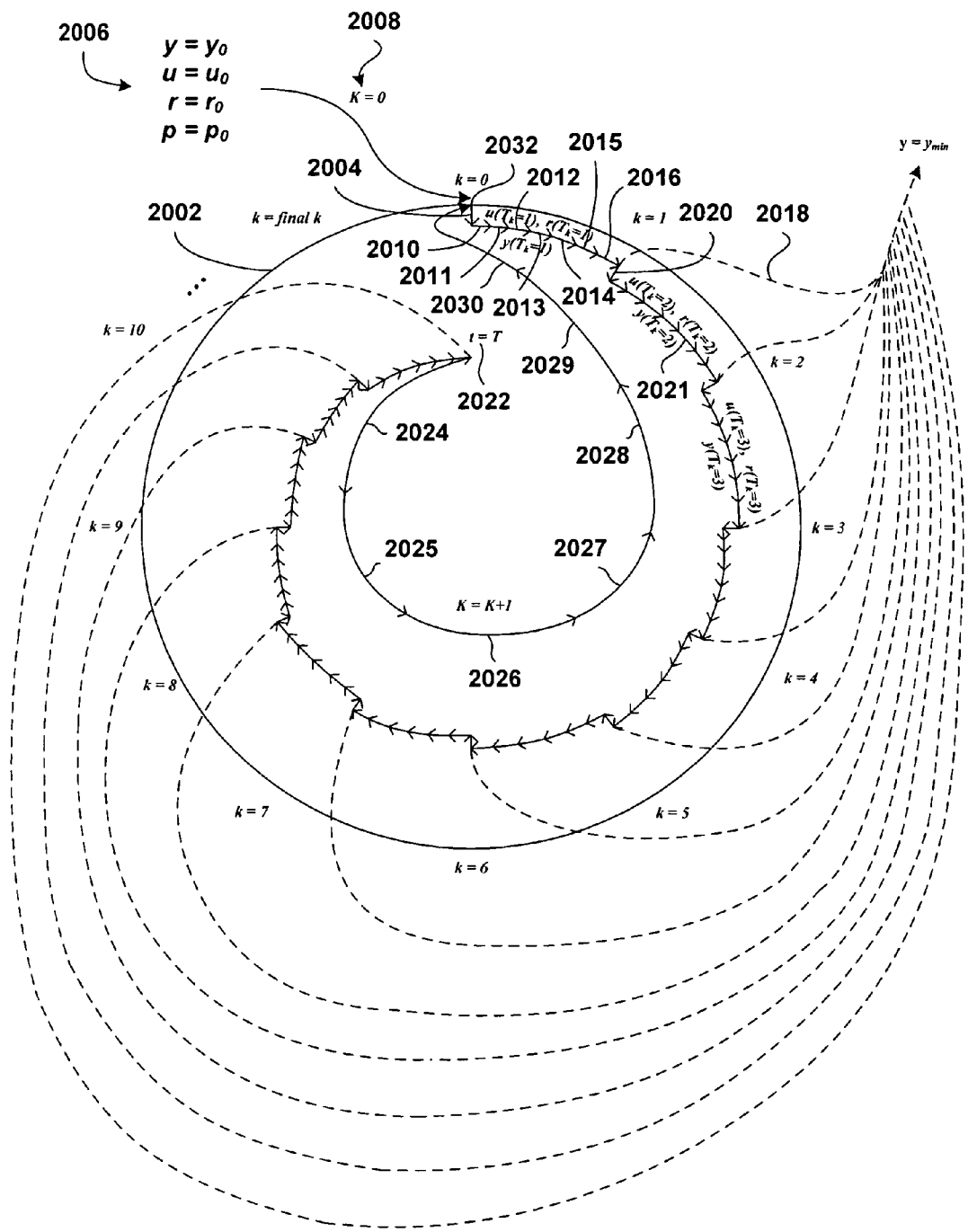
FIG. 20 graphically illustrates an iterative optimization method based on a near-optimal state-vector trajectory y* and near-optimal control policies u* and r*.

FIG. 20 graphically illustrates the iterative optimization method based on the above-derived state-vector-change optimization trajectory y* and optimal control policies u* and r*. The iterative optimization method can be thought of as comprising two nested loops, an outer loop controlled by the iteration variable K and the inner loop controlled by the iteration variable k. The outer nested loop represents integration of the partial differentials of the state-vector-trajectory and control policy over a continuous iteration range of 0 to T in order to find a state vector y that minimizes the objective function F. Within each such outer-loop iteration, multiple forward computations of the control policy vectors u and r and the state vector y over small intervals of the continuous iteration variable τ are carried out in steps $\tau_k$, where k goes from 0 to a final k value, or, in other words, $\tau_0, \tau_1, \tau_2, \ldots, \tau_{final}$, and then, at $\tau_{final} \geq T$, the results of the computations of $y(\tau_k)$ and $u(\tau_k)$ are used to back calculate the costate vectors $p(\tau_k)$ from τ=T to τ=0. During each inner loop, the computation of the $y(\tau_k)$ values are based on prior computation of $u(\tau_k)$ and $r(\tau_k)$, and the computation of both the $y(T_k)$ and $u(\tau_k)$ are carried out using costate values $p(\tau_k)$ computed at the end of a previous iteration of the outer loop. In the first iteration, the control costate values are approximated as a constant value.

In FIG. 20, the outer loop is represented by the outer circle 2002, and the inner-loop computations are represented by step-like radial and circumferential segments, such as step 2004. The iterative optimization process begins with initial values for the state vector, control vectors, and costate vector of $y_0$, $u_0$, $r_0$, and $p_0$, respectively 2006. The outer-loop iteration variable K is set to 0 (2008). Then, a number of step-like, inner-loop iterations are carried out, beginning with iteration k=0, each successive iteration of the inner loop incrementing the inner-loop variable k by one. In the first, inner-loop iteration, control vectors $U(\tau_{k+1})$ and $r(\tau_{k+1})$ are computed 2004. Then, the value of the state vector at $\tau=\tau_{k+1}$, $y_{(\tau k+1)}$, is computed by a number of successive computations 2010–2016. At the end of the first iteration of the inner loop, a determination is made as to whether a local minimum has been reached. If so, then the iterative optimization method terminates, indicated in FIG. 20 by the dashed line 2018. Otherwise, a next inner-loop iteration is carried out 2020–2021. Inner-loop iterations continue until $\tau_k \geq T$ 2022, at which point the costate vector values p(τ) are computed in a number of steps 2024–2030 from τ=T to τ=0, and the outer-loop iteration control variable K is incremented to conclude a full outer-loop iteration and return to the beginning point 2032 for a next outer-loop iteration.

Figure 21:
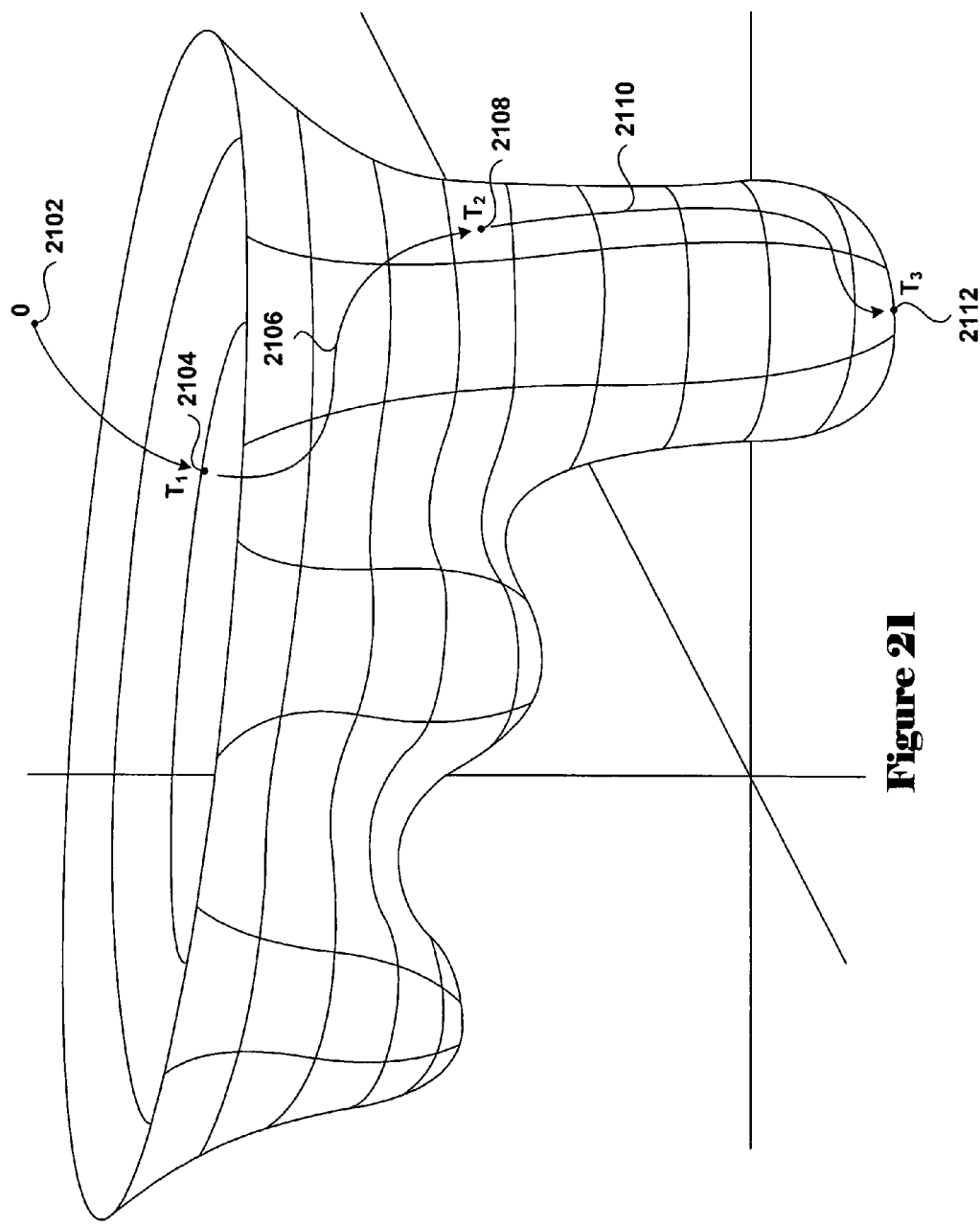
FIG. 21 provides additional, graphical illustration of the overall iterative optimization method.

Considering FIGS. 19 and 20 together provides a graphical, conceptual view of the iterative optimization process. Each inner-loop iteration of the optimization process can be considered to correspond to a segment in the optimization trajectory shown in FIG. 19, such as segment 1906. One full outer-loop iteration, from τ=0 to τ=T can be considered to produce a large segment of the optimization trajectory, such as the optimization trajectory segment beginning at initial point 1904 and extending down to point 1908. Multiple outer-loop iterations therefore compute a number of large optimization trajectory segments that eventually drive the state vector y to a value at which the objective function F is at least a local minimum. FIG. 21 provides additional, graphical illustration of the overall iterative optimization method. As shown in FIG. 21, a first outer-loop iteration produces the optimization trajectory segment from an initial point 2102 to point 2104. A second outer-loop iteration computes the optimization trajectory segment 2106 from point 2104 to point 2108. Third outer-loop iteration produces the optimization trajectory segment 2110 from point 2108 to local optimum 2112. Note that the value of the horizon, T, may change with each outer-loop iteration. Thus, in FIG. 21, the endpoint of each optimization trajectory segment is marked $T_K$, with K=1, 2, and 3, indicating that the endpoint of each outer-loop iteration serves as the initial point for each subsequent outer-loop iteration. It should also be noted that the magnitude of Δτ for each inner-loop step may also vary.

Figure 22:
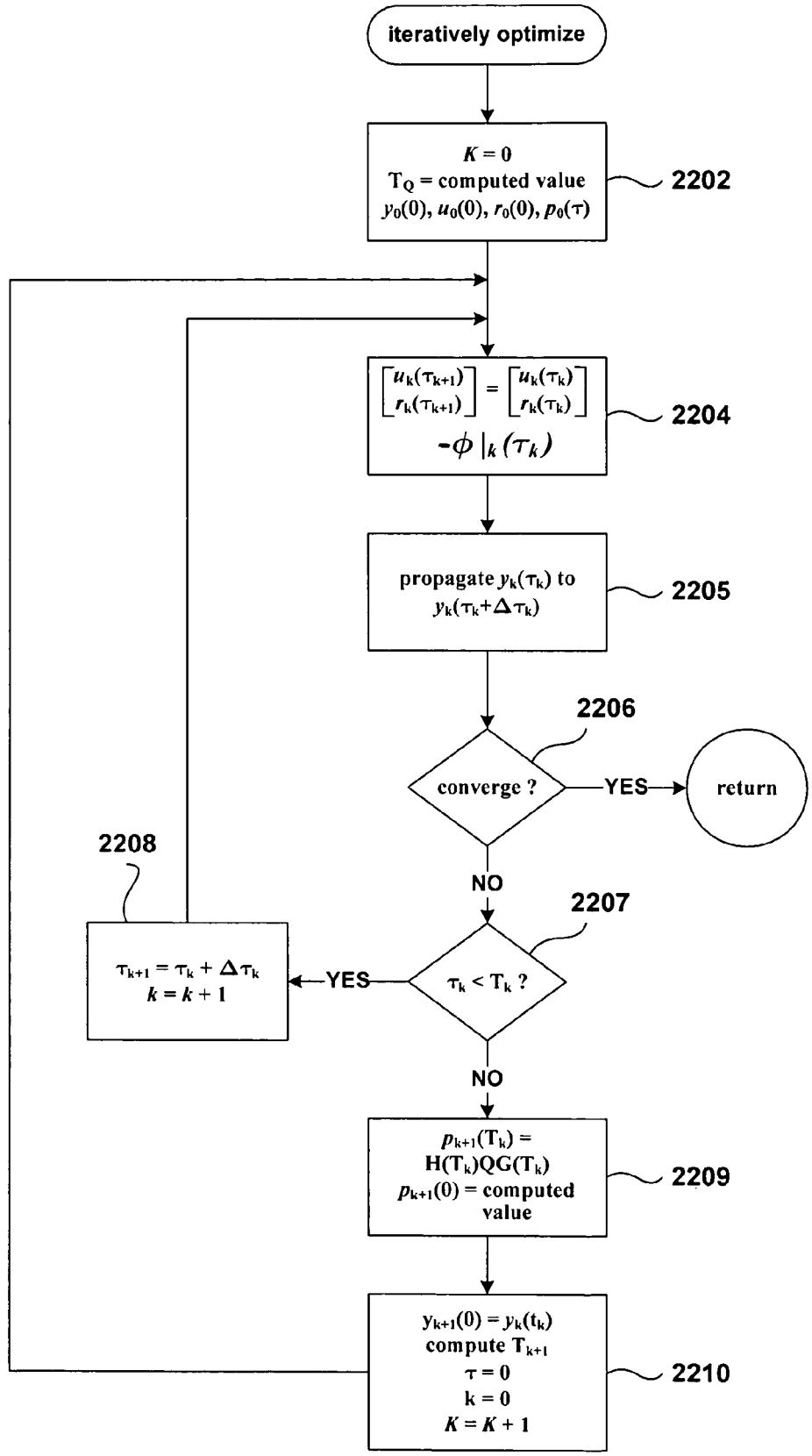
FIG. 22 is a control-flow diagram that describes the iterative optimization step (203 in FIG. 2).

FIG. 22 is a control-flow diagram that describes, in general, the iterative optimization step (203 in FIG. 2). First, initial values for y, u, r, and p are chosen, the outer-loop iteration variable K is initially set to 0, and an initial horizon $T_0$ is computed in step 2202. Next, in an inner loop comprising steps 2204–2208, the control vectors u and r and state vector y are propagated forward from τ=0 to τ=$T_K$ in τ increments of $\tau_k$. First, in step 2204, a next value for the control vectors u and r is computed. Then, in step 2205, the state vector y is propagated from τ=$\tau_k$ to τ=$\tau_k+\Delta\tau_k$ in step 2205. In step 2206, a determination is made as to whether the optimization has converged. If so, then the iterative optimization has completed, and returns. Otherwise, a determination is made as to whether $\tau_k+\Delta\tau$ remains less than $T_K$, in step 2207. If not, then $\tau_{k+1}$ is assigned to $\tau_k+\Delta\tau$, and the inner-loop control variable k is incremented, in step 2208. However, if $\tau_k$ is greater than or equal to $T_K$, then the costate values are computed backwards from $T_K$ to 0, in step 2209, and the iteration variables and a database containing the computed values of the state vector, control vectors are updated in step 2210.

Figure 23:
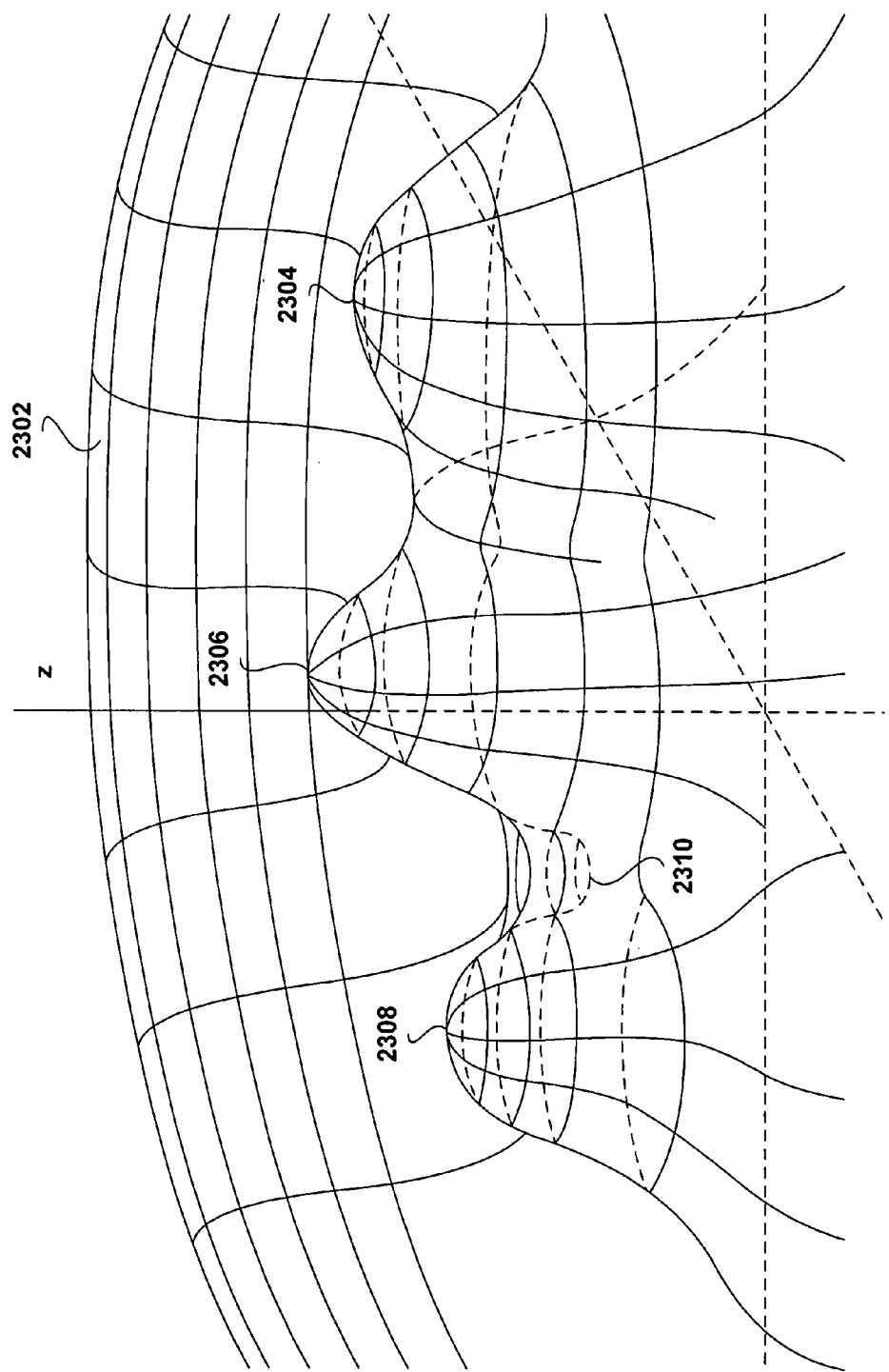
FIG. 23 shows a surface boundary for a bowl-shaped problem domain with a number of prominent central protrusions.

In convex problems, in which there is a single critical point, the iterative optimization method described above with reference to FIGS. 19–21 normally can converge in a single thread within a reasonable amount of time even for extremely large hyper dimensional problem domains with thousands of decision variables. However, optimization problems in applications are usually not convex, and the problem domains may feature many critical points. FIG. 23 illustrates one such problem domain. In FIG. 23, the surface boundary for the problem domain 2303 is bowl-shaped with a number of prominent central protrusions, such as protrusion 2304. These protrusions may be thought of as a small mountain range with three peaks (2304, 2306 and 2308) and a deep local valley, or bowl 2310. The global optimization amount for the problem domain lie deeply below the mountain range in the depths of the outer bowl.

Figure 24:
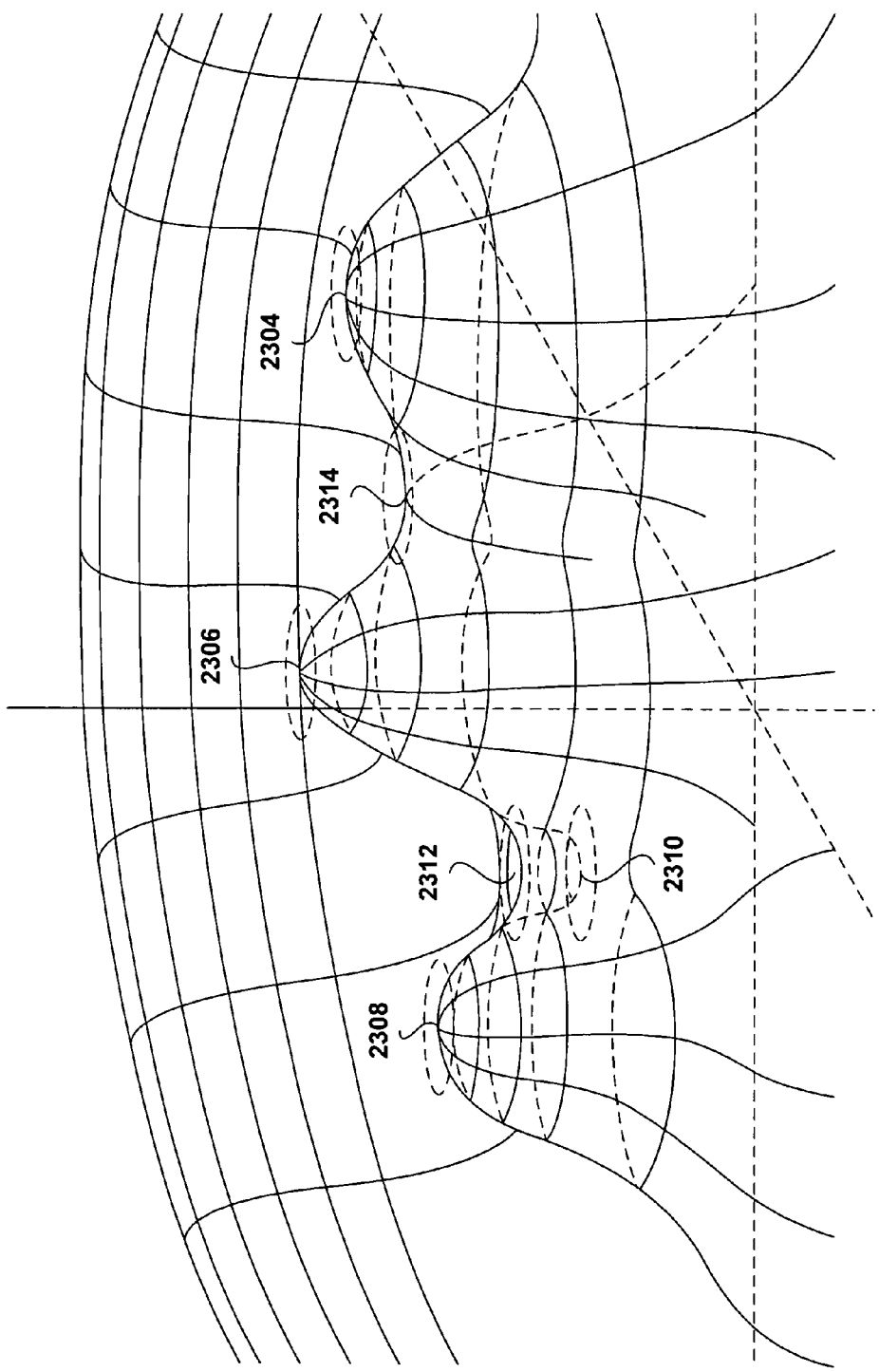
FIG. 24 shows the same problem domain as shown in FIG. 23 with critical points explicitly indicated.
Figure 25:
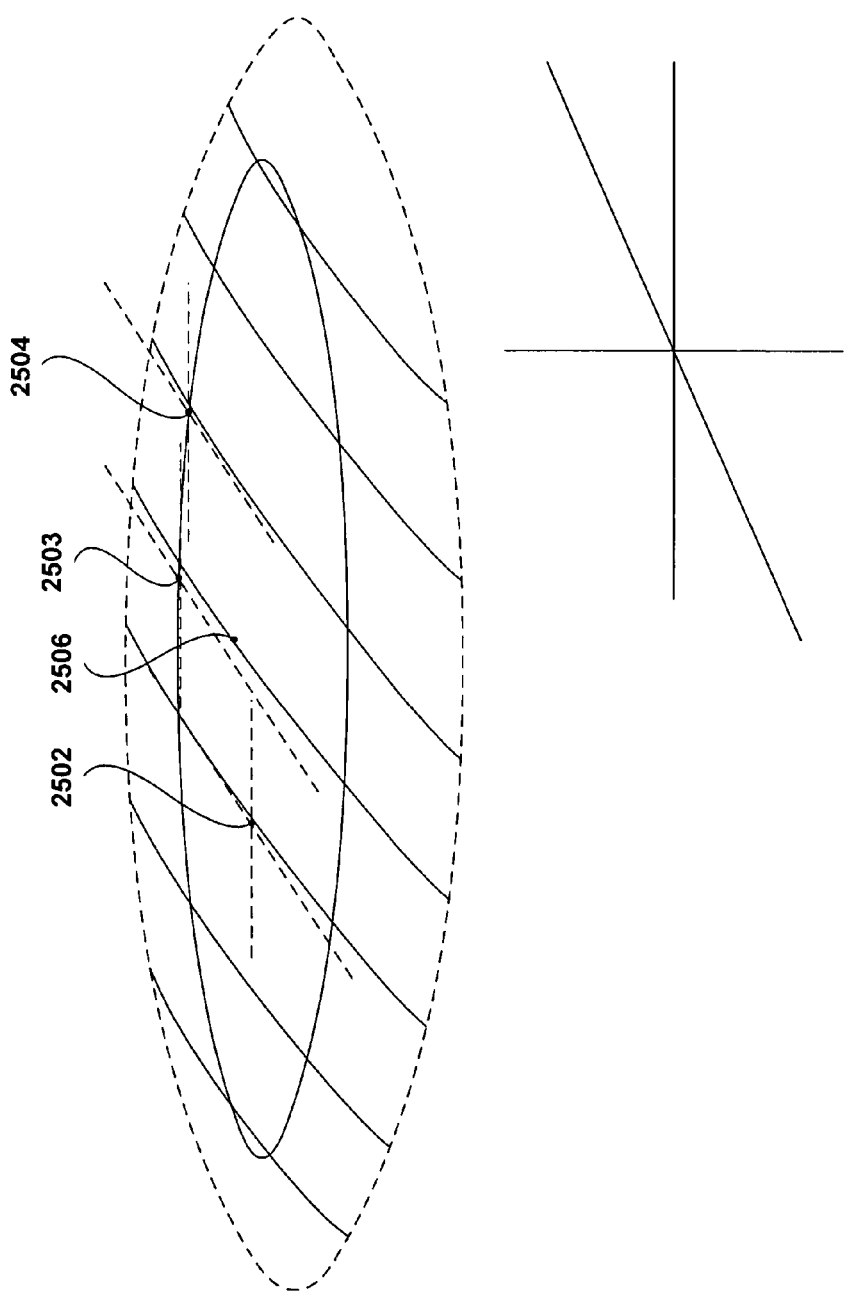
FIG. 25 shows a magnified view of a critical point.

FIG. 24 shows the same problem domain as shown in FIG. 23, or critical points explicitly indicated. The peaks of the mountain range 2304, 2306 and 2308 represent local maxima within the problem domain, and the low point in the small valley 2310 represents a local minimum. Saddle points within the mountain range, such as saddle points 2312 and 2314, also represent critical points. FIG. 25 shows a magnified view of a critical point, such as critical point 2304 in FIG. 24. As shown in FIG. 25, the partial differentials calculated for a number of points 2502–2504 near the critical point in the x and y directions calculated for a number of points 2502–2504 near the crucial point 2506 are all small in absolute value. Therefore, the gradient calculated for the points 2202–2304 near the critical point 2506 are also close to 0. To recapitulate, the derivative of the objective function with respect to τ, $$\left(\frac{\partial F(y(\tau), u(\tau), r(\tau))}{\partial y}\right)^T = G,$$

gives a means for determining the optimization trajectory near a critical point. Therefore, when the gradient is 0 or near 0, as it is for points near a critical point, then the rate of the state-vector trajectory with respect to τ is also 0. Moreover, G is sensitive near the critical point, since small local variations can cause relatively large magnitude changes in G and can even switch the sign of G. However, when G is small, then Newton's method, and other similar methods used to compute state-vector trajectories, are generally not useful for finding an optimization trajectory. In other words, the gradient field generally provides the direction for near-optimal or optimal trajectories, and therefore, while the gradient field is 0, all possible trajectories appear to be equally good. It is a situation analogous to attempting to use a compass at the magnetic north or south poles. As will be discussed later, a different method for computing the optimization trajectory for the state vector needs to be employed near critical points.

Figure 26:
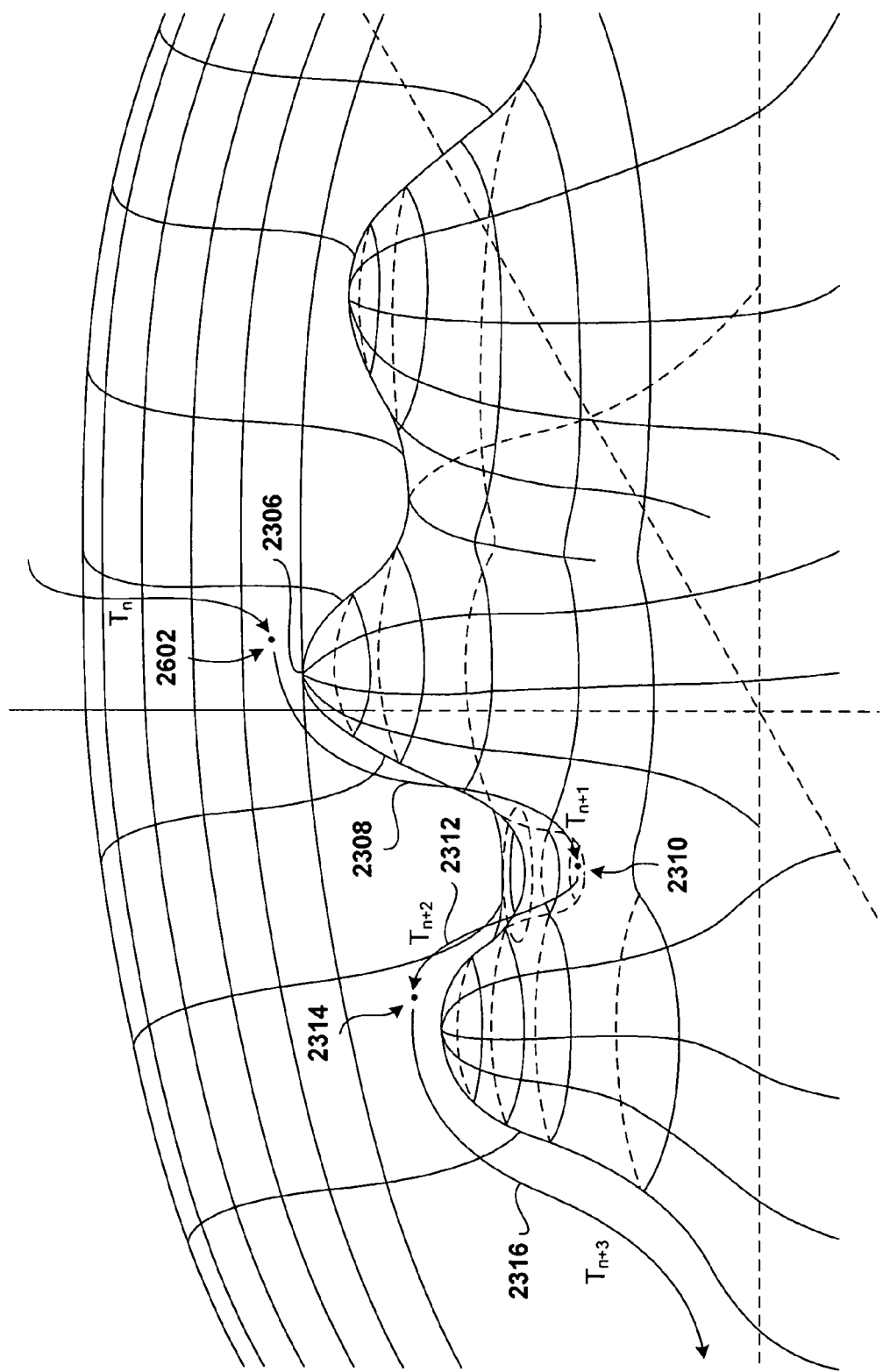
FIG. 26 illustrates a first-search technique.

There is another consideration with regard to critical points. This consideration involves search-like strategy that needs to be employed near critical points by a global optimization method in order to attempt to identify and evaluate a number of potential minima within a problem domain. FIG. 26 illustrates a first-search technique. In FIG. 26, an iteration of the outer-loop of the optimization method to horizon $T_n$ has carried the state vector to point 2602. This point is near critical point 2306, the peak of the mountain range. The fact that the gradient is nearly 0 at this point informs the optimization method that it is arrived at the vicinity of a critical point. However, its next step depends on the type of critical point at which it has arrived. In the case of a local maximum, such as point 2306, the optimization method needs to employ some method for perturbing the optimization trajectory away from the local maximum 2306 to continue a descent 2308 towards a local minimum. However, in the neighborhood of a local minimum, such as local 2310, the optimization method needs to employ a technique to ascend out of the local minimum 2312 to another point 2314 from which the optimization method can continue to descend 2316 towards a local minimum.

Figure 27:
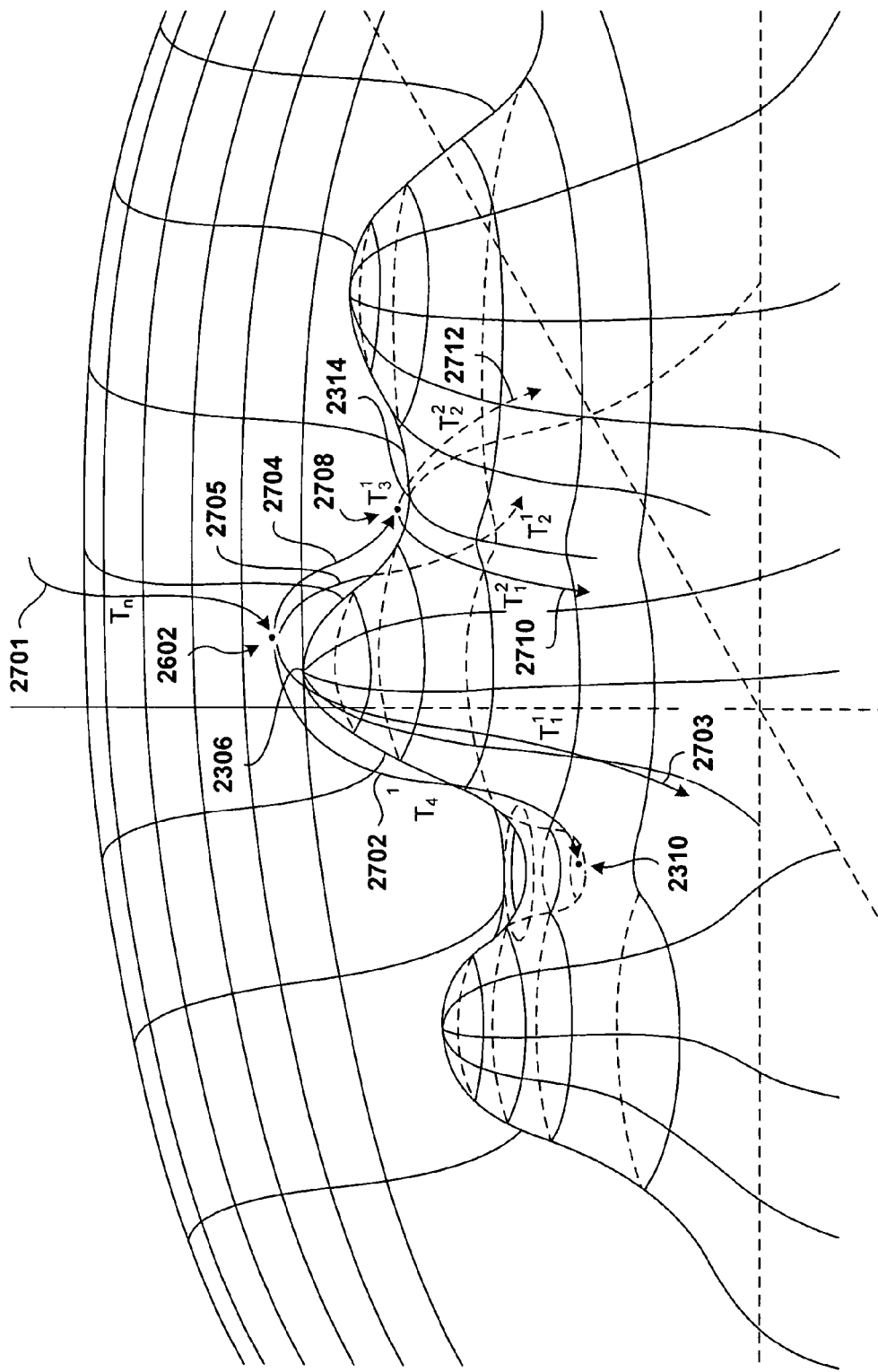
FIG. 27 illustrates a second strategy for searching a problem domain.

FIG. 27 illustrates a second strategy for searching a problem domain. In FIG. 27, the search method has again arrived at a point 2602 near a local maximum 2306. However, upon detecting the local maximum, the optimization method spawns a number of additional, relatively independent optimization threads which continue descending in different directions 2702–2705. One of the relatively independent threads 2704 reaches a point 2708 near a saddle point 2314. At this point, this thread, 2704 forks, or spawns, an additional thread, so that each of the resulting relatively independent threads descends from the saddle point in different directions 2710 and 2712. Another of the originally spawned, relatively independent threads 2702 reaches a local minimum 2310. At this point, rather than spawning new optimization threads, the relatively independent thread 2702 terminates, reporting the local minimum back to its parent thread 2701. Parent threads can select the lowest local minimum identified by their children and return that local minimum to their parents, resulting in a recursive search of the problem domain to identify a near optimal or optimal solution to the optimization problem. In alternative embodiments, parent threads can use information about reported local minima to truncate the problem domain, in order to modify the problem domain based on the local minima, and communicate the truncation of the problem domain to all other relatively independent threads.

Figure 28:
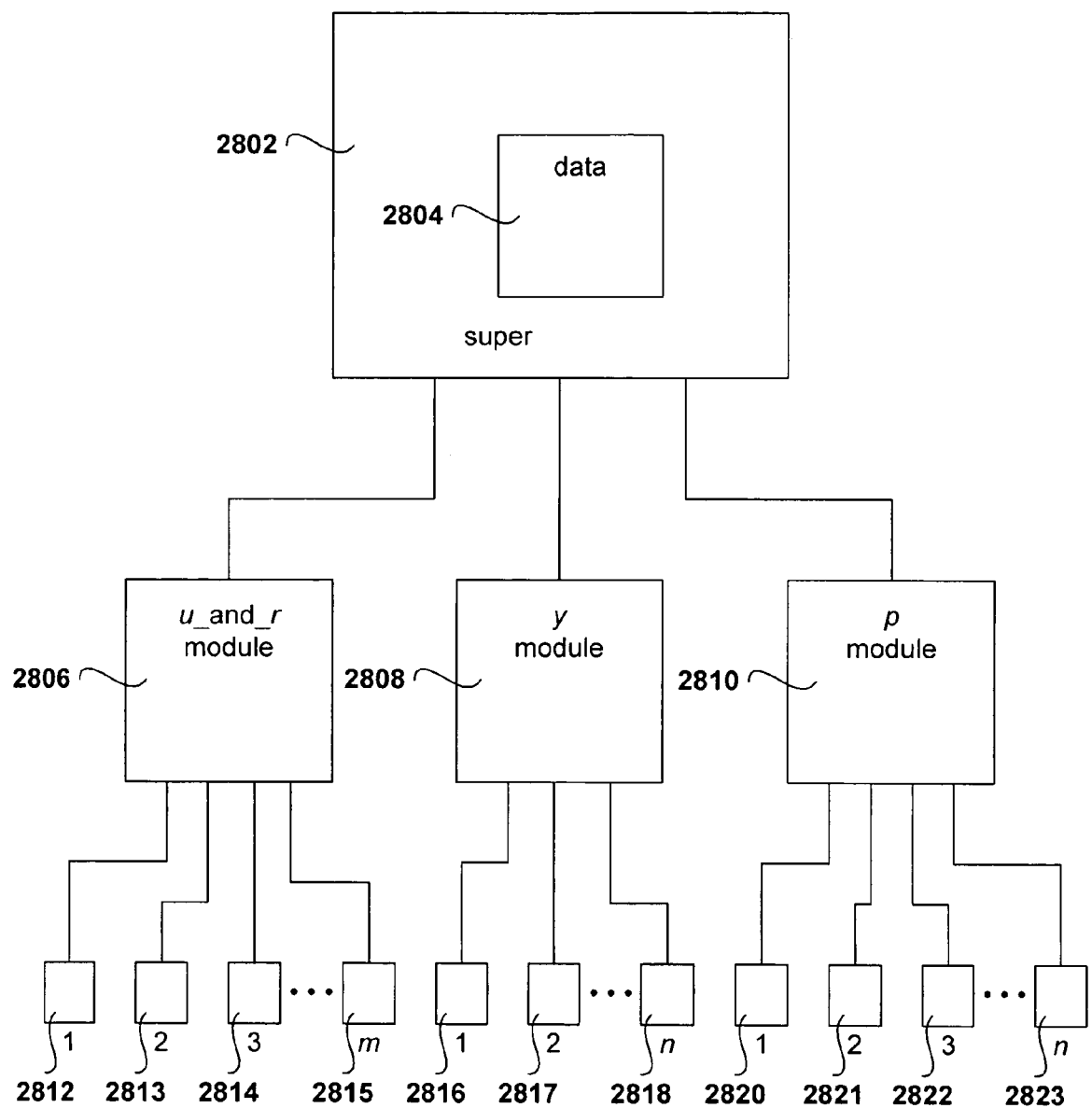
FIG. 28 illustrates the modules and modular organization of an optimization thread.

By either the single-threaded technique shown in FIG. 26, or the multi-threaded technique shown in FIG. 27, the optimization method needs to have a means of determining the type of critical point that is arrived at when the gradient falls to a value near 0. The critical-point beacon for illuminating types of critical points is the Hessian matrix, described above. When the gradient is near 0, then when all elements of the Hessian matrix are negative, a local maximum has been reached. When the gradient is 0 and all elements of the Hessian matrix are positive, then a local minimum has been reached. Otherwise, when the gradient is 0, and the elements of the Hessian matrix have mixed signs, then an inflection point or saddle point has been reached. The critical-point beacon properties of the non-singular Hessian matrix are formerly described as follows:

for a point y, if $G|_y \approx 0$
    if all eigenvalues of H are negative, then y is near a local or global maximum
    if all eigenvalues of H are positive, then y is near a local or global minimum otherwise y is near a saddle point A single optimization thread, as discussed above with reference to FIGS. 26 and 27, comprises a collection of hierarchically organized modules that may execute concurrently in separate computational environments in order to distribute the large computational tasks involved in propagating the state vector according to the above-described optimization method. FIG. 28 illustrates the modules and modular organization of an optimization thread. The highest-level module is referred to, in this document, as a "super" 2802. The super includes a relatively large database 2804 of intermediate results. The super is responsible for computing each successive horizon $T_K$, for choosing an initial point, in the case of the root thread in a multi-threaded optimization method, as described above with reference to FIG. 27, and for launching and coordinating the activities of subordinate modules. The first-level subordinate modules include a u_and_r module 2806, a y module 2808, and a p module 2810. The u_and_r module 2806 is responsible for the forward computation of the control vectors u_and_r, as shown in step 2204 in FIG. 22.

The y module 2808 is responsible for propagation of the state vector through successive intervals Δτ, shown as step 2205 in FIG. 22. The p module 2810 is responsible for computing costate vector values backwards from $T_k$ to 0 at the end of each outer-loop iteration of the iterative optimization method, shown as step 2209 in FIG. 22.

The u_and_r module 2806 distributes the control vector forward calculation amongst m agents 2812–2815. They module 2808 and the p module 2810 each distributes its respective task amongst n agents 2816–2818 and 2820–2823, respectively. Distribution of the y propagation by y module 2808 over the n y-module agents 2816–2818 is an important approach to decomposing the overall optimization computations and providing opportunities for parallel computing. The state-vector propagation computations undertaken by the y module 2808 and its respective agents 2816-2818 are the central, and most computationally expensive, tasks involved in computing the state-vector-change optimization trajectory. In an alternative embodiment of the present invention, the p module uses an efficient, interpolation method for estimating costate vector values, and thus does not need to distribute the problem among n p-module agents. Thus, the p-module computes costate without distribution. In other alternative embodiments, the p-module may distribute costate interpolation over a small number of p-module agents.

Figure 29:
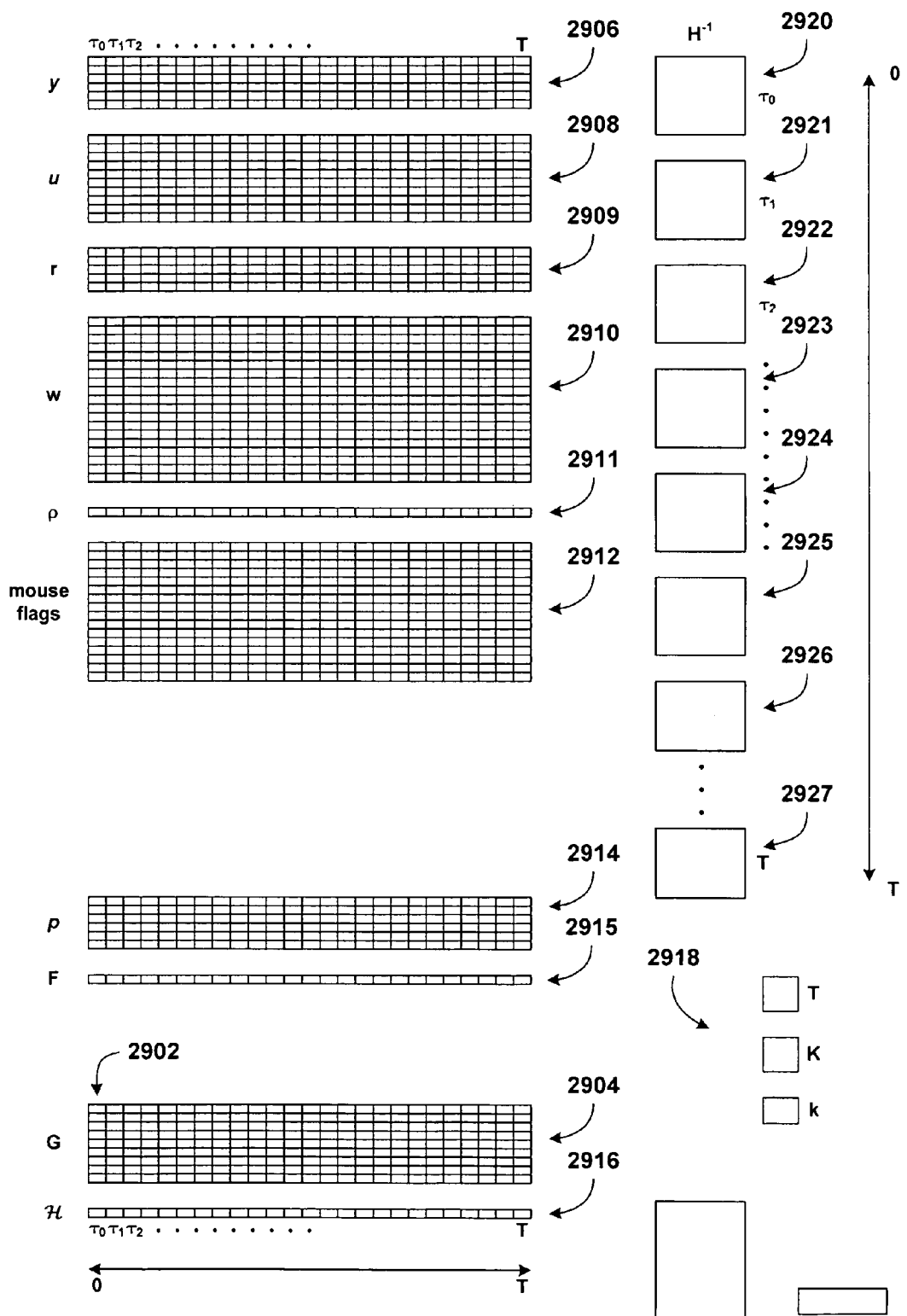
FIG. 29 illustrates, in part, the contents of the database maintained by the super module.

The database 2804 maintained by the super 2802 is large, and may be contained not only in memory, but in mass storage devises directly or remotely coupled to one or more computer systems over which the modules of a thread are distributed. FIG. 29 illustrates, in part, the contents of the database maintained by the super in various embodiments of the present invention. In general, the super must maintain the values of various quantities calculated by the modules at each subinterval rk of the horizon from 0 to T. Thus, in FIG. 29, each sub-column of the first column of data structures, such as sub-column 2902 of the vector G data structure 2904, represents the value of the corresponding computed entity at a particular value of τ. In FIG. 29, sub-column 2902 represents the value of the vector G at τ=0. The super stores values of the state vector 2906, the control vectors u and r 2908–2909, the vector w 2910, the scaler ρ 2911, a Morse-flags vector 2912, the costate vector p 2914, the scaler values of the objective function F 2915, the vector G 2904, the value of the Hamiltonian 2916, the current T and iteration control variables and other such local control variables 2918, and the inverses of the Hessian matrix 2920–2927.

Figure 30:
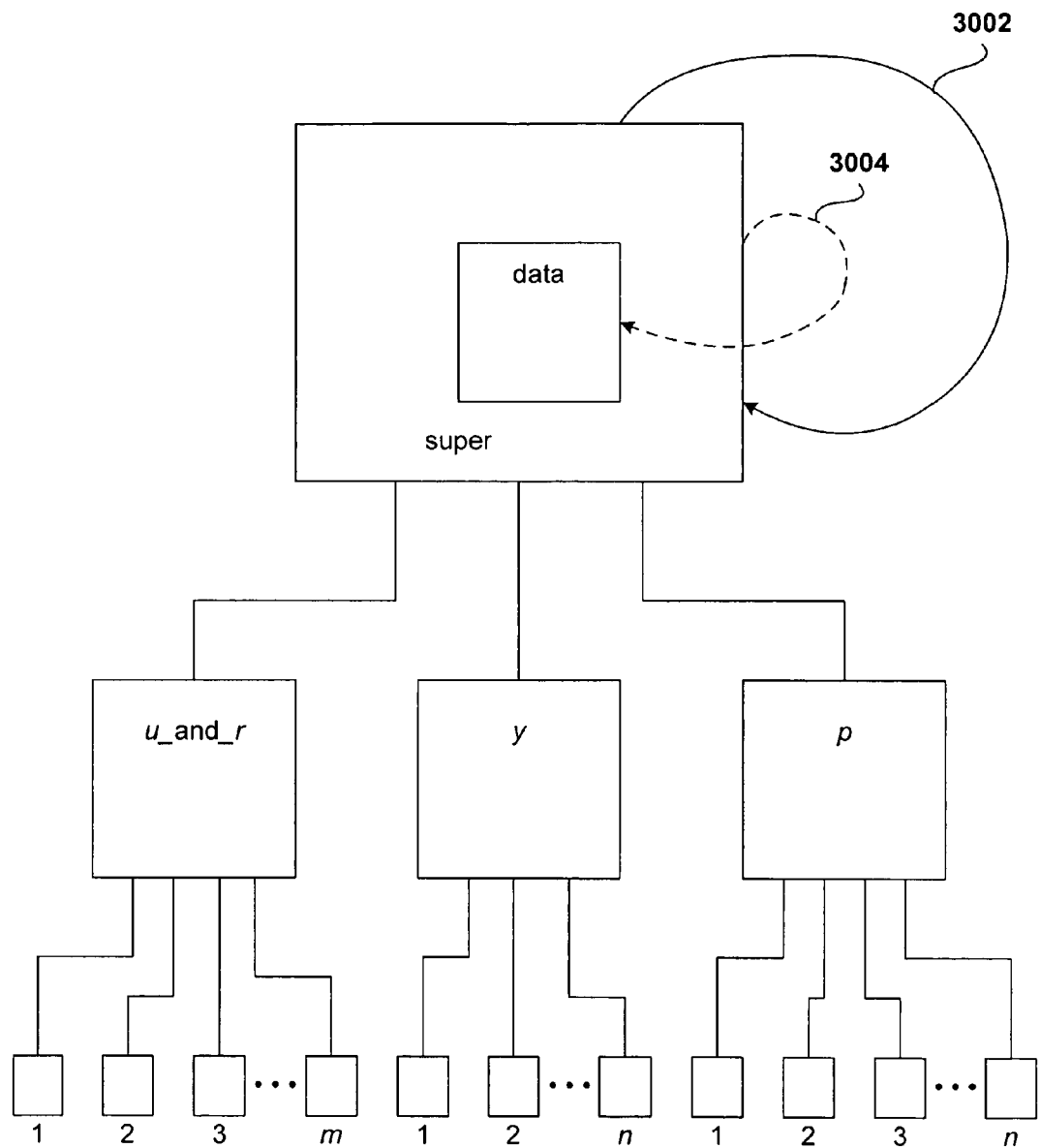
FIGS. 30–34 illustrate, using the illustration conventions of FIG. 28, the flow of information among the hierarchically organized modules of an optimization thread during one outer-loop iteration of the optimization method.
Figure 31:
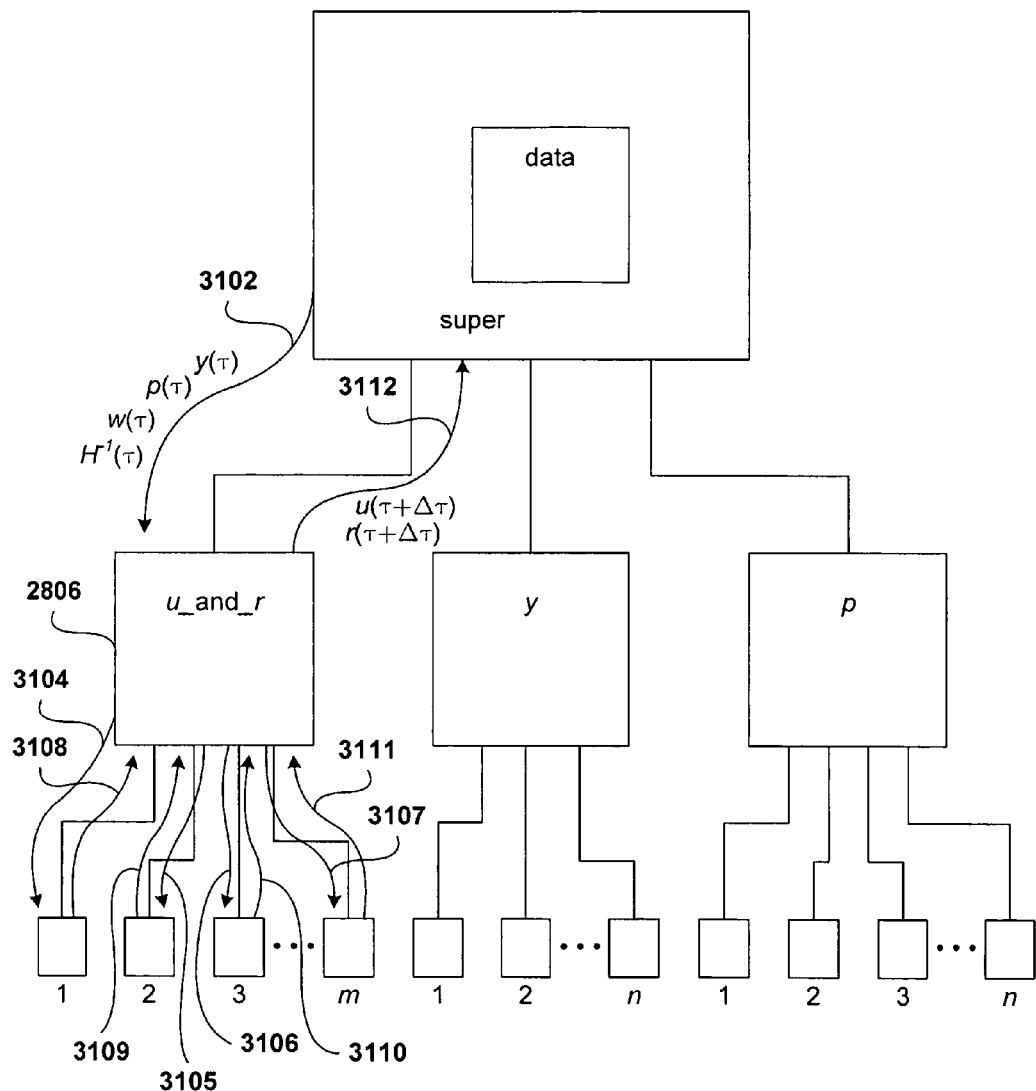
Figure 32:
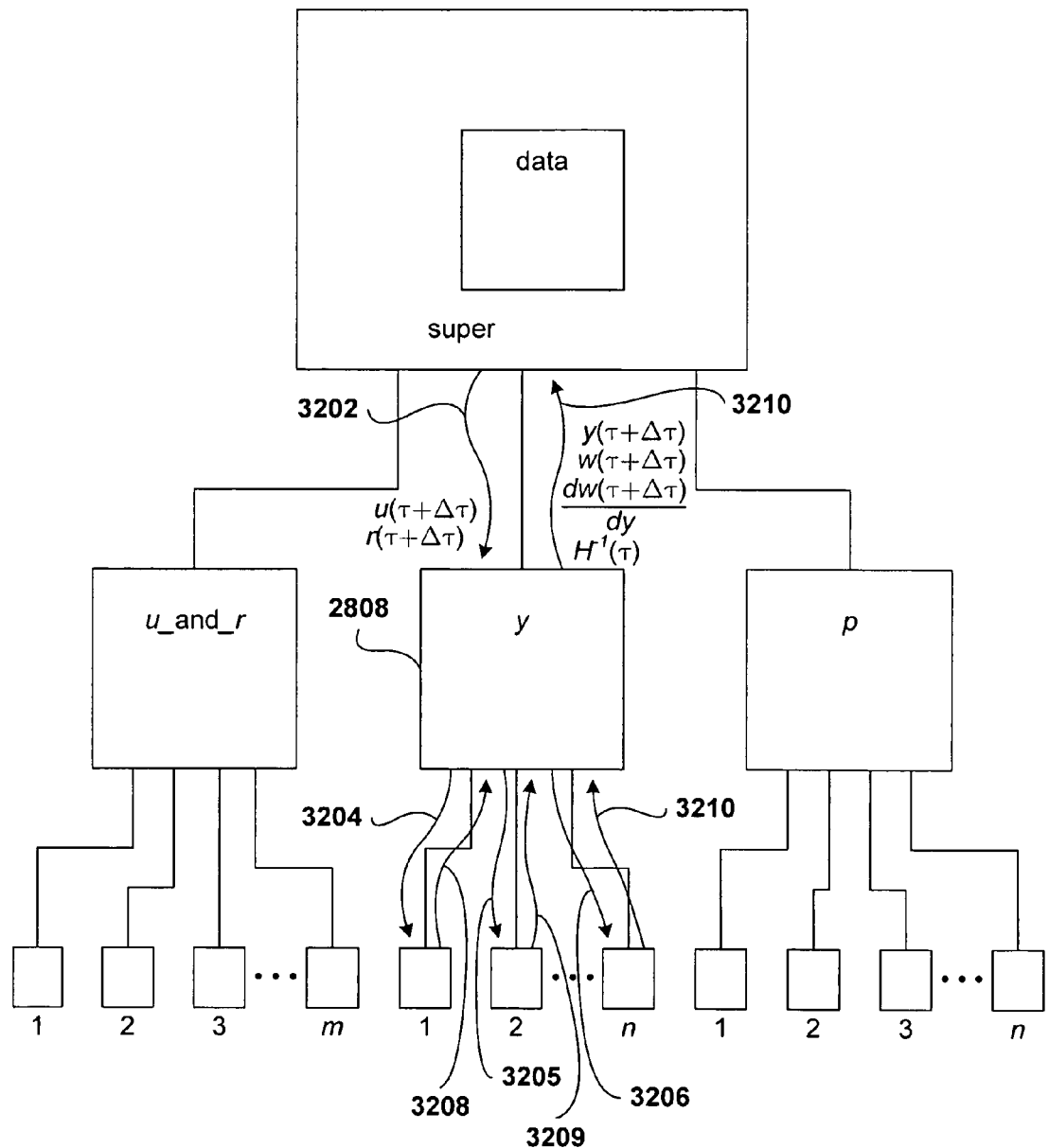
Figure 33:
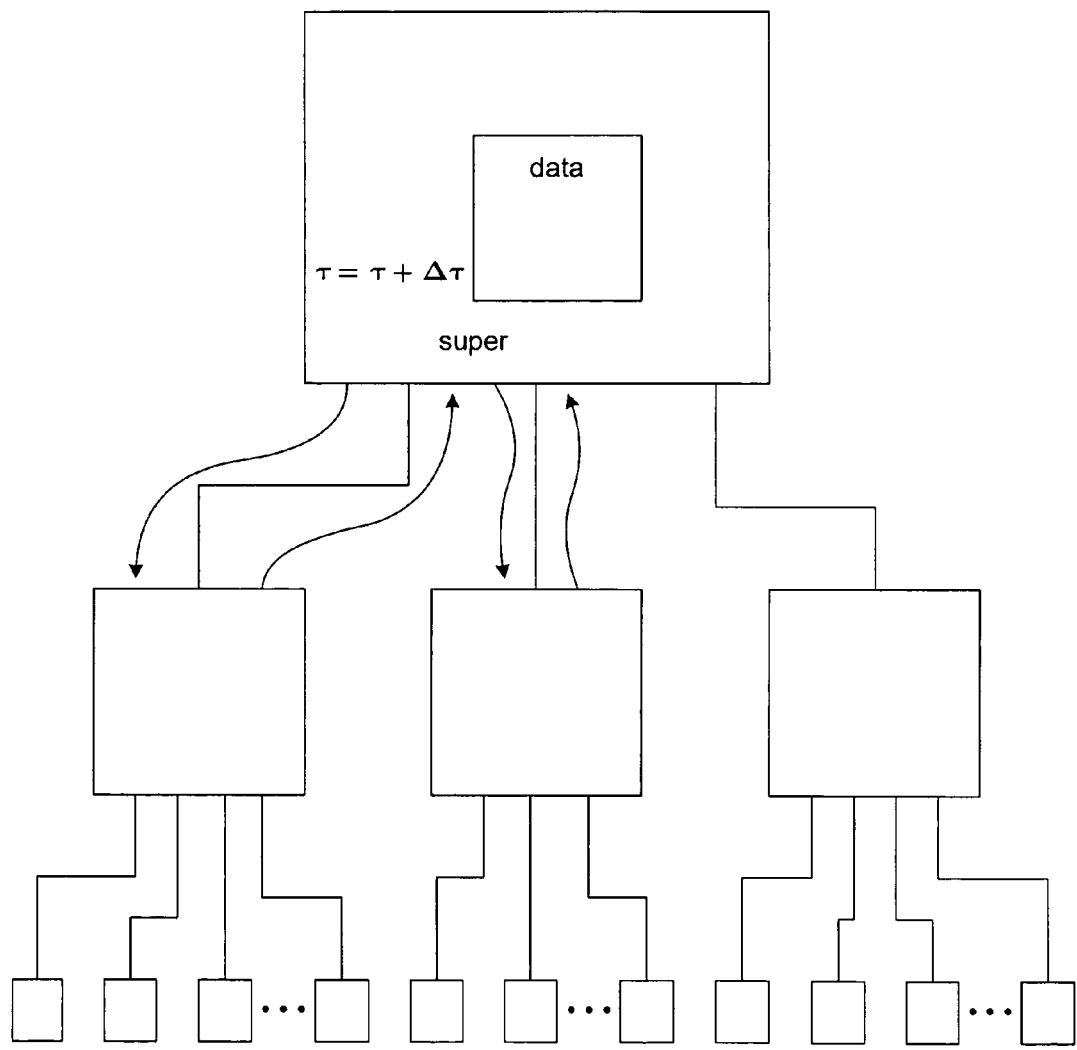
Figure 34:
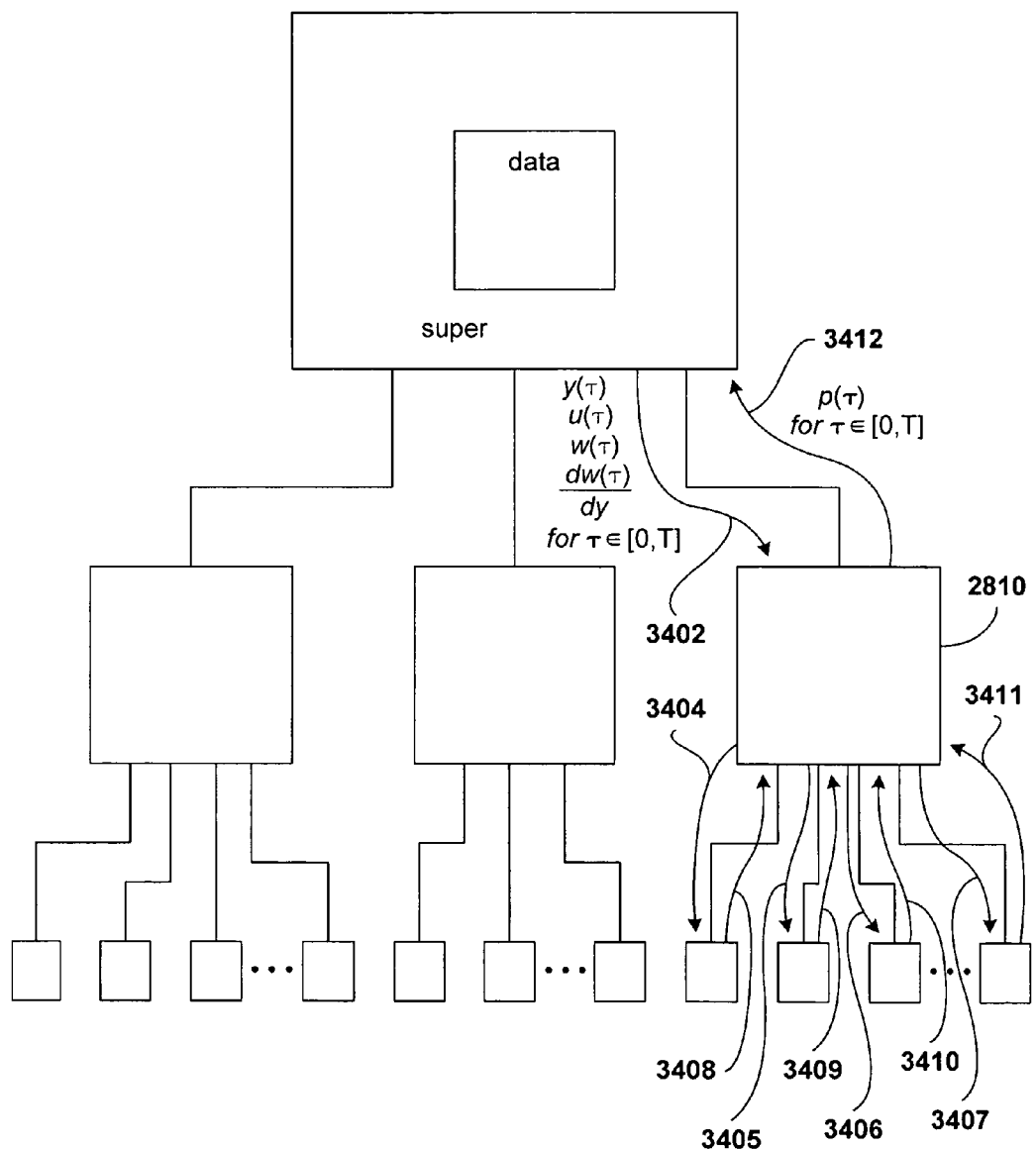

FIGS. 30–34 illustrate, using the illustration conventions of FIG. 28, the flow of information among the hierarchically organized modules of an optimization thread during one outer-loop iteration of the optimization method. In the case of a root thread, as shown in FIG. 30, an initial point for the optimization trajectory is determined 3002. In addition, initial values for the state vector, costate vector, control vector, and control variables, among other data structures, are determined for initializing the various data structures and elements 3004. Non-root threads inherit a starting point and current values for the various computational entities, such as the state and control vectors, from parent threads. As shown in FIG. 31, in the first step of the inner loop (2204 in FIG. 22), the u_and_r module 2806 receives the values of the state vector, costate vector, vector w, and the inverse of the Hessian from the super 3102 and distributes these values and/or portions of these values to u_and_r-module agents 3104–3107, receives intermediate computed results back from the u_and_r-module agents 3108, 3109, 3110, and 3111, computes a new control vector value, and returns the new control vector value 3112 back to the super. FIG. 32 illustrates data flow during the next step of the inner loop (2205 in FIG. 22). In this step, they module 2808 receives the newly computed control vectors u and r from the super 3202, distributes these values, along with additional values obtained from the super and/or computed by the y module, including the Hessian, vector other such values, to the y agents 3204–3206, receives intermediate computed values back from the y agents 3208 3209 3210, and computes and returns to the super computed values for the state vector, w vector, differential of the w vector with respect to the state vector, and the inverse of the Hessian, among others 3210. The y module carries out a number of individual propagation steps for each inner-loop iteration, as discussed above. FIG. 33 indicates that the data-exchange steps illustrated in FIGS. 31 and 32 are successively repeated in a number of inner-loop iterations. FIG. 34 illustrates the data exchange involved in costate vector calculations undertaken by the p module 2810 in step 2209 of FIG. 22. The p module receives computed values of the state vector, control vectors, and other such values from the super 3402, distributes these values, or portions of the values, among the p agents 3404–3407, receives intermediate results from the p agents 3408–3411, and returns computed values for the costate vector over a range of τ values from 0 to $T_K$ 3412 to the super. As discussed above, in currently preferred embodiments, the p module interpolates, rather than integrates, costate vectors, and thus does not need to distribute the problem in the manner illustrated in FIG. 34.

In the following discussions, for notational convenience, the u and r vectors are considered together as the u vector. In other words, in the subsequent discussion, the binding variable coefficients and barrier-function coefficients together compose a single control vector u. Recall that the iterative optimization strategy employed by embodiments of the present invention involves integrating $$\frac{dy}{d\tau}(\tau),$$

expressed as follows:

$$\frac{dy}{d\tau}(\tau) = -\frac{w(y(\tau), u(\tau))}{\rho(y(\tau), u(\tau))}$$

where $$w(y(\tau), u(\tau)) = (H(y(\tau), u(\tau)))^{-1} G(y(\tau), u(\tau))$$

$$\rho(y(\tau), u(\tau)) = (G(y(\tau), u(\tau)))^T w(y(\tau), u(\tau))$$

In one embodiment, the integration of $$\frac{dy}{d\tau}(\tau)$$

is carried out by a forward Euler integration method with variable step size $\Delta\tau_k$:

$$y^i(\tau_k + \Delta\tau_k) = y^i(\tau_k) + \Delta\tau_k \frac{dy^i}{d\tau}(\tau_k)$$

Figure 35:
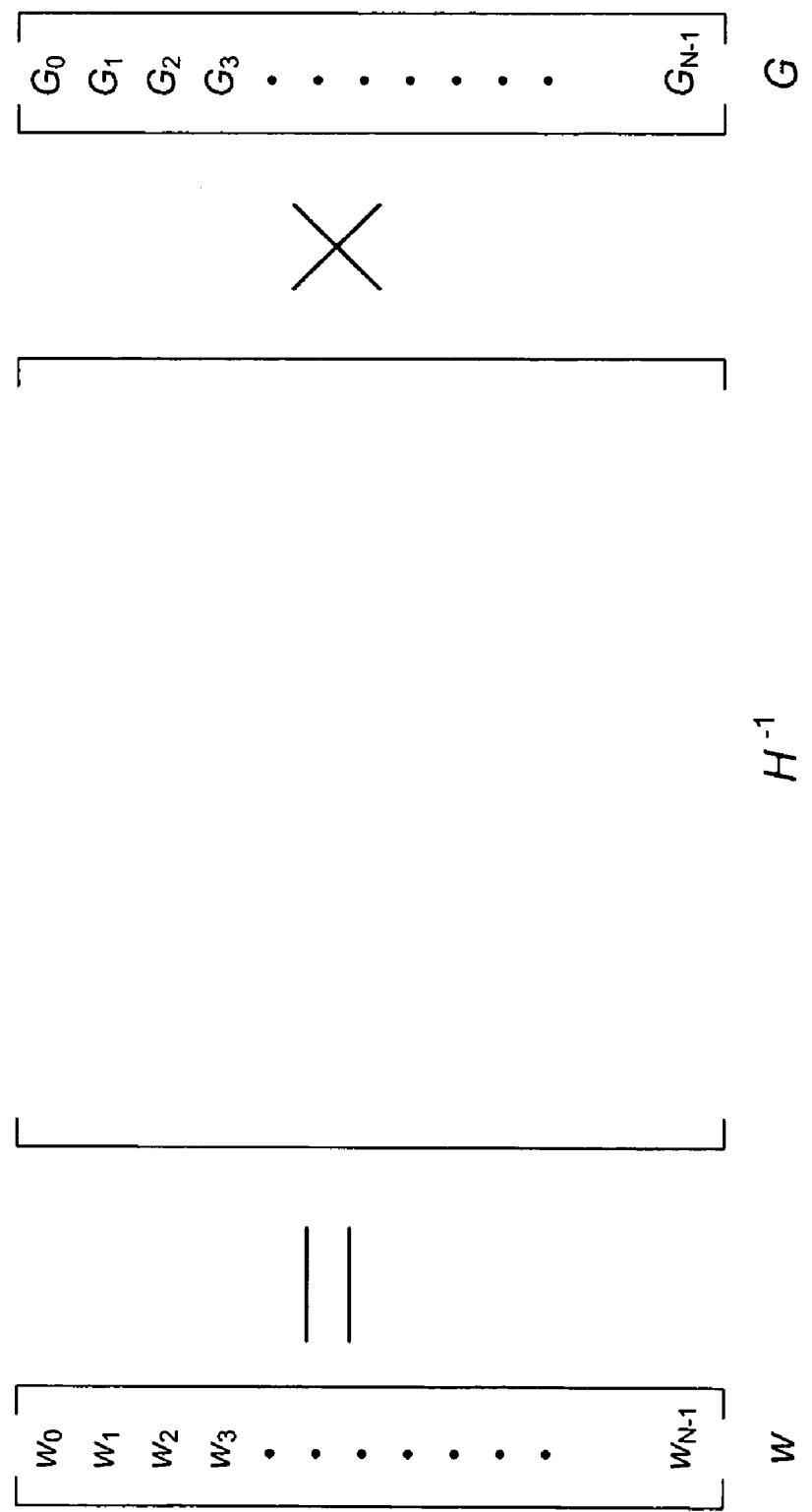
FIG. 35 graphically illustrates computation of the w vector.

Therefore, as is apparent in the above expressions, they module, for each forward integration step, needs to invert the Hessian matrix in order to compute the w vector as the product of the inverse of the Hessian and the vector G FIG. 35 graphically illustrates this computation. Inversion of the Hessian matrix is by far the most computationally intensive task involved in optimization. Therefore, the y module distributes inversion of the Hessian matrix among the y-module agents, relying on several assumptions for this distribution.

Recall that:

$$H(y(\tau_k), u(\tau_k), w(\tau_k), u(\tau_k)) = \left[\frac{\partial G}{\partial y}\right]^T (y(\tau_k), u(\tau_k))$$

Figure 36:
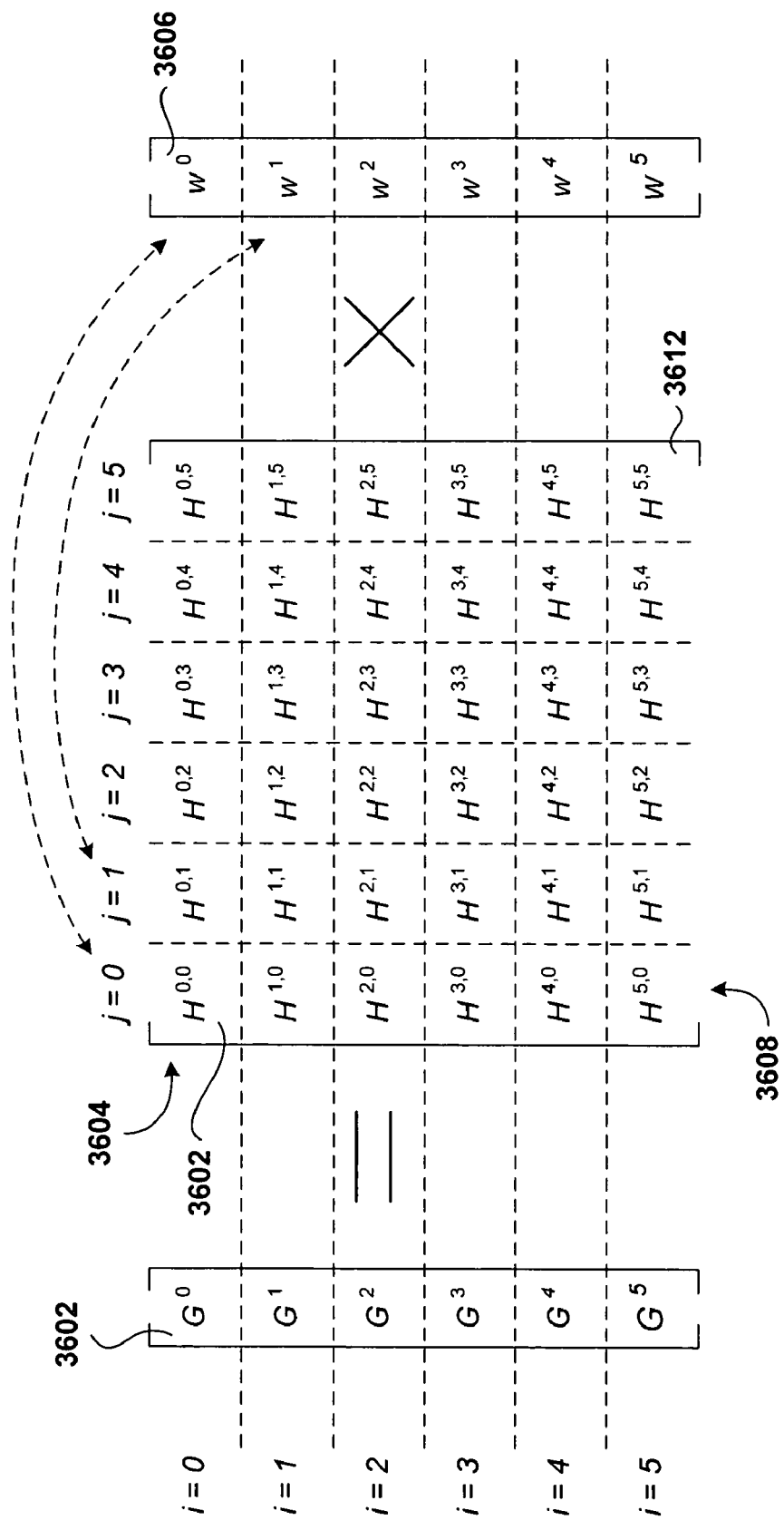
FIG. 36 illustrates multiplication of the Hessian matrix by the w vector to produce the G vector in a distributed fashion.

FIG. 36 illustrates multiplication of the Hessian matrix by the w vector to produce the g vector in a distributed fashion.

As shown in FIG. 36, the G and w vectors, and the Hessian matrix, can be vertically partitioned into partitions i=0 to 5. The first partition of the G vector 3602 is referred to as $G^0$, the first vertical partition of the Hessian matrix 3604 is referred to as $H^0$, and the first partition of the w vector 3606 is referred to as $w^0$. The Hessian matrix can additionally be partitioned horizontally into horizontal partitions j=0 to 5. In FIG. 36, the first horizontal partition of the Hessian matrix 3608 appears as a first vertical column within the Hessian matrix.

Both vertical and horizontal partitioning of the Hessian matrix results in a block-like partitioning of the Hessian matrix into submatrices. For example, FIG. 36 shows the Hessian matrix partitioned into thirty-six submatrices, beginning with the left-most and upper-most submatrix $H^{0,0}$ 3610 and ending with the right-most and lower-most submatrix $H^{5,5}$ 3612. Note that, in the case of a diagonally dominant Hessian matrix, in which the diagonal block submatrices $H^{0,0}$, $H^{1,1}$, $H^{2,2}$, $H^{3,3}$, $H^{4,4}$, and $H^{5,5}$ have elements with magnitude much greater than the elements of other non-diagonal submatrices, then matrix multiplication of the Hessian matrix by the w vector can be approximated by matrix multiplication of w-vector partitions by the block-diagonal submatrix within the corresponding vertical partition of the Hessian matrix. For example, in a full matrix multiplication, the G-vector partition $G^0$ equals the sum of the matrix-multiplication products of the partitions of the w vector with corresponding blocks of the first vertical partition of the Hessian matrix. Formally, $$G^i = H^i w$$
$$= \sum_{j=0}^{J-1} H^{ij} w^j$$
$$H^i = [H^{i0} \cdots H^{i(J-1)}]$$

When the Hessian matrix is diagonally dominant, then the off-diagonal submatrices have relatively less magnitude and are of less importance in computation of a w-vector partition. This situation occurs when the Hessian matrix is partitioned in a way that removes, as much as possible, dependence between each partition and all other partitions. Therefore, a particular y-module agent can approximately calculate the current value of a w-vector partition 3810 by inverting a corresponding Hessian block-diagonal submatrix 3808 and multiplying the large, bracketed term 3812 in FIG. 38 by the inverse of the block-diagonal Hessian submatrix 3808, using previously calculated values for the remaining w-vector partitions 3814–3817.

Figure 39:
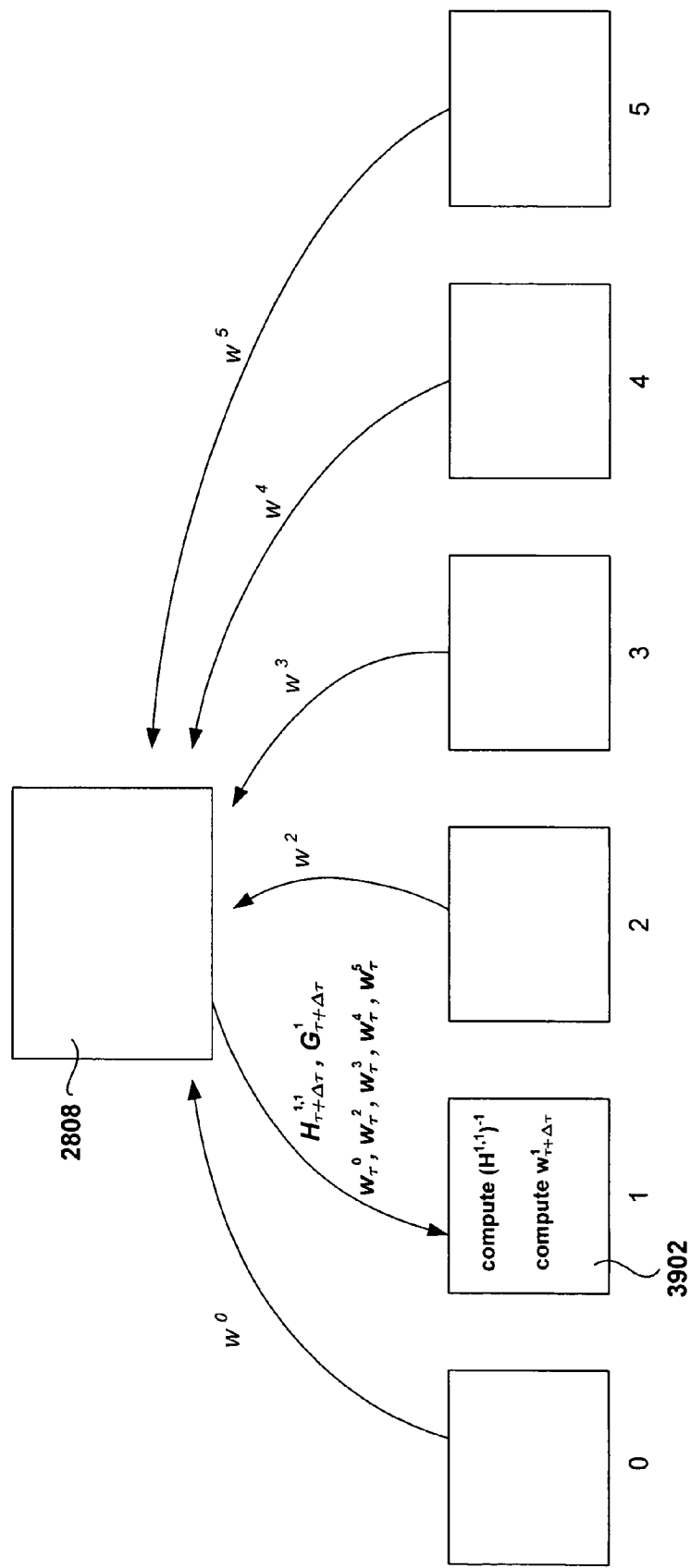
FIG. 39 illustrates computation of a w-vector partition $w^1$ by the second y-module agent.

FIG. 39 illustrates computation of a w-vector partition $w^1$ by the second y-module agent. The second y-module agent 3902 obtains the current Hessian matrix block-diagonal submatrix $H^{1,1}$ and current G-vector partition $G^1$ and most recently calculated values of the w-vector partitions $w^0$, $w^2$, $w^3$, $w^4$, and $w^5$ from the y-module 2808, computes the inverse of the current Hessian block-diagonal submatrix $H^{1,1}$ and then, using the computed inverse of the Hessian matrix, computes the current approximate value of the w-vector partition $w^1$. The y-module agent 3902 can then, in a next computational step, furnish the approximate current value of the w-vector partition to the y-module 2808 for distribution to the other y-module agents, and to receive their most recent computed values for the other w-vector partitions $w^0$, $w^2$, $w^3$, $w^4$, and $w^5$ in order to compute a next w-vector partition value $w^1$ at the next τ increment. Using this method, the y-module agents can synchronously compute the approximate value of w-vector partitions at each step.

Figure 40:
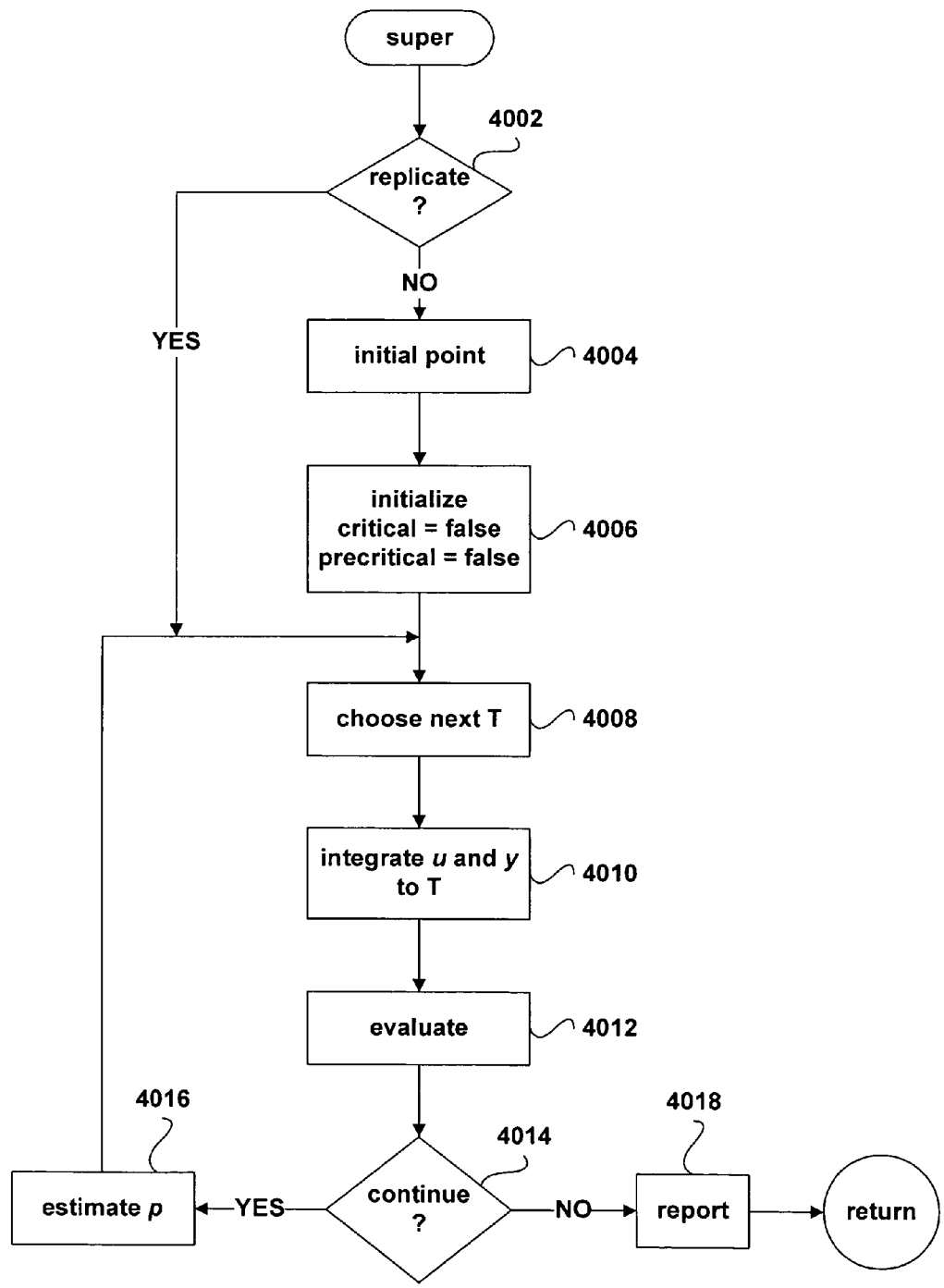
FIG. 40 is a control-flow diagram illustrating a highest conceptual level of the super module.

Next, a control-flow diagram illustration of the super module is provided. FIG. 40 is a control-flow diagram illustrating a highest conceptual level of the super module. In step 4002, the super module determines whether or not it is a replicate, or child thread, spawned or forked from a parent thread. If not, and the current thread is therefore the root thread, then in step 4004, the super module determines an initial point for the optimization and, in step 4006, initializes various computational entities, including the state vector, costate vector, and other sets of values, and also initializes a number of variables, including the Boolean variables "critical" and "precritical" to the Boolean value FALSE. Following initialization by a root thread, or as a result of flow of control from step 4002 for a replicate thread, the super module next chooses, in step 4008, a horizon T. Then, the super module invokes the function "integrate_u_and_y_to_T," in step 4010, which carries out successive inner-loop interactions of the optimization method, described above. Next, in step 4012, the super module invokes the routine "evaluate" in order to make decisions based on the inner-loop iterations carried out by the routine "integrate_u_and_j_to_T" in step 4010. The routine "evaluate" returns a Boolean value "continue" which the super module evaluates, in step 4014, in order to determine whether or not to carry out yet another iteration of the outer loop of the optimization method, described above. If so, then the super module calls the routine "integrate p" 4016 to back calculate costate-vector values and then returns to step 4008 to initiate another outer-loop iteration. If the super module decides not to continue outer-loop durations, then the super module invokes the routing "report", in step 4018 and then returns.

Control-flow diagrams illustrating steps 4004, 4008, 4010, 4012, and 4018 are next provided. The routine "integrate p" called in step 4016, and the routines "integrate u" and "integrate y," called from the routine "integrate_u_and_to_T" are subsequently described mathematically, rather than using control-flow diagrams, in the interest of clarity and brevity.

Figure 41:
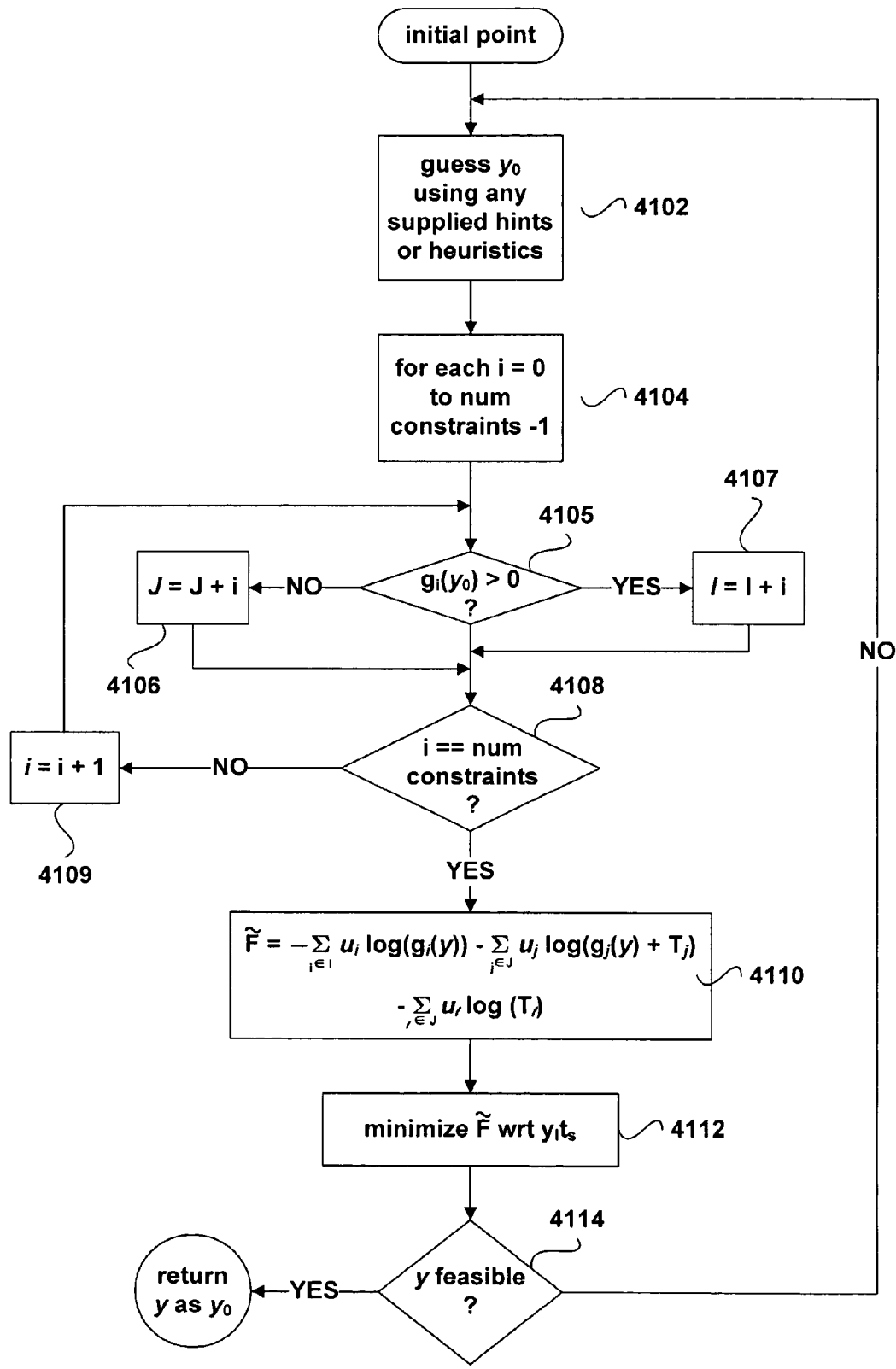
FIG. 41 is a control-flow diagram for the routine "initial point" called in step 4004 of FIG. 40.

FIG. 41 is a control-flow diagram for the routine "initial point" called in step 4004 of FIG. 40. In order to determine an initial value for the state vector, $y_0$, the initial point routine, in step 4102, guesses at a value using any supplied hints or heuristics from users or from the mathematical modeling or preprocessing portions of the optimizer. Then, in the for-loop comprising steps 4104–4107, the initial point routine evaluates each constraint $g_i$ in order to determine whether or not the constraint, evaluated at the initially guessed state-vector point $y_0$, is greater than 0. If so, then the constraint is placed into partition I in step 4107. If not, then the constraint is placed in partition J in step 4106. Then, in step 4110, the initial point routine constructs an objective function $\tilde{F}$ as follows:

$$\tilde{F} = -\sum_{i \in I} u_i \log(g_i(y)) - \sum_{i \in J} u_j \log(g_j(y) + T_j) - \sum_{i \in J} u_i \log(T_i)$$

which is then minimized in step 4112 by a recursive call to the optimizer (FIG. 30) to produce a modified initial state-vector value. The objective function $\tilde{F}$ can be thought of as initially expanding the problem-domain boundary of the objective function F in order to envelope the initial value for the state vector, and the optimization of F̄ then contracts the problem-domain boundary, forcing the initial point into the interior of the problem domain of the objective function F. In step 4114, the initial point routine determines whether the modified state-vector value is feasible. A feasible state-vector value is an interior point of the problem domain with a reasonably high probability of being close enough to a local minimum for the optimization method to find a local minimum. If the modified state-vector value is feasible, then it is returned as the initial point for the optimization. Otherwise, control flows back to step 4102 for another pass at determining an initial state-vector value. In subsequent iterations, information gleaned from previous iterations may be employed in step 4102 in order to better guess an initial value for the state vector.

Figure 42:
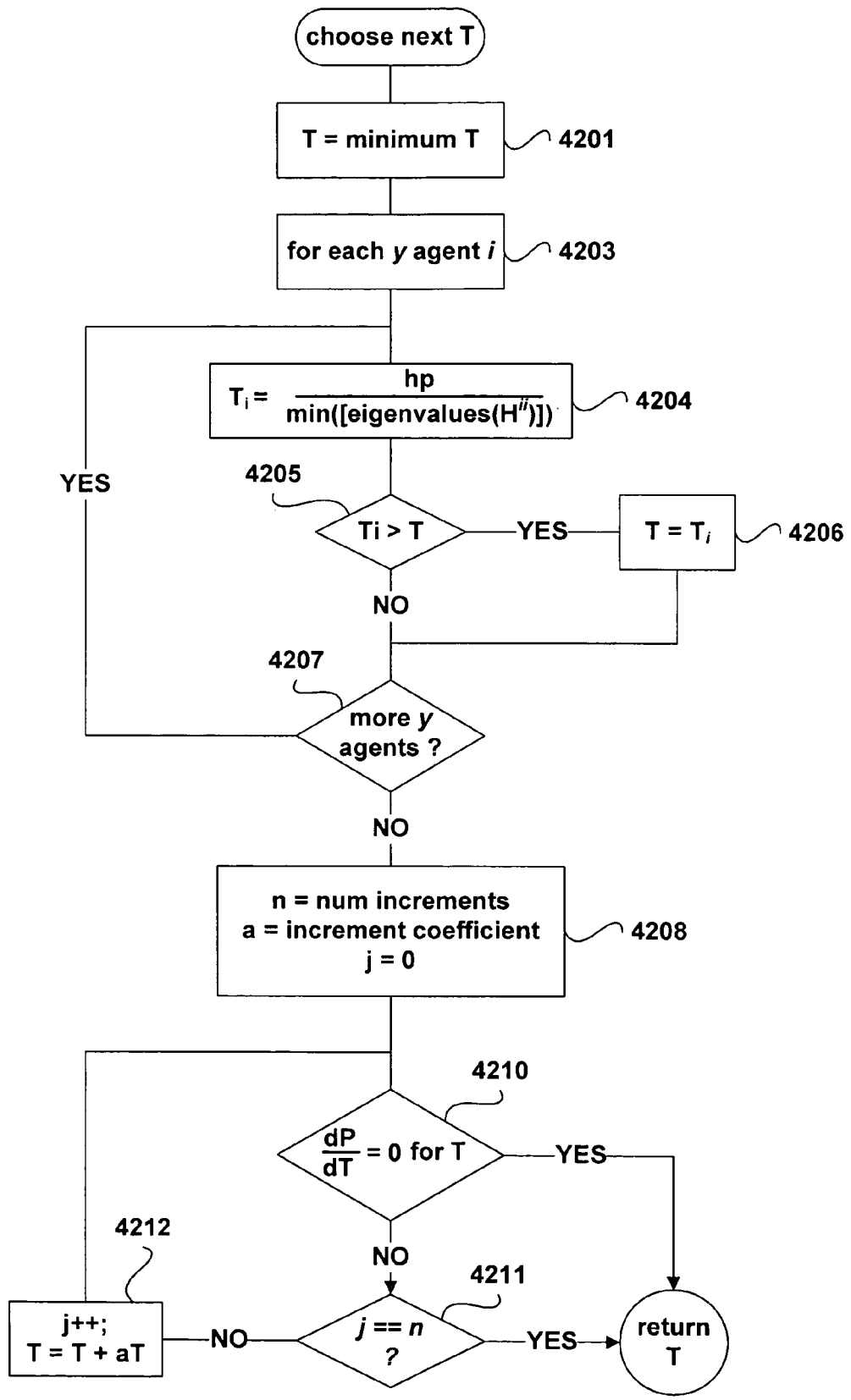
FIG. 42 is a control-flow diagram for the routine "choose_next_T."

FIG. 42 is a control-flow diagram for the routine "choose_next_T." In step 4201, the routine "choose_next_T" assigns local variable "T" to a minimum horizon constant. Then, in the for-loop, comprising steps 4203–4207, the routine "choose_next_T" calculates, for each y-module agent, a T value obtained by dividing a constant parameter by the minimum absolute eigenvalue of the block-diagonal Hessian submatrix associated with the y-module agent. If the computed T value for the y-module agent is greater than the contents of the variable "T," as detected in step 4205, then the variable "T" is assigned to the T value calculated for they-module agent. Next, in step 4208, the routine "choose_next_T" initializes local variables "n" to a maximum number of increments, initializes local variable "a" to an increment coefficient, and initializes a loop-control variable "j" to 0. Then, in steps 4210–4212, the routine "choose_next_T" increases the value of the variable "T" in step 4212 until the derivative of the costate vector with respect to T evaluated for the current contents of the variable "T" approaches 0, as detected in step 4210. The loop may also terminate when the number of iterations is equal to the contents of the local variable "n." When $$\frac{dp}{dT} = 0,$$

then computation of the costate vectors over the continuous iteration range 0 to T can be more easily calculated. In alternative embodiments of the present invention, the costate vectors can be computed using a polynomial approximation, rather than employing complex integration.

Figure 43:
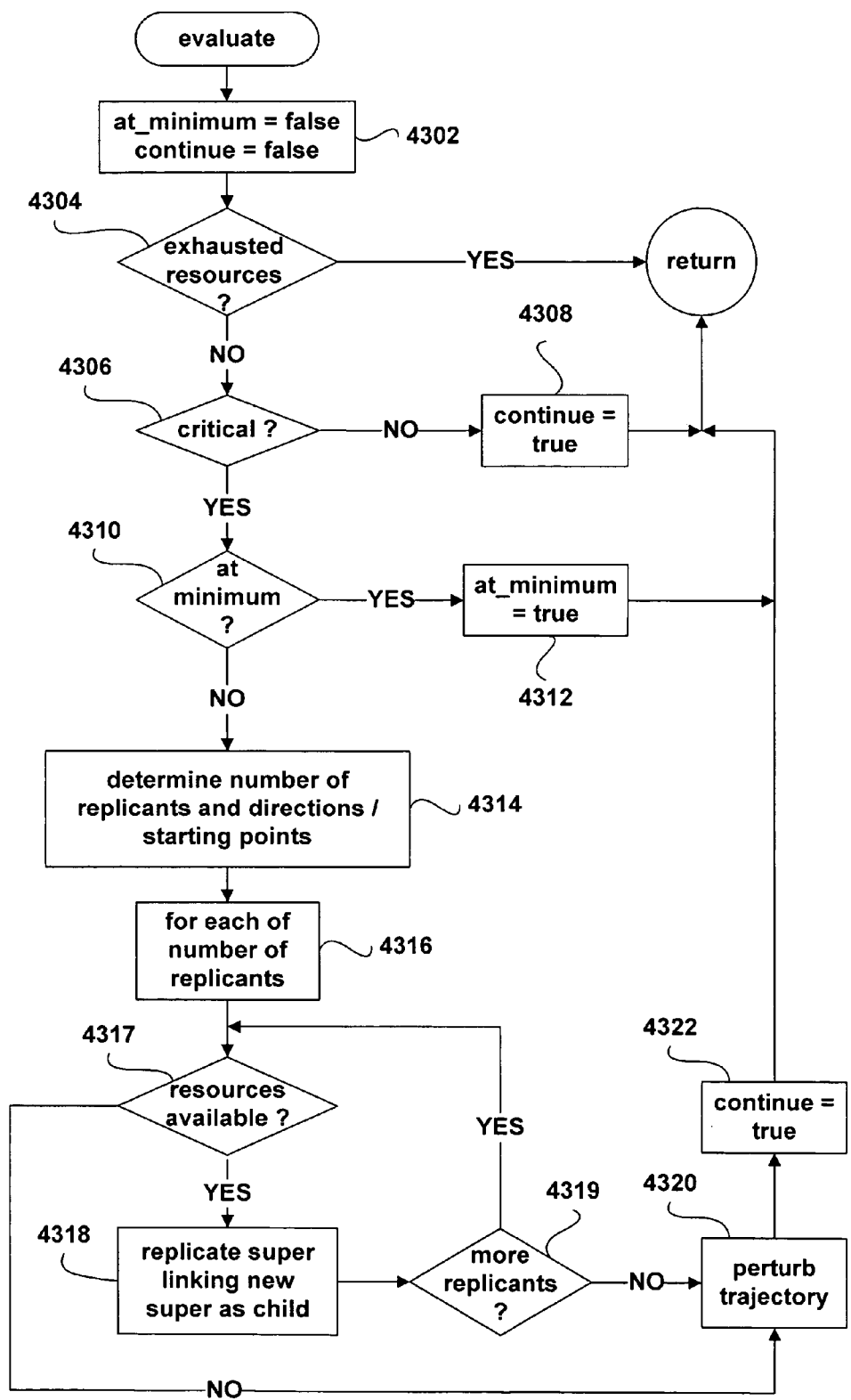
FIG. 43 is a control-flow diagram of the routine "evaluate," called in step 4012 of FIG. 40.

FIG. 43 is a control-flow diagram of the routine "evaluate," called in step 4012 of FIG. 40. In step 4302, the routine of "evaluate" sets the Boolean flags "at_minimum" and "continue" to the Boolean value FALSE. Next, in step 4304, the routine evaluate determines whether the computational resources allocated for the optimization have been exhausted. This may include continuous computation for longer than a maximum specified time, the usage of processing resources, memory, or a combination of computational resources greater than a specified maximum amount of resources to be used, the occurrence of error conditions, or other types of predetermined termination criteria. If the computational resources are exhausted, then the routine evaluate returns. Otherwise, the routine evaluate, in step 4306, determines whether the optimization thread is currently critical. An optimization thread is critical if all y-module agents are currently in Morse mode, and have been so for some predetermined number of iterations. Morse mode is described in detail, below. If the current thread is not critical, then the routine "evaluate" sets the Boolean flag "continue" to TRUE, in step 4308, and then returns. Otherwise, in step 4310, the routine "evaluate" determines whether the thread, currently determined to be critical, has reached a local minimum. If so, then the Boolean flag "at-minimum" is set to TRUE, in step 4312, and the routine "evaluate" returns. If the optimization thread is not at a local minimum, but is critical, then the routine "evaluate," in step 4314, determines a number of replicant threads to spawn, and also initial directions or starting points for the replicant threads. Spawning of replicant threads is illustrated in FIG. 27. In the for-loop of steps 4316–4319, the determined number of replicant threads are spawned, each replicant thread linked has a child to the current optimization thread. Then, in step 4320, the routine "evaluate" may attempt to perturb the current optimization trajectory in order to move the optimization trajectory away from the critical point and continue descending towards a local minimum. In step 4322, the routine "evaluate" sets the Boolean flag "continue" to the Boolean value TRUE that then returns.

Figure 44:
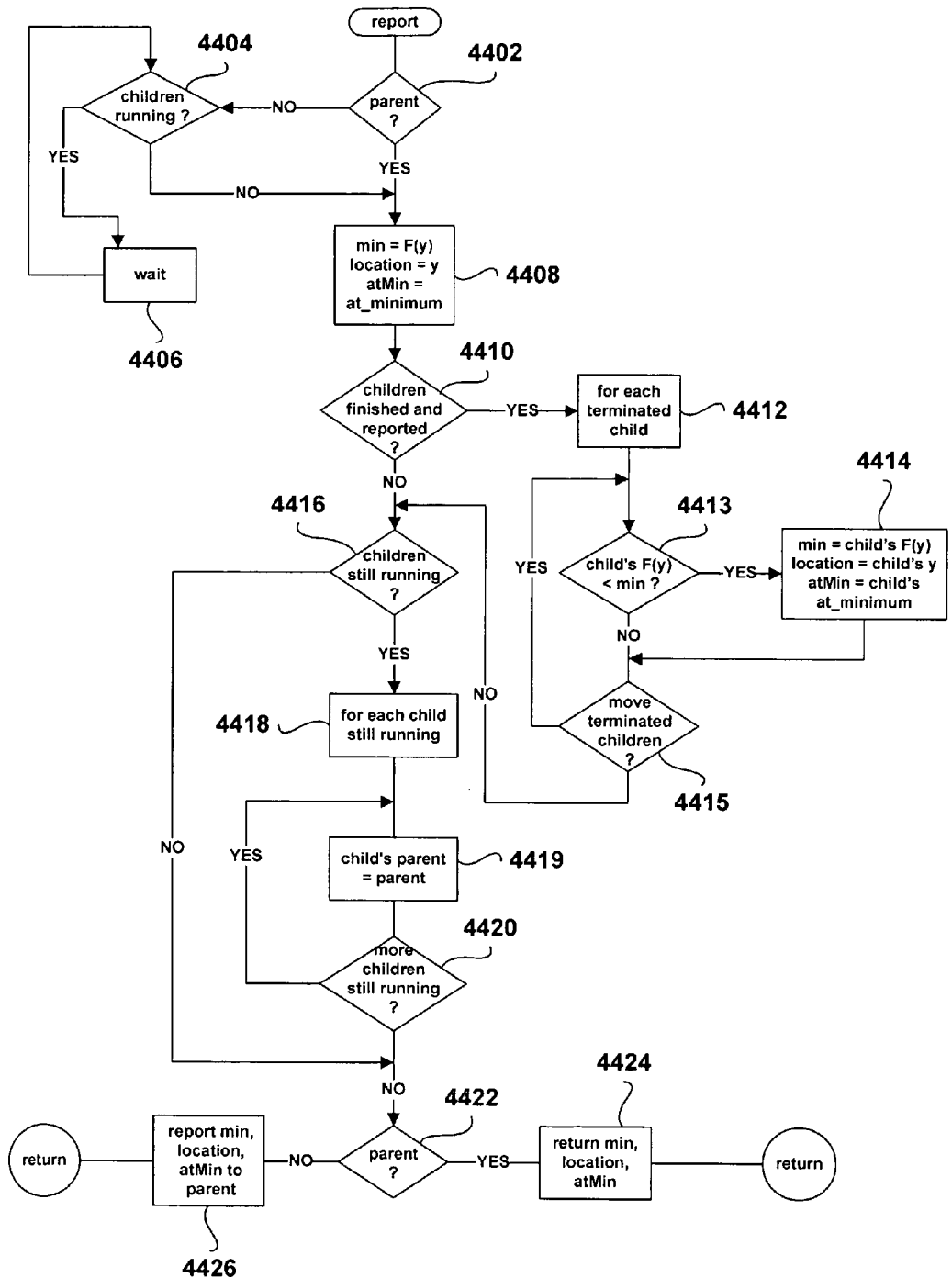
FIG. 44 is a control-flow diagram for the routine "report."

FIG. 44 is a control-flow diagram for the routine "report." This routine is invoked in step 4018 of FIG. 40. In step 4402, the routine "report" determines whether the current optimization thread has a parent. If not, and the current optimization thread is therefore the root optimization thread, then the routine "report" determines, in step 4404, whether there are any children threads still running that are linked to the current, root optimization thread. If so, then the current, root optimization thread waits, in step 4406, for the children optimization threads to finish execution. Next, in step 4408, the routine "report" sets local variable "min" to the current value of the objective function computed with the current state-vector value, sets the local variable "location" to the current state-vector value, and sets the local variable "at min" to the Boolean value flag "at_minimum" returned by the routine "evaluate" for the current optimization thread. In step 4410, the routine "report" determines whether any children threads have terminated and reported back to the current optimization thread. If so, then in the for-loop of steps 4412-4415, the current optimization thread evaluates the report generated by each terminated child in order to determine the lowest value for the objective function reported by any child and achieved by the currently executing optimization thread. Next, in step 4416, the routine "report" determines whether there are any children still running. If so, then in thefor-loop of steps 4418–4420, the routine "report" links each child to the parent of the currently executing thread. Note that the test in step 4416 fails in the case that the currently executing optimization thread is the root thread. If the currently executing optimization thread is the root thread, as determined in step 4422, then the routine "report" returns the minimum objective function value, state vector, and indication of whether the optimization is currently at a minimum in step 4424. Otherwise, the routine "report" reports these same values back to its parent thread, in step 4426.

Figure 45:
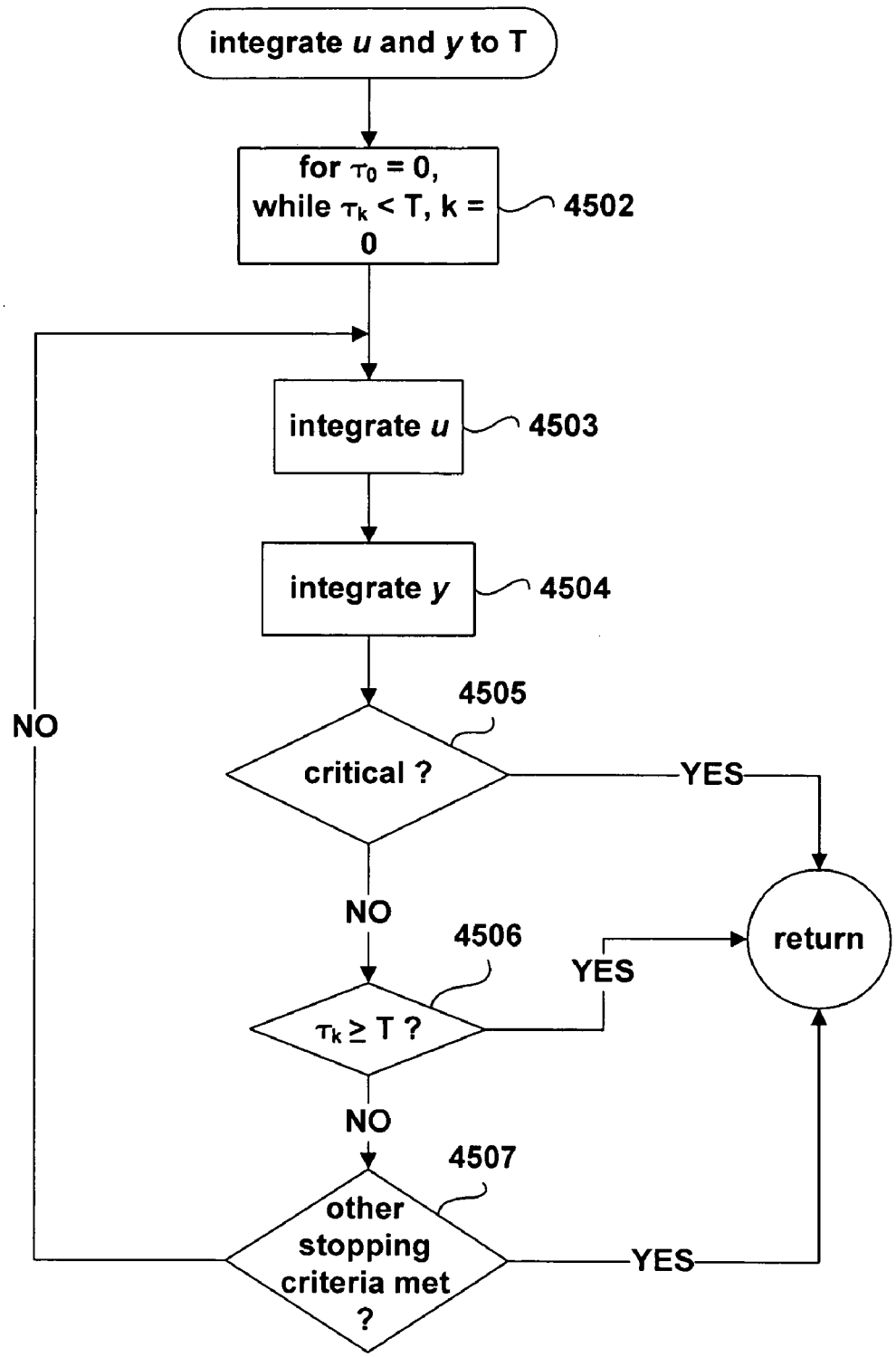
FIG. 45 is a control-flow diagram for the routine "integrate_u_and_y_to_T," called in step 4010 of FIG. 40.

FIG. 45 is a control-flow diagram for the routine "integrate_u_and_to_T," called in step 4010 of FIG. 40. In the for-loop of steps 4502–4507, the routine "integrate_u_and_y_to_T" successively calls the routines "integrate u" and 'steps 4503 and 4504, in order to complete one inner-loop execution for the optimization method. The successive iterations continue until either the optimization thread goes critical, as detected in step 4505, until the value $\tau_k$ is greater than or equal to T, or until some other stopping criteria are detected, such as exhaustion of computational resources or other such stopping criteria in step 4507.

Figure 46:
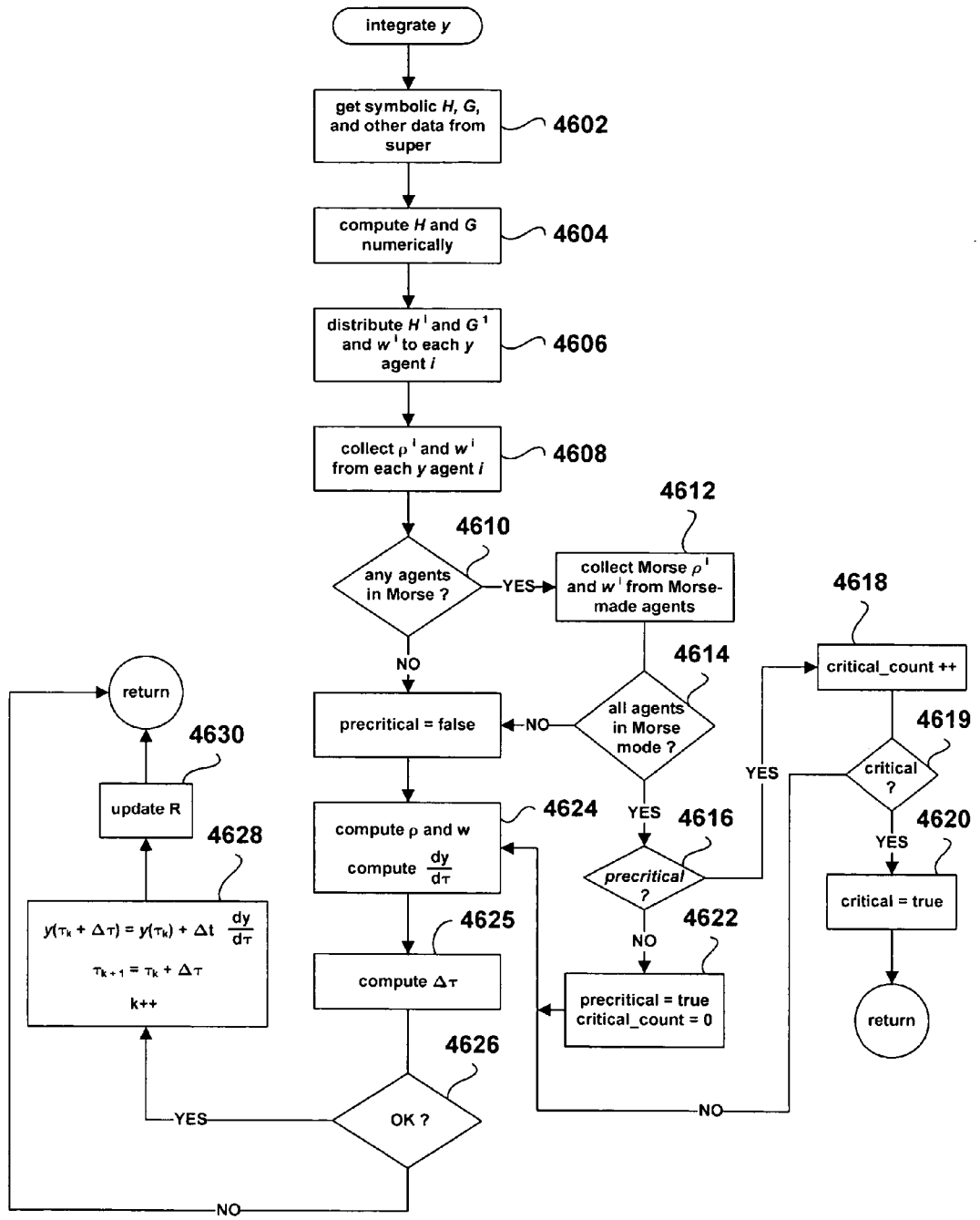
FIG. 46 is a control-flow diagram for the routine "integrate y."

FIG. 46 is a control-flow diagram for the routine "integrate y." This routine describes the operation of the y module (2808 in FIG. 28). In step 4602, the routine "integrate y" obtains symbolic representations of the Hessian matrix, the vector G, and other data needed by the routine "integrate y" from the super module. Next, in step 4604, the routine "integrate y" computes numerical values for the Hessian matrix and vector G. In step 4606, the routine "integrate y" distributes partitions of the computed Hessian and G vector to each y-module agent. The y-module agents compute their associated w-vector partition values and distributed row values, which are collected by the routine "integrate y" in step 4608. In step 4610, the routine "integrate y" determines whether any agents are currently in Morse mode.

The term "Morse mode" refers to an agent that currently needs to compute its w-vector partition based on the Morse quadratic approximation of the original objective function associated with the y agent method since the agent is currently near a critical point with respect to the agent's partition of the vector G. If any agents are in Morse mode, then, in step 4612, the routine "integrate y" directs the Morse-mode agents i to recompute $p^i$ and $w^i$ and collects the recomputed $p^i$ and $w^i$ from each Morse-mode agent i. Next, in step 4614, the routine "integrate y" determines whether all agents are currently in Morse mode. If so, then, in step 4616, the routine "integrate y" determines whether the local variable "precritical" currently has the Boolean value TRUE. If so, then the agents were previously in Morse mode in the previously executed iteration, and so the local variable "critical_count" is incremented, in step 4618. In step 4619, the routine "integrate y" compares the contents of the local variable "critical_count" to a threshold constant and, when the contents of the local variable "critical_count" equals or exceeds the critical constant, the routine "integrate y" concludes that the current optimization thread has remained critical for a sufficient number of iterations to declare the optimization thread to be critical by setting the Boolean flag "critical" to Boolean value TRUE in step 4620. However, if the contents of the variable "critical_count" do not justify declaring the current optimization thread to be critical, then control flows to step 4624. If, back in step 4616, the routine "integrate y" determines that the variable "precritical" did not have the Boolean value TRUE, then, in step 4622, the variable "precritical" is set to true and the variable "critical_count" is initialized to 0 before control flows to step 4624. In step 4624, the routine "integrate y" computes global ρ and w-vector values, and it computes from them the value of $$\frac{dy}{d\tau}.$$

Next, in step 4625, the routine "integrate y" determines a value Δτ for the current Euler forward integration step. If the computation of Δτ succeeds, as determined in step 4626, then the routine "integrate y" carries out the forward integration step, in step 4628, updates the binding variable coefficients, if necessary, in step 4630, and returns. If the computation of Δτ fails, as detected in step 4626, then the routine "integrate y" returns with an error.

The forward Euler integration technique has been discusses above, but is presented formally below. The global value for ρ is assembled from the partitioned ρ values computed by y-module agents in a current inner-loop step as follows:

$$\rho(y(\tau_k), u(\tau_k)) = \sum_{i=0}^{n-1} \rho^i(y(\tau_k), u(\tau_k))$$

Next, the values for the partitions of the w vector are collected from the y-module agents and assembled to produce a w vector. Then, a continuous iteration increment Δτ is computed, by a method to be described below. Finally, the state vector is propagated from a current continuous iteration value $\tau_k$ to a next continuous iteration value $\tau_{k+\Delta\tau}$ as follows:

$$y^i(\tau_k + \Delta\tau_k) = y^i(\tau_k) + \Delta_k dy^i l / d\tau(\tau_k)$$

Finally, the continuous iteration value $\tau_k$ is updated as follows:

$$\tau_k = \tau_k + \Delta\tau_k$$

Note that a y-module agent is considered to be critical with respect to the y-module's vector-G partition when the absolute value of the y-module agent's local ρ, $\rho^i$, falls below some constant parameter. The computation of a w-vector partition $w^i$ and the y-module-agent-local ρ, $\rho^i$, is described below.

Figure 47:
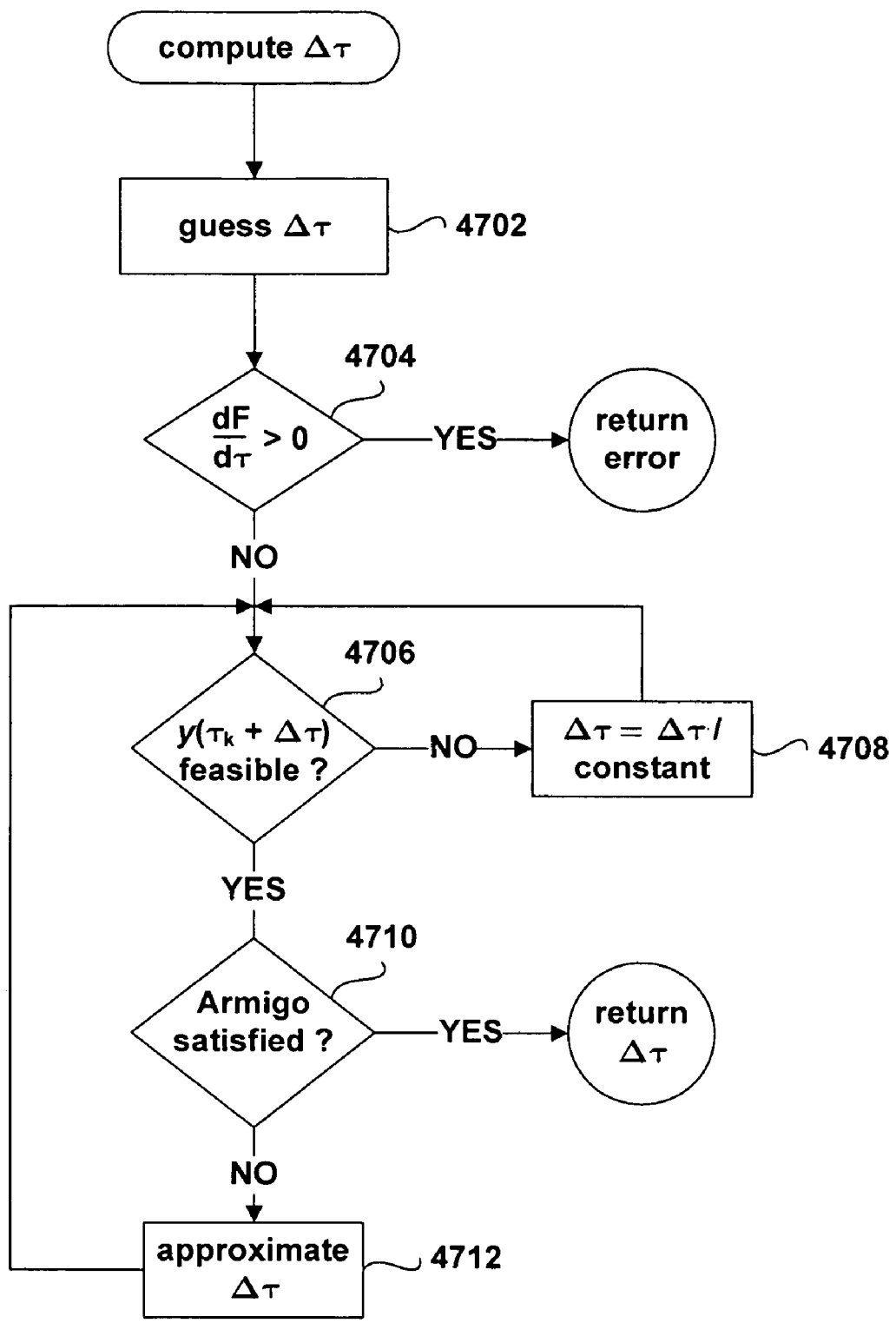
FIG. 47 is a control-flow diagram for the routine "compute $\Delta\tau$," called in step 4625 of FIG. 46.

FIG. 47 is a control-flow diagram for the routine "compute Δτ," called in step 4625 of FIG. 46. In step 4702, a guess, or estimate, Δτ', is made for Δτ. This guess or estimate may be obtained from a constant parameter, or may be, in more elaborate embodiments, derived by empirical methods or heuristics from prior computed values of Δτ and from recent history of state-vector values, control-vector values, and other such information. In the described embodiment, for forward Euler integration steps, when the control vector has an approximate constant value, then F decreases by one at each step:

$$\frac{dF}{d\tau}(y(\tau_k), u(\tau_k)) = -1.$$

When some of the y-module agents are in Morse mode, $$\frac{dF}{d\tau}$$

may depart from the value "−1." However, if the value of $$\frac{dF}{d\tau}$$

ever rises above 0, as detected in step 4704 of the routine "compute Δτ," then an error condition obtains since $$\frac{dy}{d\tau}(\tau_k)$$

is not a descent direction and therefore the forward Euler integration method cannot produce a feasible trajectory y*(τ). Otherwise, the estimate of Δτ, Δτ', is inserted into the forward Euler integration step equation $$y(\tau_k + \Delta\tau') = y(\tau_k) + \Delta\tau' \frac{dy}{d\tau}(\tau_k)$$

and the state vector is propagated to y(τ$_{k+}$ Δτ'). This computed next state-vector value is checked, in step 4706, for feasibility. If the state-vector value is not feasible, then the estimate of Δτ, Δτ', is decreased, in step 4708, and a new forward state-vector value is again computed and checked for feasibility in step 4706. Once a feasible forward state-vector is found with a corresponding Δτ estimate, Δτ', then, in step 4710, the Armijo condition $$F(y(\tau_k + \Delta\tau'), u(\tau_k)) - F(y(\tau_k), u(\tau_k)) < \sigma \Delta\tau' G^T(y(\tau_k), u(\tau_k)) \frac{dy}{d\tau}(\tau_k)$$

is evaluated with respect to the estimate of Δτ, Δτ'. If the Armnijo condition is satisfied, then the estimate of Δτ, Δτ', is returned as the new computed Δτ. Otherwise, Δτ is approximated. Several different approximation methods are available. In the case that a previous feasible estimate of Δτ, Δτ$^A$, is available, then a quadratic approximation to the objective function F around τ$_k$ can be made, as follows:

$$F(y(\tau_k + \Delta\tau), u(\tau_k)) \approx \tilde{F}(\Delta\tau) = a\Delta\tau^2 + b\Delta\tau + c$$

Then, an estimate for Δτ is obtained as follows:

$$\tilde{F}(0) = F(y(\tau_k), u(\tau_k)) = c$$

$$\tilde{F}(\Delta\tau^A) = F(y(\tau_k + \Delta\tau^A), u(\tau_k)) = a(\Delta\tau^A)^2 + b(\Delta\tau^A) + c$$

$$\frac{d\tilde{F}}{d\Delta\tau}(0) = (G(y(\tau_k), u(\tau_k)))^T \frac{dy}{d\tau}(\tau_k) = b$$

$$c = \tilde{F}(0)$$

$$b = (G(y(\tau_k), u(\tau_k)))^T \frac{dy}{d\tau}(\tau_k)$$

$$a = \frac{\tilde{F}(\Delta\tau^A) - \tilde{F}(0) - \Delta\tau^A (G(y(\tau_k), u(\tau_k)))^T \frac{dy}{d\tau}(\tau_k)}{(\Delta\tau^A)^2}$$

A Δτ along the descent direction that minimizes F can be approximated by finding a Δτ that minimizes $\tilde{F}$, which occurs when:

$$\frac{d\tilde{F}(\Delta\tau)}{d(\Delta\tau)} = 2a\Delta\tau + b = 0$$

Therefore:

$$\Delta\tau' = -\frac{b}{2a}$$

When two previous feasible estimates for Δτ for the current τ$_k$ are known, then a cubic approximation method may be employed. However Δτ is approximated in step 4712, the new approximate Δτ is used to recompute a forward value for the state vector, which is then tested for feasibility in step 4706.

As discussed above, when a y-module agent is near a critical point and is therefore in Morse mode, the standard forward Euler integration procedure discussed above is not useful in finding an optimal optimization trajectory y*. In general in the neighborhood of a critical point, the Hessian block-diagonal submatrix H$_{i,i}$ corresponding to ay-module agent i may have negative eigenvalues, and therefore the computed direction might not be a descent direction. However, the Hessian submatrix H$_{i,i}$ can be modified in such a way as to produce a positive definite Hessian submatrix $\hat{H}^{i,i}$ in order to carry out a Morse-mode forward integration of the state vector.

The derivation of the Morse-mode approach to forward integration of the state vector is based on the following three assumptions: (1) the objective function F(y(τ), u(τ)) is roughly constant with respect to u(τ); (2) the Hessian matrix H(y(τ), u(τ)) is diagonally dominant, implying that the y-module agents are partitioned for relative independence; and (3) the state vector y$^i$(τ) changes very little while y-module agent i is in Morse mode. Assume that y-module agent i enters Morse mode, or local criticality, at $\tau_k = \hat{\tau}^i$, as determined by the value of ρ$^i$(y(τ), u(τ)) calculated by the standard method. Then according to the first and third assumptions, above, the objective function F may be approximated about the domain point (y$^0$(τ$_k$), ..., y$^0$($\hat{\tau}^i$), ... y$^{n-1}$(τ$_k$), u($\hat{\tau}^i$)) by a Taylor approximation as follows:

$$F(y(\tau), u(\tau)) = F(y^0(\tau_k) \ldots, y^i(\hat{\tau}^i), \ldots y^{n-1}(\tau_k), u(\hat{\tau}^i)) +$$

$$(G^i(y^0(\tau_k) \ldots, y^i(\hat{\tau}^i), \ldots y^{n-1}(\tau_k), u(\hat{\tau}^i)))^T (y^i(\tau) - y^i(\hat{\tau}^i)) +$$

$$\sum_{\substack{l=0 \\ l \neq i}}^{n-1} (G^l(y^0(\tau_k) \ldots, y^i(\hat{\tau}^i), \ldots y^{n-1}(\tau_k), u(\hat{\tau}^i)))^T (y^l(\tau) - y^l(\hat{\tau}^i)) +$$

$$\frac{1}{2}(y^i(\tau) - y^i(\hat{\tau}^i))^T H^{ii}(y^0(\tau_k) \ldots, y^i(\hat{\tau}^i), \ldots y^{n-1}(\tau_k), u(\hat{\tau}^i))$$

$$(y^i(\tau) - y^i(\hat{\tau}^i)) + (y^i(\tau) - y^i(\hat{\tau}^i))^T$$

$$\sum_{\substack{l=0 \\ l \neq i}}^{n-1} H^{il}(y^0(\tau_k) \ldots, y^i(\hat{\tau}^i), \ldots y^{n-1}(\tau_k), u(\hat{\tau}^i))(y^l(\tau) - y^l(\tau_k)) +$$

$$\frac{1}{2}\sum_{\substack{l^1,l^2=0 \\ l^1,l^2 \neq i}}^{n-1} (y^{l^1}(\tau) - y^{l^1}(\tau_k))^T H^{l^1 l^2}(y^0(\tau_k) \ldots, y^i(\hat{\tau}^i), \ldots y^{n-1}(\tau_k), u(\hat{\tau}^i))$$

$$(y^{l^1}(\tau) - y^{l^1}(\tau_k)) + O(\|y(\tau) - y(\hat{\tau}^i)\|^3)$$

Dropping the third-order term, the objective function can be approximated as:

$$F(y(\tau), u(\tau)) = F(y^0(\tau_k) \ldots, y^i(\hat{\tau}^i), \ldots y^{n-1}(\tau_k), u(\hat{\tau}^i)) +$$

$$(G^i(y^0(\tau_k) \ldots, y^i(\hat{\tau}^i), \ldots y^{n-1}(\tau_k), u(\hat{\tau}^i)))^T (y^i(\tau) - y^i(\hat{\tau}^i)) +$$

$$\sum_{\substack{l=0 \\ l \neq i}}^{n-1} (G^l(y^0(\tau_k) \ldots, y^i(\hat{\tau}^i), \ldots y^{n-1}(\tau_k), u(\hat{\tau}^i)))^T (y^l(\tau) - y^l(\hat{\tau}^i)) +$$

-continued $$\frac{1}{2}(y^i(\tau) - y^i(\hat{\tau}^i))^T H^{ii}(y^0(\tau_k), \ldots, y^i(\hat{\tau}^i), \ldots y^{n-1}(\tau_k), u(\hat{\tau}^i))$$

$$(y^i(\tau) - y^i(\hat{\tau}^i)) + (y^i(\tau) - y^i(\hat{\tau}^i))^T$$

$$\sum_{\substack{l=0 \\ l \neq i}}^{n-1} H^{il}(y^0(\tau_k) \ldots, y^i(\hat{\tau}^i), \ldots y^{n-1}(\tau_k), u(\hat{\tau}^i))(y^l(\tau) - y^l(\tau_k)) +$$

$$\frac{1}{2}\sum_{\substack{l^1, l^2 = 0 \\ l^1, l^2 \neq i}}^{n-1} (y^{l^1}(\tau) - y^{l^1}(\tau_k))^T H^{l^1 l^2}(y^0(\tau_k) \ldots, y^i(\hat{\tau}^i), \ldots y^{n-1}(\tau_k), u(\hat{\tau}^i))$$

$$(y^{l^1}(\tau) - y^{l^1}(\tau_k))$$

The block-diagonal Hessian submatrix $H^{i,i}$ around the domain point $(y^0(\tau_k), \ldots, y^0(\hat{\tau}^i), \ldots, y^{n-1}(\tau_k), u(\hat{\tau}^i))$ can then be transformed to a positive definite matrix using a weak Morse transform, as follows.

Figure 48:
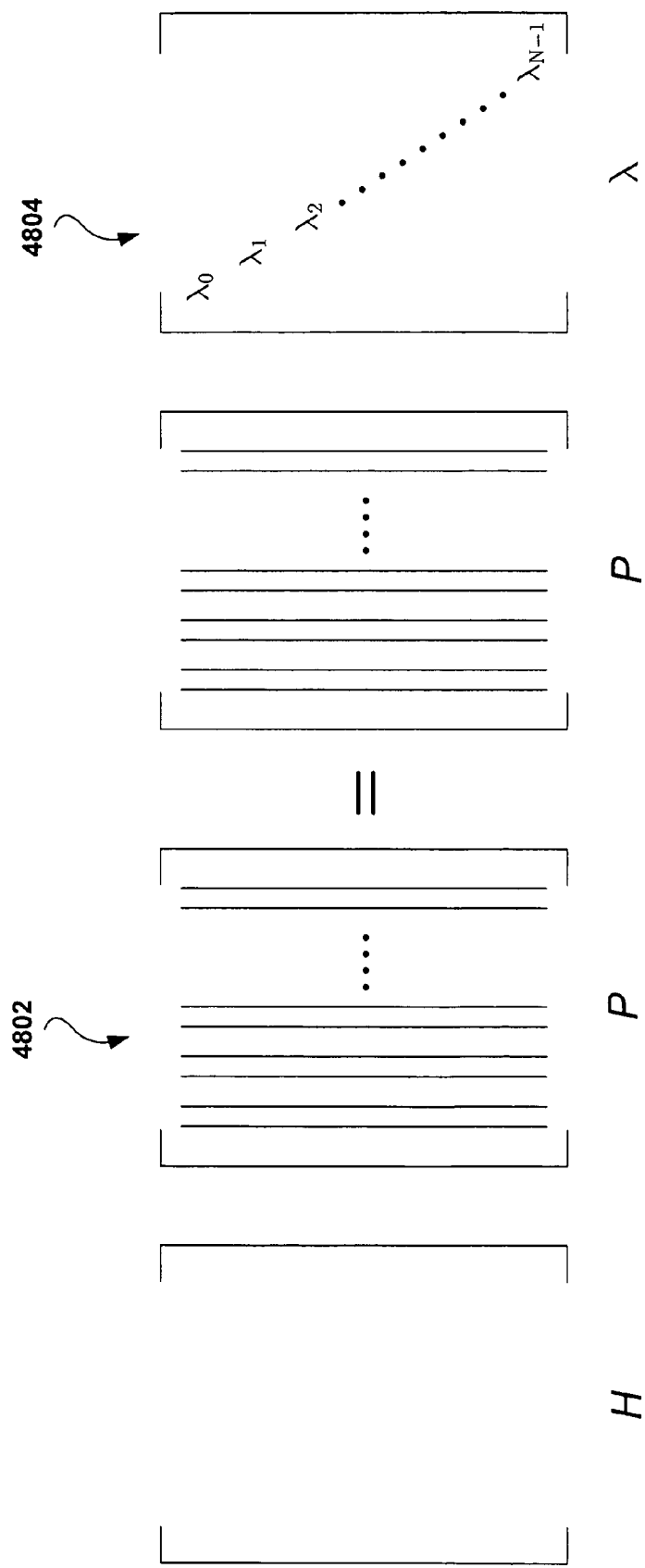
FIG. 48 shows that the Hessian matrix can be decomposed by spectral decomposition.

First, as shown in FIG. 48, the Hessian matrix can be decomposed by spectral decomposition as follows:

$$HP = P\Lambda$$

$$Hp_\alpha = \lambda_\alpha p_\alpha \text{ for } \alpha = 0, \ldots, N-1$$

$$\Lambda = \begin{pmatrix} \lambda_0 & \cdots & 0 \\ \vdots & \ddots & \vdots \\ 0 & \cdots & \lambda_{N-1} \end{pmatrix}$$

$$H = P\Lambda P^T$$

The N×N matrix P 4802 comprises eigenvectors for the Hessian matrix as columns, and the N×N diagonal matrix $\Lambda$ 4804 includes the corresponding eigenvalues of the Hessian matrix.

One approach to transforming the Hessian is to create a new matrix $\hat{P} = [\hat{p}_0, \hat{p}_1, \ldots, \hat{p}_{n-1}]$ in place of the matrix P, where the column vectors are defined as:

$$\hat{p}_\alpha = \begin{cases} P_\alpha & \text{if } \lambda_\alpha > 0 \\ 0 & \text{if } \lambda_\alpha \leq 0 \end{cases} \text{for } \alpha = 0, \ldots, N-1$$

In addition, a new matrix $$\hat{\Lambda} = \begin{pmatrix} \hat{\lambda}_0 & \cdots & 0 \\ \vdots & \ddots & \vdots \\ 0 & \cdots & \hat{\lambda}_{N-1} \end{pmatrix}$$

is defined with diagonal entries:

$$\hat{\lambda}_\alpha = \begin{cases} \lambda_\alpha & \text{if } \lambda_\alpha > 0 \\ 0 & \text{if } \lambda_\alpha \leq 0 \end{cases} \text{for } \alpha = 0, \ldots, N-1$$

Using the previous results, a modified Hessian matrix that is positive definite can be obtained from the modified P matrix and the modified $\Lambda$ matrices as follows:

$$\hat{H} = \hat{P}\hat{\Lambda}\hat{P}^T$$

Furthermore, a reverse for the modified Hessian matrix $\hat{H}^R$ can be computed as follows:

$$\hat{H}^R = \hat{P}\hat{\Lambda}^R \hat{P}^T$$

A reverse is needed because the transformed Hessian may be singular.

A second approach to transforming the Hessian is known as the Strong-Morse Transform, and is used in the Morse-mode forward integration step. In this method, a new modified $\Lambda$ matrix is produced as follows:

$$\hat{\lambda}_\alpha = |\lambda_\alpha| \text{ for } \alpha = 0, \ldots, N-1$$

Then, a modified Hessian is computed as follows:

$$\hat{H} = \hat{P}\hat{\Lambda}\hat{P}^T$$

This transformed Hessian is non-singular and thus the inverse of the transformed Hessian is well defined, as follows:

$$\hat{H}^{-1} = P\hat{\Lambda}^{-1} P^T$$

$$\hat{\Lambda}_{\alpha\alpha}^{-1} = \frac{1}{\hat{\lambda}_\alpha}$$

In alternative embodiments, the weak Morse transform can be used for points that are outside of the Morse mode, points that are far from a critical point.

Using the transformed Hessian, $\hat{H}^{i,i}$, the approximation of the objective function becomes:

$$\check{F}(y(\tau), u(\tau)) = F(y^0(\tau_k) \ldots, y^i(\hat{\tau}^i), \ldots y^{n-1}(\tau_k), u(\hat{\tau}^i)) +$$

$$(G^i(y^0(\tau_k) \ldots, y^i(\hat{\tau}^i), \ldots y^{n-1}(\tau_k), u(\hat{\tau}^i)))^T$$

$$(y^i(\tau) - y^i(\hat{\tau}^i)) +$$

$$\sum_{\substack{l=0 \\ l \neq i}}^{n-1} (G^l(y^0(\tau_k) \ldots, y^i(\hat{\tau}^i), \ldots y^{n-1}(\tau_k), u$$

$$(\hat{\tau}^i)))^T (y^l(\tau) - y^l(\hat{\tau}^i)) + \frac{1}{2}(y^i(\tau) - y^i(\hat{\tau}^i))^T H^{ii}$$

$$(y^0(\tau_k) \ldots, y^i(\hat{\tau}^i), \ldots y^{n-1}(\tau_k), u(\hat{\tau}^i))$$

$$(y^i(\tau) - y^i(\hat{\tau}^i)) + (y^i(\tau) - y^i(\hat{\tau}^i))^T$$

$$\sum_{\substack{l=0 \\ l \neq i}}^{n-1} H^{il}(y^0(\tau_k) \ldots, y^i(\hat{\tau}^i), \ldots y^{n-1}(\tau_k), u(\hat{\tau}^i))$$

$$(y^l(\tau) - y^l(\hat{\tau}_k)) + \frac{1}{2}$$

$$\sum_{\substack{l^1, l^2 = 0 \\ l^1, l^2 \neq i}}^{n-1} (y^{l^1}(\tau) - y^{l^1}(\tau_k))^T H^{l^1 l^2}$$

$$(y^0(\tau_k) \ldots, y^i(\hat{\tau}^i), \ldots y^{n-1}(\tau_k), u(\hat{\tau}^i))$$

$$(y^{l^2}(\tau) - y^{l^2}(\tau_k))$$

Taking the derivative of this approximate objective function with respect to the $i^{th}$ partition of the state vector $y^i(\tau)$ yields the $i^{th}$ partition of the vector G, as follows:

$$\check{G}^i(y(\tau), u(\tau)) = \frac{\partial \check{F}(y(\tau), u(\tau))}{\partial y^i}$$

$$= G^i(y^0(\tau_k)\ldots, y^i(\hat{\tau}^i), \ldots y^{n-1}(\tau_k), u(\hat{\tau}^i)) +$$

$$\hat{H}^{ii}(y^0(\tau_k)\ldots, y^i(\hat{\tau}^i), \ldots y^{n-1}(\tau_k), u$$

$$(\hat{\tau}^i))(y^i(\tau) - y^i(\hat{\tau}^i)) + \sum_{\substack{l=0 \\ l \neq i}}^{n-1} H^{il}(y^0(\tau_k)\ldots,$$

$$y^i(\hat{\tau}^i), \ldots y^{n-1}(\tau_k), u(\hat{\tau}^i))(y^l(\tau) - y^l(\tau_k))$$

The $i^{th}$ partition of the vector G evaluated at $\tau_k$ is then:

$$\check{G}^i(y(\tau), u(\tau)) = \left(\frac{\partial \check{F}(y(\tau), u(\tau))}{\partial y^i}\right)\bigg|_{\tau=\tau_k}$$

$$= G^i(y^0(\tau_k)\ldots, y^i(\hat{\tau}^i), \ldots y^{n-1}(\tau_k), u(\hat{\tau}^i)) +$$

$$\hat{H}^{ii}(y^0(\tau_k)\ldots, y^i(\hat{\tau}^i), \ldots y^{n-1}(\tau_k), u$$

$$(\hat{\tau}^i))(y^i(\tau_k) - y^i(\hat{\tau}^i))$$

The Hessian submatrices are therefore given by:

$$\check{H}^{ij}(y(\tau_k), u(\tau_k)) =$$

$$\begin{cases} \hat{H}^{ii}(y^0(\tau_k)\ldots, y^i(\hat{\tau}^i), \ldots y^{n-1}(\tau_k), u(\hat{\tau}^i)) \text{ if } i = j \\ H^{ij}(y^0(\tau_k)\ldots, y^i(\hat{\tau}^i), \ldots y^{n-1}(\bar{\tau}), u(\hat{\tau}^i)) \text{ otherwise} \end{cases}$$

Again, the off-diagonal Hessian submatrices are not modified by the Strong-Morse Transform since the Hessian is diagonally dominant, and the off-diagonal submatrices contribute very little to the approximation of the objective function. Using assumption 2, above, the block-diagonal Hessian submatrix at $\tau_k$ is approximately equal to the block-diagonal Hessian submatrix at $\hat{\tau}^i$ $$\hat{H}^{ii}(y^0(\tau_k)\ldots, y^j(\hat{\tau}^i), \ldots y^{n-1}(\tau_k), u(\hat{\tau}^i)) \approx \hat{H}^{ii}(y^0(\hat{\tau}^i)\ldots, y^j(\hat{\tau}^i), \ldots y^{n-1}(\hat{\tau}^i), u(\hat{\tau}^i)) = \hat{H}^{ii}(y(\hat{\tau}^i), u(\hat{\tau}^i))$$

Similarly the third assumption, above, implies that $$G^i(y^0(\tau_k)\ldots, y^j(\hat{\tau}^i), \ldots y^{n-1}(\tau_k), u(\hat{\tau}^i)) \approx G^i(y^0(\tau_k)\ldots, y^j(\tau_k), \ldots y^{n-1}(\tau_k), u(\tau_k)) = G^i(y(\tau_k), u(\tau_k))$$

$$H^{ij}(y^0(\tau_k)\ldots, y^j(\hat{\tau}^i), \ldots y^{n-1}(\tau_k), u(\hat{\tau}^i)) \approx H^{ij}(y^0(\tau_k)\ldots, y^j(\tau_k), \ldots y^{n-1}(\tau_k), u(\tau_k)) = H^{ij}(y(\tau_k), u(\tau_k))$$

Therefore, the vector G of the approximated objective function $\check{F}(y(\tau), u(\tau))$ evaluated at $\tau_k$ is well approximated as follows:

$$\check{G}(y(\tau_k), u(\tau_k)) \approx G^i(y(\tau_k), u(\tau_k)) + \hat{H}^{ii}(y(\hat{\tau}^i), u(\hat{\tau}^i))(y^i(\tau_k) - y^i(\hat{\tau}^i))$$

and the Hessian submatrix for the approximated objective function evaluated at $\tau_k$ can be approximated as $$\check{H}^{ij}(y(\tau_k), u(\tau_k)) = \begin{cases} \hat{H}^{ii}(y(\hat{\tau}^i), u(\hat{\tau}^i)) \text{ if } i = j \\ H^{ij}(y(\tau_k), u(\tau_k)) \text{ otherwise} \end{cases}$$

These approximations then allow for approximate calculation of the w-vector partition and the local $\rho$ for agent i, $w^i$ and $\tau^i$, as follows:

$$w^i(y(\tau_k), u(\tau_k)) = \left(\hat{H}^{ii}(y(\hat{\tau}^i), u(\hat{\tau}^i))\right)^{-1}$$

$$\left(\check{G}^i(y(\tau_k), u(\tau_k)) - \sum_{\substack{j=0 \\ j \neq i}}^{n-1} H^{ij}(y(\tau_k), u(\tau_k))w^j(y(\tau_{k-1}), u(\tau_{k-1}))\right)$$

$$\rho^i(y(\tau_k), u(\tau_k)) = \left(\check{G}^i(y(\tau_k), u(\tau_k))\right)^T w^i(y(\tau_k), u(\tau_k))$$

$$\rho(y(\tau_k), u(\tau_k)) = \sum_{i=0}^{n-1} \rho^i(y(\tau_k), u(\tau_k))$$

$$\frac{dy^i}{d\tau}(\tau_k) = -\frac{w^i(y(\tau_k), u(\tau_k))}{\rho(y(\tau_k), u(\tau_k))}$$

In step 4630 of FIG. 46, the binding variable coefficients may be adjusted. Although the binding variable coefficients might be continuously adjusted, as implied by FIG. 19, in at least one embodiment of the present invention, the adjustment is binary and occurs when $$y_N - \left(C(y) + \sum_{\alpha=0}^{M_2-1} r_\alpha s_\alpha\right) < u_M + \text{ipm\_R\_switch\_offset}$$

where $y_N$ is the envelope variable z.

At the point when the binding variable coefficients are adjusted, they are adjusted to some larger constant value from their original smaller, constant value. At this point, the state vector needs also to be adjusted, so that adjustment of the binding variable coefficient does not force the state vector to an infeasible point. The state vector is adjusted as follows:

$$y_N = \left(C(y) + \sum_{\alpha=0}^{M_2-1} r_\alpha s_\alpha\right) < u_M + \text{ipm\_C\_offset2}$$

where the parameter "ipm_c_offset2" has a value close to one.

The u_and_r module needs to compute a next value for the control vector u during each iteration of the inner loop. This computation is very similar to computation of y vector in y-module agents. As discussed above, the iterative equation for calculation of a next control vector u is:

$$u_{k+1} = u_k - \phi_k$$

For the formulation of the static problem we use a convex quadratic approximation of the Hamiltonian for each iteration. Since we can find an explicit expression for the minimum we do not necessarily need the parameter σ. The u computation only takes one step.

Let $u_k = u|_{\tau_k}$ be a point of the function H(y,u,p). A second order approximation around $u_k$, given a fixed $y_k$ and $p_k$, using a second order Taylor expansion can be computed as follows:

$$\mathcal{H}|_{y_k,u_k,p_k} \approx \mathcal{H}|_{y_k,u,p_k} +$$

$$\Psi|_{y_k,u_k,p_k}(u-u_k) + \frac{1}{2}(u-u_k)^T \frac{\partial \Psi}{\partial u}\bigg|_{y_k,u_k,p_k}(u-u_k)$$

where $\Psi$ is defined as $$\frac{\partial \mathcal{H}}{\partial u}.$$

This is a quadratic function, but it is not necessarily convex since $$\frac{\partial \Psi}{\partial u}$$

is not necessarily positive definite. A Morse-transform can be used to transform $$\frac{\partial \Psi}{\partial u}$$

to a positive definite convex approximation $$\frac{\partial \hat{\Psi}}{\partial u},$$

as was done above for the Hessian matrix.

The Hamiltonian matrix can then be approximated as:

$$\hat{\mathcal{H}}|_{y_k,u_k,p_k} \approx \mathcal{H}|_{y_k,u_k,p_k} +$$

$$\Psi|_{y_k,u_k,p_k}(u-u_k) + \frac{1}{2}(u-u_k)^T \frac{\partial \hat{\Psi}}{\partial u}\bigg|_{y_k,u_k,p_k}(u-u_k)$$

Defining $\Delta u = u - u_k$, $$\hat{\mathcal{H}}|_{y_k,u_k,p_k} \approx \mathcal{H}|_{y_k,u_k,p_k} +$$

$$\Psi|_{y_k,u_k,p_k}\Delta u + \frac{1}{2}\Delta u^T \frac{\partial \hat{\Psi}}{\partial u}\bigg|_{y_k,u_k,p_k} u\Delta$$

In the following discussion, the dependence on $y_k$, $u_k$, and $p_k$ is not explicitly shown. The minimum of the above function can be found by setting the gradient of the objective function equal to 0 and solving for $\Delta u$. Since $$\frac{\partial \hat{\mathcal{H}}}{\partial \Delta u} = \Psi + \Delta u^T \frac{\partial \hat{\Psi}}{\partial u}\bigg|_{y_k,u_k,p_k}$$

then $$\Delta u = -\left(\frac{\partial \hat{\Psi}}{\partial u}\right)^R \Psi$$

where the superscript R denotes the reverse, described above. Defining:

$$\hat{\varphi} = \left(\frac{\partial \hat{\Psi}}{\partial u}\right)^R (\Psi)$$

then $$\Delta u = -\hat{\varphi}$$

This allows for iterative update of the control:

$$u_{k+1} = u_k + \Delta u$$

However, solving for $\Psi$ and $$\frac{\partial \Psi}{\partial u}$$

is a computationally involved process. The Hamiltonian is expressed as follows:

$$\mathcal{H} = 1 - p^T \frac{w}{\rho}$$

$$= 1 - \frac{\sum_{\zeta=0}^{N-1} p_\zeta w_\zeta}{\rho}$$

Using the chain rule and the fact that p is treated as a constant during the control computation:

$$\Psi_\alpha = \frac{\partial \mathcal{H}}{\partial u_\alpha} = -\sum_{\zeta=0}^{N-1} p_\zeta \left(\frac{1}{\rho}\frac{\partial w_\zeta}{\partial u_\alpha} - \frac{1}{\rho^2} w_\zeta \frac{\partial \rho}{\partial u_\alpha}\right)$$

for α=0, ..., M−1 and $$\frac{\partial \Psi_\alpha}{\partial u_\beta} = \frac{\partial^2 H}{\partial u_\alpha \partial u_\beta} =$$

$$-\sum_{\zeta=0}^{N-1} p_\zeta \left[\frac{1}{\rho}\frac{\partial^2 w_\zeta}{\partial u_\alpha \partial u_\beta} - \frac{1}{\rho^2}\frac{\partial w_\zeta}{\partial u_\alpha}\frac{\partial \rho}{\partial u_\beta} - \frac{1}{\rho^2} w_\zeta \frac{\partial^2 \rho}{\partial u_\alpha \partial u_\beta} + \frac{2}{\rho^3} w_\zeta \frac{\partial \rho}{\partial u_\alpha}\frac{\partial \rho}{\partial u_\beta}\right]$$

for α,β=0, ..., M−1

By definition:

$$w_\alpha = \sum_{\zeta=0}^{N-1} H_{\alpha\zeta}^{-1} G_\zeta$$

for $\alpha=0, \ldots, N-1$, the first derivative of which, with respect to u, is:

$$\frac{\partial w_\alpha}{\partial u_\beta} = \sum_{\zeta=0}^{N-1}\left(\frac{\partial H_{\alpha\zeta}^{-1}}{\partial u_\beta} G_\zeta + H_{\alpha\zeta}^{-1}\frac{\partial G_\zeta}{\partial u_\beta}\right)$$

for $\alpha=0, \ldots, N-1$ and $\beta=0, \ldots, M-1$.

The inverse of the Hessian matrix $H^{-1}$ is defined as:

$$H^{-1}H = I$$

and can be written in terms of its elements as:

$$\sum_{\zeta=0}^{N-1} H_{\alpha\zeta}^{-1} H_{\zeta\eta} = \delta_{\alpha\eta}$$

for $\alpha,\beta=0, \ldots, N-1$ and where:

$$\delta_{\alpha\eta} = \begin{cases} 1 & \text{if } \alpha = \eta \\ 0 & \text{if otherwise} \end{cases}$$

Taking the derivative with respect to u on both sides, using the product rule:

$$\sum_{\zeta=0}^{N-1}\left(\frac{\partial H_{\alpha\zeta}^{-1}}{\partial u_\gamma} H_{\zeta\eta} + H_{\alpha\zeta}^{-1}\frac{\partial H_{\zeta\eta}}{\partial u_\gamma}\right) = 0$$

for $\alpha,\eta=0, \ldots, N-1$ and $\gamma=0, \ldots, M-1$. Rearranging terms:

$$\sum_{\zeta=0}^{N-1}\frac{\partial H_{\alpha\zeta}^{-1}}{\partial u_\gamma} H_{\zeta\eta} = -\sum_{\eta=0}^{N-1} H_{\alpha\zeta}^{-1}\frac{\partial H_{\zeta\eta}}{\partial u_\gamma}$$

and multiplying both sides by $H^{-1}$:

$$\sum_{\zeta=0}^{N-1}\sum_{\beta=0}^{N-1}\frac{\partial H_{\alpha\zeta}^{-1}}{\partial u_\gamma} H_{\zeta\eta} H_{\eta\beta}^{-1} = -\sum_{\zeta=0}^{N-1}\sum_{\beta=0}^{N-1} H_{\alpha\zeta}^{-1}\frac{\partial H_{\zeta\eta}}{\partial u_\gamma} H_{\eta\beta}^{-1}$$

the expression can be simplified to:

$$\sum_{\zeta=0}^{N-1}\frac{\partial H_{\alpha\zeta}^{-1}}{\partial u_\gamma}\delta_{\zeta\beta} = \frac{\partial H_{\alpha\beta}^{-1}}{\partial u_\gamma}$$

providing an explicit expression for the elements of $H^{-1}$ $$\frac{\partial H^{-1}}{\partial u_r} = -\sum_{\eta=0}^{N-1}\sum_{\beta=0}^{N-1} H_{\alpha\zeta}^{-1}\frac{\partial H_{\zeta\eta}}{\partial u_r} H_{\eta\beta}^{-1}$$

Substituting the expression for $H^{-1}$ into:

$$\frac{\partial w_\alpha}{\partial u_\beta} = \sum_{\zeta=0}^{N-1}\left(\frac{\partial H_{\alpha\zeta}^{-1}}{\partial u_\beta} G_\zeta + H_{\alpha\zeta}^{-1}\frac{\partial G_\zeta}{\partial u_\beta}\right)$$

provides:

$$\frac{\partial w_\alpha}{\partial u_\beta} = \sum_{\zeta=0}^{N-1}\left(\frac{\partial H_{\alpha\zeta}^{-1}}{\partial u_\beta} G_\zeta + H_{\alpha\zeta}^{-1}\frac{\partial G_\zeta}{\partial u_\beta}\right)$$

$$= \sum_{\zeta=0}^{N-1}\left(\left(-\sum_{\eta=0}^{N-1}\sum_{\omega=0}^{N-1} H_{\alpha\eta}^{-1}\frac{\partial H_{\eta\omega}}{\partial u_\beta} H_{\omega\zeta}^{-1}\right) G_\zeta + H_{\alpha\zeta}^{-1}\frac{\partial G_\zeta}{\partial u_\beta}\right)$$

$$= -\sum_{\zeta=0}^{N-1}\sum_{\eta=0}^{N-1}\sum_{\omega=0}^{N-1} H_{\alpha\eta}^{-1}\frac{\partial H_{\eta\omega}}{\partial u_\beta} H_{\omega\zeta}^{-1} G_\zeta + \sum_{\eta=0}^{N-1} H_{\alpha\eta}^{-1}\frac{\partial G_\eta}{\partial u_\beta}$$

$$= -\sum_{\eta=0}^{N-1}\sum_{\omega=0}^{N-1} H_{\alpha\eta}^{-1}\frac{\partial H_{\eta\omega}}{\partial u_\beta} w_\omega + \sum_{\eta=0}^{N-1} H_{\alpha\eta}^{-1}\frac{\partial G_\eta}{\partial u_\beta}$$

$$= \sum_{\eta=0}^{N-1} H_{\alpha\eta}^{-1}\left(\frac{\partial G_\eta}{\partial u_\beta} - \sum_{\omega=0}^{N-1}\frac{\partial H_{\eta\omega}}{\partial u_\beta} w_\omega\right)$$

for $\alpha=0, \ldots, N-1$ and $\beta=0, \ldots, M-1$.

The second derivative is $$\frac{\partial^2 w_\alpha}{\partial u_\beta \partial u_\gamma} = \sum_{\eta=0}^{N-1}\left\{\frac{\partial H_{\alpha\eta}^{-1}}{\partial u_\gamma}\left(\frac{\partial G_\eta}{\partial u_\beta} - \sum_{\omega=0}^{N-1}\frac{\partial H_{\eta\omega}}{\partial u_\beta} w_\omega\right) - H_{\alpha\eta}^{-1}\left(\sum_{\omega=0}^{N-1}\frac{\partial H_{\eta\omega}}{\partial u_\beta}\frac{\partial w_\omega}{\partial u_\gamma}\right)\right\}$$

Note that the expression is simplified by the fact that the second derivative of the gradient of F and Hessian matrix with respect to u is 0 since these terms are linear in u. Substituting the expression for $H^{-1}$ into the above expression provides:

$$\frac{\partial^2 w_\alpha}{\partial u_\beta \partial u_\gamma} = -\sum_{\zeta=0}^{N-1}\left\{H_{\alpha\zeta}^{-1}\sum_{\theta=0}^{N-1}\frac{\partial H_{\zeta\theta}}{\partial u_\gamma}\sum_{\eta=0}^{N-1} H_{\alpha\eta}^{-1}\left(\frac{\partial G_\eta}{\partial u_\beta} - \sum_{\omega=0}^{N-1}\frac{\partial H_{\eta\omega}}{\partial u_\beta} w_\omega\right)\right\} -$$

$$\sum_{\eta=0}^{N-1} H_{\alpha\eta}^{-1}\left(\sum_{\omega=0}^{N-1} \frac{\partial H_{\eta\omega}}{\partial u_\beta} \frac{\partial w_\omega}{\partial u_\gamma}\right)$$

This can be simplified as follows:

$$\frac{\partial^2 w_\alpha}{\partial u_\beta \partial u_\gamma} = -\sum_{\zeta=0}^{N-1} H_{\alpha\zeta}^{-1}\left(\sum_{\theta=0}^{N-1} \frac{\partial H_{\zeta\theta}}{\partial u_\gamma} \frac{\partial w_\theta}{\partial u_\beta}\right) -$$

$$\sum_{\eta=0}^{N-1} H_{\alpha\eta}^{-1}\left(\sum_{\omega=0}^{N-1} \frac{\partial H_{\eta\omega}}{\partial u_\beta} \frac{\partial w_\omega}{\partial u_\gamma}\right)$$

$$= -\sum_{\zeta=0}^{N-1} H_{\alpha\zeta}^{-1}\left(\sum_{\theta=0}^{N-1} \frac{\partial H_{\zeta\theta}}{\partial u_\gamma} \frac{\partial w_\theta}{\partial u_\beta}\right) - \sum_{\zeta=0}^{N-1} H_{\alpha\zeta}^{-1}\left(\sum_{\theta=0}^{N-1} \frac{\partial H_{\zeta\theta}}{\partial u_\beta} \frac{\partial w_\theta}{\partial u_\gamma}\right)$$

$$= -\sum_{\zeta=0}^{N-1} H_{\alpha\zeta}^{-1}\left(\sum_{\theta=0}^{N-1} \frac{\partial H_{\zeta\theta}}{\partial u_\gamma} \frac{\partial w_\theta}{\partial u_\beta} + \frac{\partial H_{\zeta\theta}}{\partial u_\beta} \frac{\partial w_\theta}{\partial u_\gamma}\right)$$

Next the denominator, $\rho$, is defined as $$\rho = \sum_{\zeta=0}^{N-1} G_\zeta w_\zeta$$

The first and second derivatives with respect to u are, using the product rule, $$\frac{\partial \rho}{\partial u_\alpha} = \sum_{\zeta=0}^{N-1}\left(\frac{\partial G_\zeta}{\partial u_\alpha} w_\zeta + G_\zeta \frac{\partial w_\zeta}{\partial u_\alpha}\right)$$

for $\alpha = 0, \ldots, M-1$
and $$\frac{\partial^2 \rho}{\partial u_\alpha \partial u_\beta} = \sum_{\zeta=0}^{N-1}\left(\frac{\partial G_\zeta}{\partial u_\alpha} \frac{\partial w_\zeta}{\partial u_\beta} + \frac{\partial G_\zeta}{\partial u_\beta} \frac{\partial w_\zeta}{\partial u_\alpha} + G_\zeta \frac{\partial^2 w_\zeta}{\partial u_\alpha u_\beta}\right)$$

for $\alpha, \beta = 0, \ldots, M-1$

Next, a formal distributed algorithm is discussed. Multiplying both sides of:

$$\hat{\varphi} = \left(\frac{\partial \hat{\Psi}}{\partial u}\right)^R (\Psi)$$

by:

$$\left(\left(\frac{\partial \hat{\Psi}}{\partial u}\right)^R\right)^{-1}$$

results in:

$$\frac{\partial \hat{\Psi}}{\partial u} \hat{\varphi} = \Psi$$

Expressing the relationship in terms of the $r^{th}$ agent:

$$\frac{\partial \hat{\Psi}^r}{\partial u^r} \hat{\varphi}^r + \sum_{\substack{s=0 \\ s \neq r}}^{M-1} \frac{\partial \Psi^{rs}}{\partial u^s} \hat{\varphi}^s \Psi^r$$

for $i = 0, \ldots, M-1$. Rearranging terms:

$$\frac{\partial \hat{\Psi}^r}{\partial u^r} \hat{\varphi}^r = \Psi^r - \sum_{\substack{s=0 \\ s \neq r}}^{M-1} \frac{\partial \Psi^{rs}}{\partial u^s} \hat{\varphi}^s$$

Using the notation:

$$\tilde{\Psi}^r = \left(\Psi^r - \sum_{\substack{s=0 \\ s \neq r}}^{M-1} \frac{\partial \Psi^{rs}}{\partial u^s} \hat{\varphi}^s\right)$$

Multiplying both sides by the inverse of $$\frac{\partial \hat{\Psi}^r}{\partial u^r}$$

provides:

$$\hat{\varphi}^r = \left(\frac{\partial \hat{\Psi}^r}{\partial u^r}\right)^R \tilde{\Psi}^r$$

results in:

$$\Delta u^r = -\hat{\varphi}^r$$

Thus, the control can be updated by:

$$u_{k+1}{}^r += u_k{}^r + \Delta u^r$$

The definition for the Hamiltonian is now written in terms of agents:

$$\mathcal{H} = 1 - \frac{\sum_{i=0}^{n-1} \sum_{\zeta=0}^{N'-1} p_\zeta^i w_\zeta^j}{\rho}$$

Then $$\Psi_\alpha^r = \frac{\partial \mathcal{H}}{\partial u_\alpha^r} = -\sum_{i=0}^{n-1} \sum_{\zeta=0}^{N'-1} p_\zeta^i \left[\frac{1}{\rho} \frac{\partial w_\zeta^j}{\partial u_\alpha^r} - \frac{1}{\rho^2} w_\zeta^j \frac{\partial \rho}{\partial u_\alpha^r}\right]$$

-continued and $$\frac{\partial \Psi_\alpha^r}{\partial u_\beta^s} = -\sum_{i=0}^{n-1} \sum_{\zeta=0}^{N^i-1} p_\zeta^i$$

$$\left[ \frac{1}{\rho} \frac{\partial^2 w_\zeta^i}{\partial u_\alpha^r \partial u_\beta^s} - \frac{1}{\rho^2} \frac{w_\zeta^i}{\partial u_\beta^s} \frac{\partial \rho}{\partial u_\alpha^r} - \frac{1}{\rho^2} \frac{\partial w_\zeta^i}{\partial u_\alpha^s} \frac{\partial \rho}{\partial u_\beta^r} - \frac{1}{\rho^2} w_\zeta^i \frac{\partial^2 \rho}{\partial u_\alpha^r \partial u_\beta^s} + \frac{2}{\rho^3} w_\zeta^i \frac{\partial \rho}{\partial u_\alpha^r} \frac{\partial \rho}{\partial u_\beta^s} \right]$$

Considering that:

$$w_\alpha^i = \sum_{\zeta=0}^{N^i-1} (H^{ii})_{\alpha\zeta}^{-1} \tilde{G}_\zeta^i$$

for $\alpha = 0, \ldots, n^i$ and that:

$$\tilde{G}_\zeta^i = G_\zeta^i - \sum_{\substack{j=0 \\ j \neq i}}^{n-1} \sum_{\eta=0}^{N^j-1} (H^{ij})_{\zeta\eta} w_\eta^j$$

each element a of the w vector for agent I can be expressed as:

$$\frac{\partial w_\alpha^j}{\partial u_\beta^r} = \sum_{\zeta=0}^{N^i-1} \left\{ \frac{\partial (H^{ii})_{\alpha\zeta}^{-1}}{\partial u_\beta^r} \tilde{G}_\zeta^i + (H^{ii})_{\alpha\zeta}^{-1} \frac{\partial \tilde{G}_\zeta^i}{\partial u_\beta^r} \right\}$$

Substituting the definition of $H^{-1}$ in the previous expression:

$$\frac{\partial w_\alpha^j}{\partial u_\beta^r} = \sum_{\zeta=0}^{N^i-1} \left\{ \left( -\sum_{\eta=0}^{N^i-1} \sum_{\omega=0}^{N^i-1} (H^{ii})_{\alpha\eta}^{-1} \frac{\partial H^{ii}_{\eta\omega}}{\partial u_\beta} (H^{ii})_{\omega\zeta}^{-1} \right) \tilde{G}_\zeta^i + (H^{ii})_{\alpha\zeta}^{-1} \frac{\partial \tilde{G}_\zeta^i}{\partial u_\beta^r} \right\}$$

Rearranging terms:

$$\frac{\partial w_\alpha^j}{\partial u_\beta^r} = \sum_{\zeta=0}^{N^i-1} (H^{ii})_{\alpha\zeta}^{-1} \frac{\partial \tilde{G}_\zeta^i}{\partial u_\beta^r} - \sum_{\eta=0}^{N^i-1} \sum_{\omega=0}^{N^i-1} (H^{ii})_{\alpha\eta}^{-1} \frac{\partial H^{ii}_{\eta\omega}}{\partial u_\beta^r} w_\omega^j$$

$$\frac{\partial w_\alpha^j}{\partial u_\beta^r} = \sum_{\zeta=0}^{N^i-1} (H^{ii})_{\alpha\zeta}^{-1} \left\{ \frac{\partial \tilde{G}_\zeta^i}{\partial u_\beta^r} - \sum_{\omega=0}^{n^i-1} \frac{\partial (H^{ii})_{\zeta\omega}}{\partial u_\beta^r} w_\omega^j \right\}$$

Since the second derivatives of G and H with respect to u are 0:

$$\frac{\partial^2 w_\alpha^j}{\partial u_\beta^r \partial u_\gamma^s} = \sum_{\zeta=0}^{N^i-1} \frac{\partial (H^{ii})_{\alpha\zeta}^{-1}}{\partial u_\gamma^s} \left\{ \frac{\partial \tilde{G}_\zeta^i}{\partial u_\beta^r} - \sum_{\omega=0}^{n^i-1} \frac{\partial H^{ii}_{\zeta\omega}}{\partial u_\beta} w_\omega^j \right\} - (H^{ii})_{\alpha\zeta}^{-1} \left( \sum_{\omega=0}^{n^i-1} \frac{\partial H^{ii}_{\zeta\omega}}{\partial u_\beta^r} \frac{\partial w_\omega^j}{\partial u_\gamma^s} \right) + (H^{ii})_{\alpha\zeta}^{-1} \left( \frac{\partial^2 \tilde{G}_\zeta^i}{\partial u_\beta^r \partial u_\gamma^s} \right)$$

However:

$$\frac{\partial^2 w_\alpha^j}{\partial u_\beta^r \partial u_\gamma^s} = \sum_{\zeta=0}^{N^i-1} \left\{ -\sum_{\kappa=0}^{N^i-1} \sum_{\theta=0}^{N^i-1} (H^{ii})_{\alpha\kappa}^{-1} \frac{\partial H^{ii}_{\kappa\theta}}{\partial u_\gamma^s} \frac{\partial w_\theta^j}{\partial u_\beta^r} \right\} - (H^{ii})_{\alpha\zeta}^{-1} \left( \sum_{\omega=0}^{N^i-1} \frac{\partial H^{ii}_{\zeta\omega}}{\partial u_\beta^r} \frac{\partial w_\omega^j}{\partial u_\gamma^s} \right) + (H^{ii})_{\alpha\zeta}^{-1} \left( \frac{\partial^2 \tilde{G}_\zeta^i}{\partial u_\beta^r \partial u_\gamma^s} \right)$$

Separating terms and changing indices of the last two terms:

$$\frac{\partial^2 w_\alpha^j}{\partial u_\beta^r \partial u_\gamma^s} = \left( -\sum_{\kappa=0}^{N^i-1} \sum_{\theta=0}^{N^i-1} (H^{ii})_{\alpha\kappa}^{-1} \frac{\partial H^{ii}_{\kappa\theta}}{\partial u_\gamma^s} \frac{\partial w_\theta^j}{\partial u_\beta^r} \right) -$$

$$\left( \sum_{\omega=0}^{N^i-1} (H^{ii})_{\alpha\zeta}^{-1} \sum_{\omega=0}^{n^i-1} \frac{\partial H^{ii}_{\zeta\omega}}{\partial u_\beta^r} \frac{\partial w_\omega^j}{\partial u_\gamma^s} \right) + \sum_{\zeta=0}^{N^i-1} (H^{ii})_{\alpha\zeta}^{-1} \left( \frac{\partial^2 \tilde{G}_\zeta^i}{\partial u_\beta^r \partial u_\gamma^s} \right)$$

$$= \left( -\sum_{\kappa=0}^{N^i-1} \sum_{\theta=0}^{N^i-1} (H^{ii})_{\alpha\kappa}^{-1} \frac{\partial H^{ii}_{\kappa\theta}}{\partial u_\gamma^s} \frac{\partial w_\theta^j}{\partial u_\beta^r} \right) -$$

$$\left( \sum_{\kappa=0}^{N^i-1} (H^{ii})_{\alpha\kappa}^{-1} \sum_{\theta=0}^{N^i-1} \frac{\partial H^{ii}_{\kappa\theta}}{\partial u_\beta^r} \frac{\partial w_\theta^j}{\partial u_\gamma^s} \right) +$$

$$\sum_{\kappa=0}^{N^i-1} (H^{ii})_{\alpha\kappa}^{-1} \left( \frac{\partial^2 \tilde{G}_\kappa^i}{\partial u_\beta^r \partial u_\gamma^s} \right)$$

$$= -\sum_{\kappa=0}^{N^i-1} (H^{ii})_{\alpha\kappa}^{-1} \left\{ \sum_{\theta=0}^{N^i-1} \left( \frac{\partial H^{ii}_{\kappa\theta}}{\partial u_\gamma^s} \frac{\partial w_\theta^j}{\partial u_\beta^r} + \frac{\partial H^{ii}_{\kappa\theta}}{\partial u_\beta^r} \frac{\partial w_\theta^j}{\partial u_\gamma^s} \right) - \left( \frac{\partial^2 \tilde{G}_\kappa^i}{\partial u_\beta^r \partial u_\gamma^s} \right) \right\}$$

Therefore:

$$\frac{\partial \tilde{G}_\alpha^i}{\partial u_\beta^r} = \frac{\partial G_\alpha^i}{\partial u_\beta^r} - \sum_{\substack{j=0 \\ j \neq i}}^{n-1} \sum_{\gamma=0}^{N^j-1} \left( \frac{\partial H^{ij}_{\alpha\zeta}}{\partial u_\beta^r} w_\zeta^j + H^{ij}_{\alpha\zeta} \frac{\partial w_\zeta^j}{\partial u_\beta^r} \right)$$

and using the fact that the second derivatives of G and H with respect to u are 0:

$$\frac{\partial^2 \tilde{G}_\alpha^i}{\partial u_\beta^r \partial u_\gamma^s} = -\sum_{\substack{j=0 \\ j \neq i}}^{n-1} \sum_{\gamma=0}^{N^j-1} \left( \frac{\partial H_{\alpha\zeta}^{ij}}{\partial u_\beta^r} \frac{\partial w_\zeta^j}{\partial u_\gamma^s} + \frac{\partial H_{\alpha\zeta}^{ij}}{\partial u_\gamma^s} \frac{\partial w_\zeta^j}{\partial u_\beta^r} + H_{\alpha\zeta}^{ij} \frac{\partial^2 w_\zeta^j}{\partial u_\beta^r \partial u_\gamma^s} \right)$$

Finally:

$$\rho = \sum_{i=0}^{n-1} \sum_{\zeta=1-0}^{N^i-1} G_\zeta^i w_\zeta^i$$

and its derivatives are:

$$\frac{\partial \rho}{\partial u_\alpha^r} = \sum_{i=0}^{n-1} \sum_{\zeta=0}^{N^i-1} \frac{\partial G_\zeta^i}{\partial u_\alpha^r} w_\zeta^i + G_\zeta^i \frac{\partial^2 w_\zeta^j}{\partial u_\alpha^r}$$

$$\frac{\partial^2 \rho}{\partial u_\alpha^r \partial u_\beta^s} = \sum_{i=0}^{N-1} \sum_{\zeta=0}^{N^i-1} \frac{\partial G_\zeta^i}{\partial u_\alpha^r} \frac{\partial w_\zeta^i}{\partial u_\beta^s} + \frac{\partial G_\zeta^i}{\partial u_\alpha^s} \frac{\partial w_\zeta^i}{\partial u_\beta^r} + G_\zeta^i \frac{\partial^2 w_\zeta^i}{\partial u_\alpha^r \partial u_\beta^s}$$

The propagation of the costate variables is different from that of state and control variables, which are tightly coupled and proceed together forward in time. In contrast, the costate variables are propagated backwards in time, independently of the integration of the state and control variables. In order to do this, a database of values calculated in they module and u_and_r module is needed. Since the differential equation of p is linear in p, its solution can be approximated by an interpolation method rather by integration. For many applications the value of the vector p is almost constant with the exception of the transient around the convergence horizon. Also the matrix A in the equation for p does not depend on p.

To compute p, a set of the node values of y and u trajectories calculated by the y module and u_and_r module is created for use by the p module. The terminal conditions p(T) are computed first, and then earlier values of p are calculated in a loop which interpolates backwards to the beginning of the y computation.

$$\frac{dp}{d\tau} = AP$$

$$A = \frac{1}{\rho} \left( \frac{\partial w}{\partial y} \right)^T - \frac{1}{\rho^2} \frac{\partial \rho}{\partial y} w^T$$

For practicality, we divide the problem up into increments of size $\tau_{k-1} - \tau_k$ where $\tau_{k-1} < \tau_k$ where the matrix A is assumed to be nearly constant. Then, integrating backwards the solution at $\tau_{k-1}$ given $\tau_k$ is $$p(\tau_{k-1}) = \exp(A(\tau_{k-1} - \tau_k)) p(\tau_k)$$

The exponential of this equation is solved by the approximation $$\exp(A(\tau_{k-1} - \tau_k)) \cong \sum_{\zeta=0}^{N-1} \frac{A^\zeta (\tau_{k-1} - \tau_k)^\zeta}{\zeta!}$$

where N is the degree of the approximation.

Repair

So far, the discussion has focused on specific computational methods for generic optimization. However, an additionla aspect of real-world optimization concerns repeated optimization over real periods of time. For example, an enterprise, such as a manufacturing facility, may employ optimization techniques for optimizing all the various aspects of running the manufacturing plant, including sheduling of employees, ordering of parts and raw materials, distrubution of parts, raw materials, and intermediate manufactured articles within the manufacturing plant, and delivery of product to customers, among other things. In general, in the extremely high dimensional problem domains for such enterprise optimizations, and because of the many uncontrolled events and changes that arise during operation of a manufacturing plant, optimization may need to be carried out repeatedly, over time, in order to readjust the control of the manufacturing plant to respond to changing conditions. Similar considerations apply to many other computational tasks, in additio to optimization. for example, modelling of a complex system may require intermediate computation of system state in order to respond to various randomly-generated events and perturbations to the system, introduced so that the model reflects real time response of the system to a changing enviroment.

Figure 49:
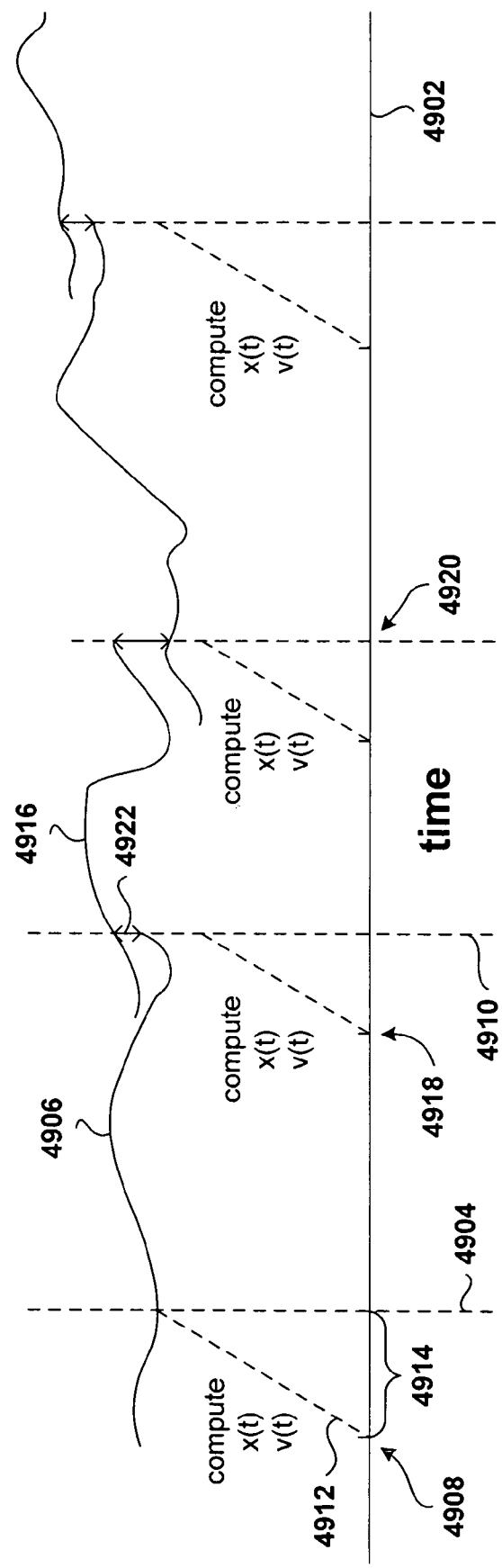
FIG. 49 shows successive state-function calculations by an optimization method for a control problem.

FIG. 49 illustrates this repeated optimization strategy. In FIG. 49, and in subsequent FIGS. 50 and 52–56, the horizontal axis 4902 corresponds to time. In FIG. 49, a near-optimal state function for a system, including state variables and control variables, is computed via optimization and/or modeling techniques, at each point in time represented in FIG. 49 by a vertical dashed line, such as vertical dashed line 4904. The computed state functions are represented in FIG. 49 as curved segments, such as curved segment 4906, that begins at a point in time 4908 at which computation of the state function begins ans extends to another point in time 4901. Of course, computed state fucntions are, in real-world applications, complex control trajectories in hyper-dimensional spaces, but two-dimensional control trajectories, such as curved segment 4906, are used for clarity of illustration. The diagonal, dashed lines, such as diagonal dash line 4912, represents the computation of the state function via integration with respect to a continuation iteration variable τ, described above, and takes some amount of time 4914 related to the computation horizon T for the optimization technique by which the state function is calculated. When a new state function is calculated, as, for example, new state function 4916 applicable to the range of time beginning at time 4918 and ending at time 4920, the new state function likely relatively closely overlaps, but does not coincide with the previous state function, in the present case state function 4906. Thus, there is a discrepancy 4922 or discontinuity between successively calculated state functions. This discontinuity arises from a change in conditions and environment of the system between the time the previous state function was calculated and the time that the current state function calculation began, in this case the events and changes that occur in time interval beginning at time 4908 and ending at time 4918.

Unfortunately, these discontinuities represent disturbances in the system. For example, in the manufacturing plant, a discontinuity may reflect a change in scheduling of workers, a change in departure times and destinations for delivery trucks, and other such changes. However, complex systems tend to have inertia, and major disturbances are difficult to overcome, may take finite amounts of time and resources to overcome that themselves change the environment of the system to a degree that the previously calculated optimal state function is no longer optimal, and may cause ripples and cascading effects that further perturb a complex system.

Figure 50:
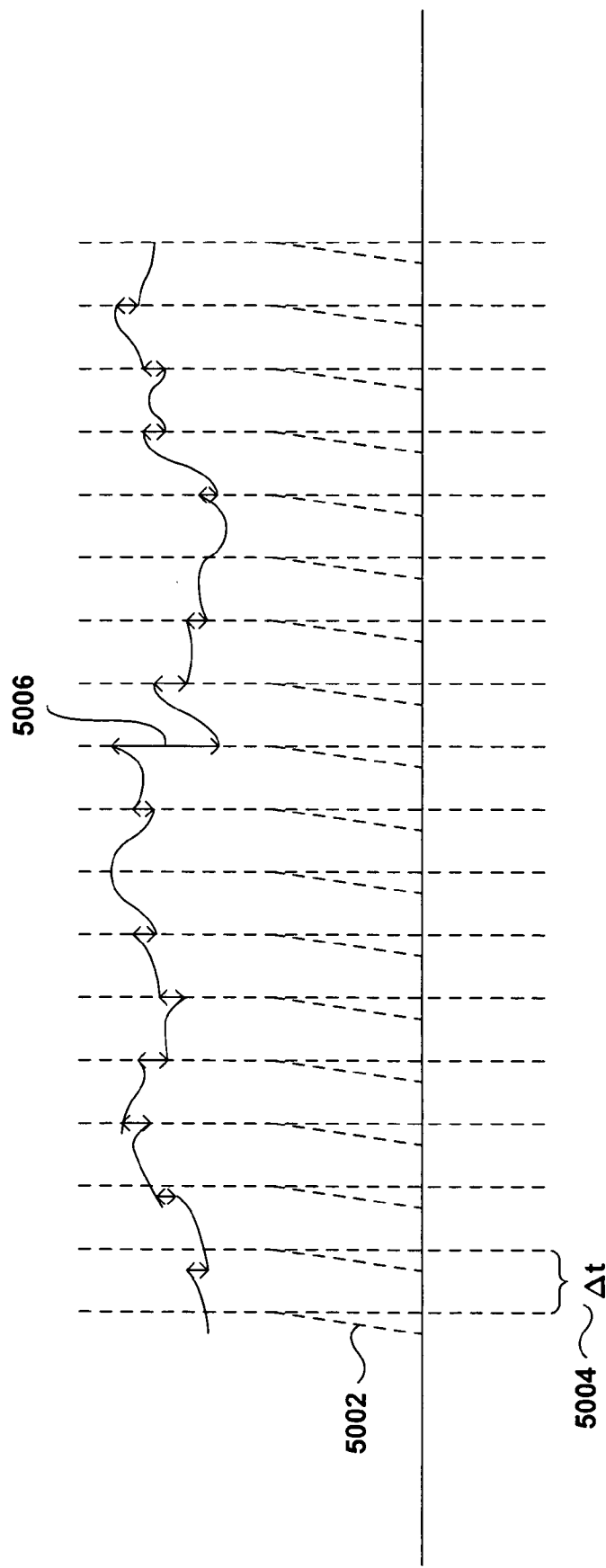
FIG. 50 illustrates a shortened interval between calculations of the state functions illustrated in FIG. 49.

One possible approach to ameliorating the discontinuities arising from repeated optimization is to shorten the time between optimizations. FIG. 50 illustrates a shortened interval between optimizations for the state function calculations illustrated in FIG. 49. By more efficiently computing the state functions, represented in FIG. 50 by increased slope of the dashed lines, such as dashed line 5002, representing state function calculation, the optimizations may be carried out in a shorter amount of time $\Delta T$ 5004. However, the effect of doing so increases the frequency of disturbance, and the increased frequency of disturbance may itself create rippling and cascading effects that eventually lead to greater and greater instabilities. In certain cases, even greater discrepancies, such as discrepancy 5006, may arise as a result of underdamping of the effects of the occurrence of certain kind of events in very short time intervals.

Figure 51:
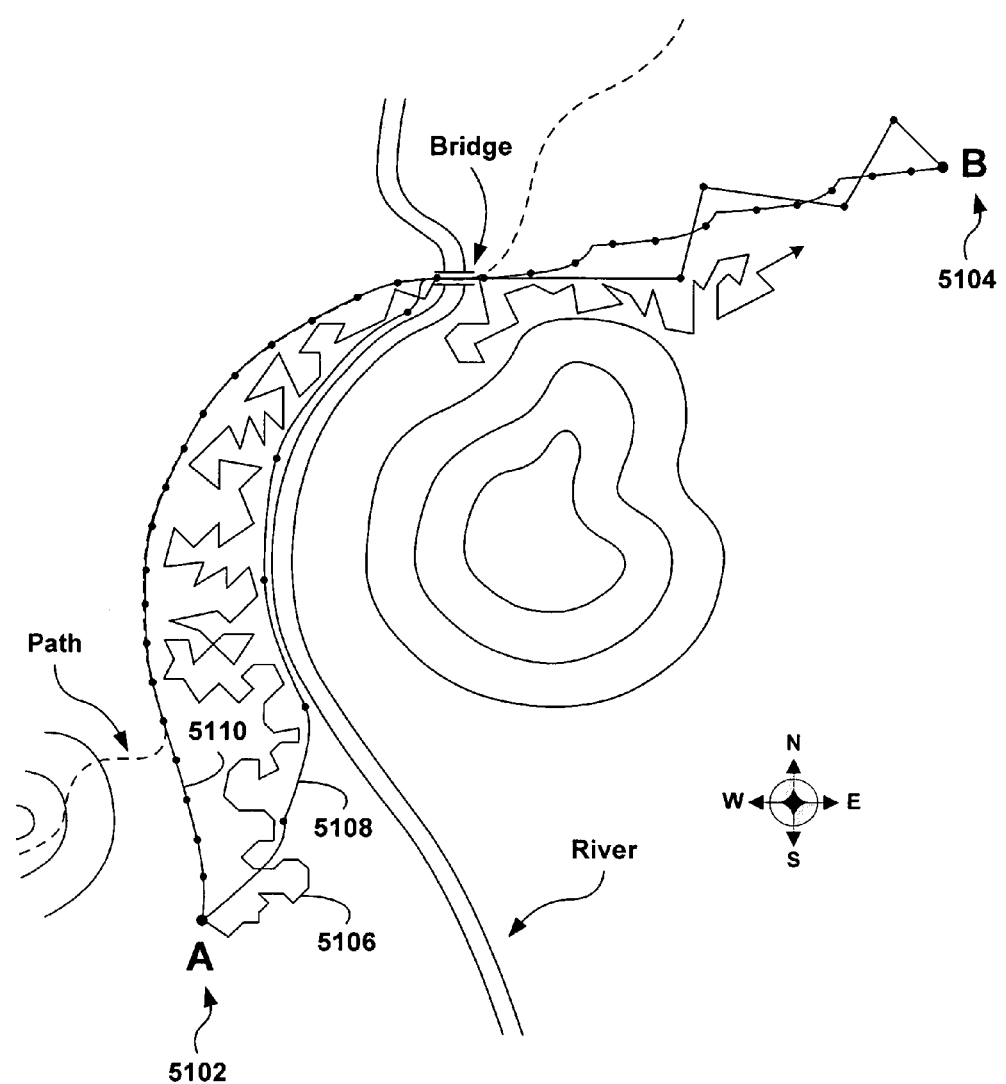
FIG. 51 illustrates an analogy for consequence arising from repeated, current-state-based optimizations.

FIG. 51 illustrates an analogy for a second consequence arising from repeated optimizations. Note that, in FIGS. 49–50, it is assumed that the state functions are calculated anew without regard for the previously calculated state functions, other than at the point where the previously calculated state function is abandoned and a new state function begins to control the system. However, failure to take into account the history of previous state function calculations may result in state function solutions that are exceedingly non-optimal over longer periods of time. As an analogy, consider the task of traversing terrain represented by a simple topographic map, in FIG. 51, from point A 5102 to point B 5104. A first path 5106 from point A towards point B represents a path that might be followed by an individual relying only on a compass, who frequently readjusts his or her trajectory based only on an instantaneous compass reading without even waiting for the compass needle motion to settle. Such a path represents an exceedingly non-optimal solution, in time and distance, for traversing the terrain between points A and B.

A second path 5108 is a path that might be taken by an individual who recognizes that the compass must be allowed to settle, before reading, who recognizes that a compass may be perturbed by local conditions, such as an outcropping of magnetite in a cliff face, and who recognizes that if an obstacle is encountered, it may be prudent to follow that obstacle rather than relying on the compass for direction. Obviously, the second path 5108 represents a far more efficient and effective strategy for traversing the terrain from point A to point B.

A third path 5110 represents a path taken by an individual capable of reading a topographic math, properly using a compass, who recognizes that a bridge across a river is a worthwhile intermediate point to aim for, and who recognizes that it is far easier to walk along a path through the forest than to attempt to blaze a new trail. In the analogy of FIG. 51, the individual who can rely on past information, rely on information in addition to a simple, limited current state, and who can project future solutions based on additional information is the individual who is most likely to find an optimal path between point A and point B. Returning to the repeated optimization problem illustrated in FIGS. 49–50, it is desirable to find a way to employ previously calculated state functions in order to employ more information over longer periods of time, rather than to simply consider local, instantaneous state information.

As a result of the considerations described above with reference to FIGS. 49–51, an approach to a more or less continuous optimization, over time, using historical information and updated projections, represents an additional feature of embodiments of the present invention directed towards optimization, referred to as a "repair-based continuous optimization approach" ("RCO").

Figure 52:
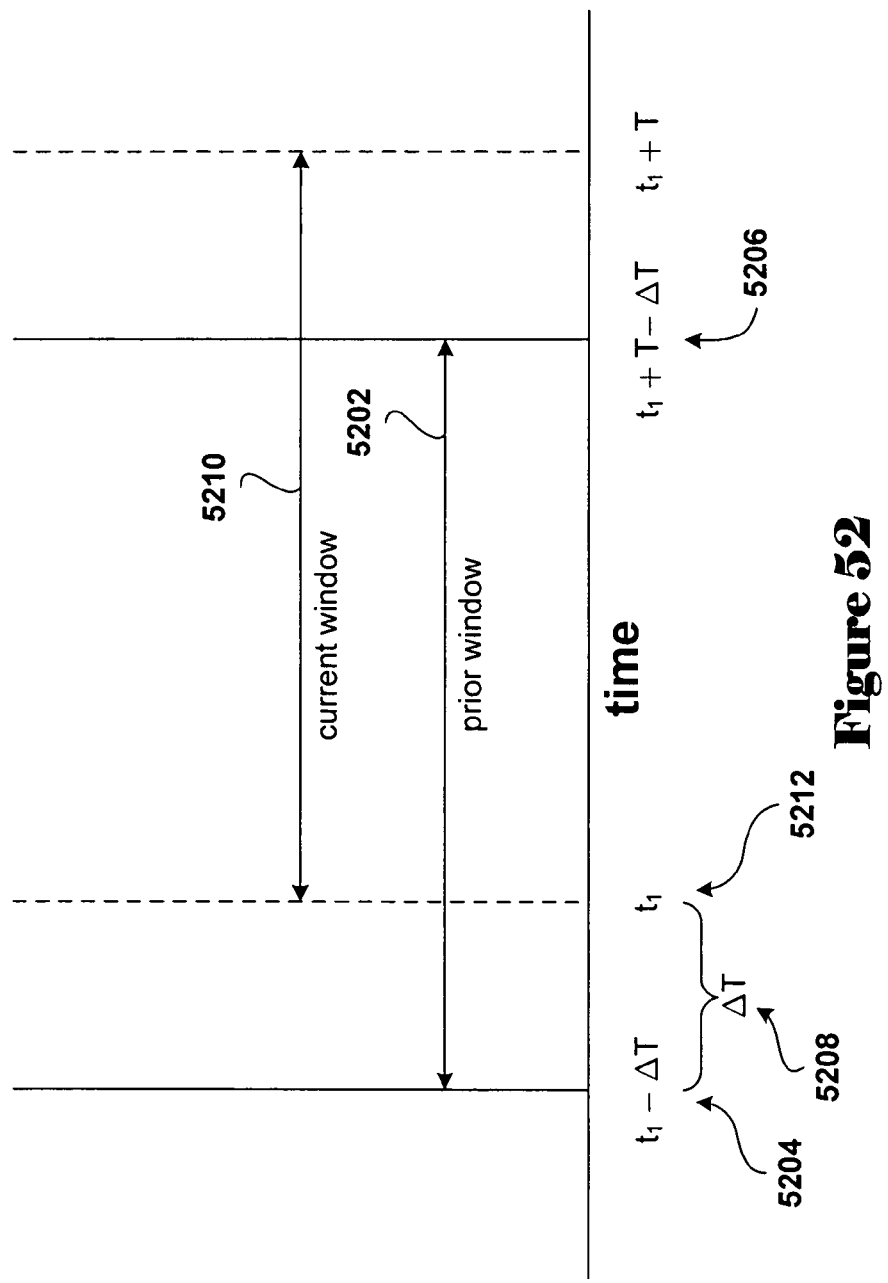
FIG. 52 illustrates the concept of a sliding window.

FIG. 52 illustrates the concept of a sliding window. As shown in FIG. 52, a prior window 5202 beginning at time $t1-\Delta T$ 5204 and ending at time $t1+T-\Delta\tau$ 5206, of time-length T, is used as a frame of reference for computing a state function. Since that time, an amount of time $\Delta T$ 5208 has elapsed. Therefore, a new, current window 5210 of length T in time provides the frame of reference at the current time $t_1$ 5212.

Figure 53:
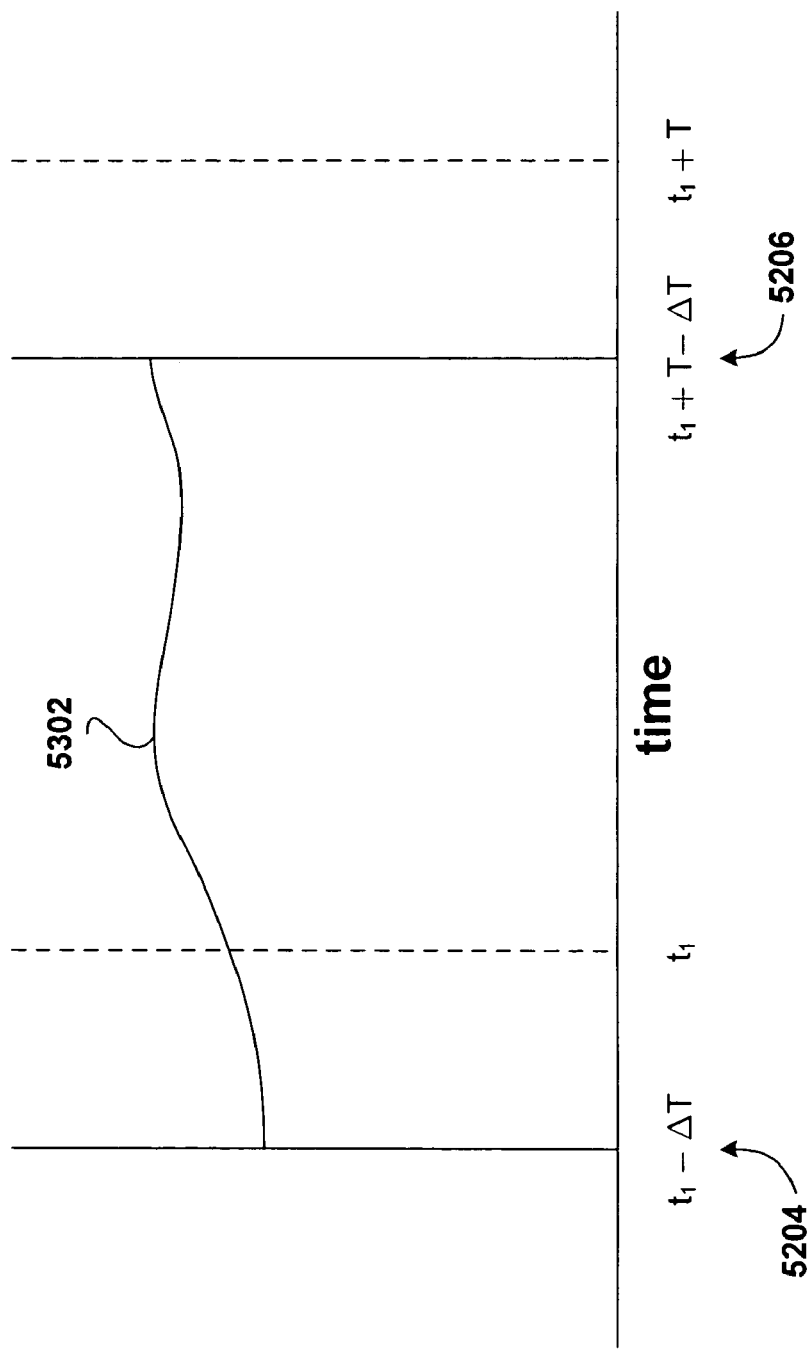
FIG. 53 illustrates a state function calculated in a prior window extends from time $T_1-\Delta T$ to time $T_T-\Delta T$.
Figure 54:
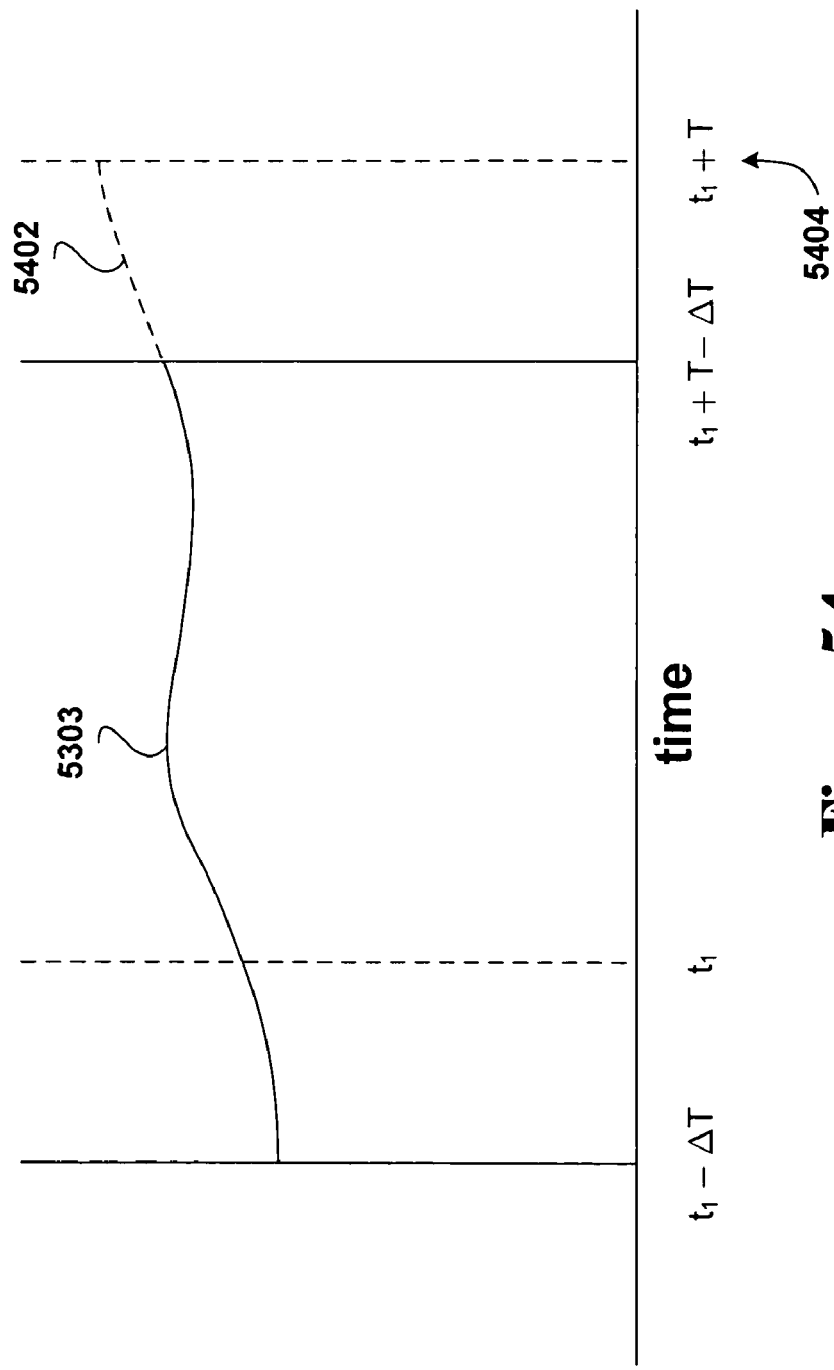
FIG. 54 illustrates extension of the previously calculated state function to extend over the time interval of the current window.
Figure 55:
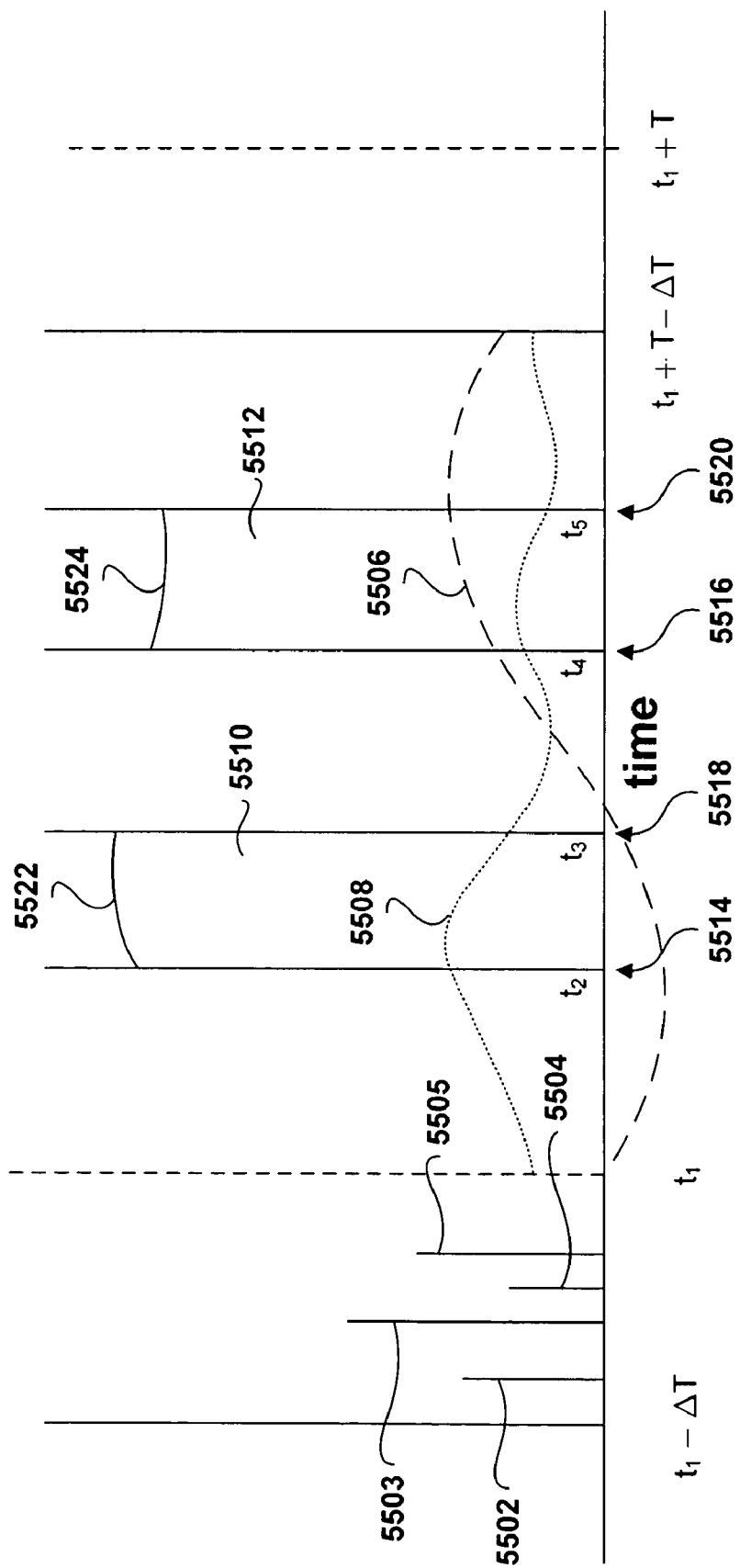
FIG. 55 illustrates consideration, at a current point in time, of past events and environmental changes that may result in a previously calculated state function being out-of-date, and not optimal, at the current point in time, as well as an approach to incorporating information from the previous state function in finding a new, optimal state function for the current frame of reference represented by the current window.

As shown in FIG. 53, the state function calculated in the prior window 5302 extends from time $t_1-\Delta T$ 5204 to time $t_1-\Delta T+T$ 5206. FIG. 54 illustrates extension of the previously calculated state function to extend over the current window. As shown in FIG. 54, the previously calculated state function 5303 is extended 5402 to the end of the current window at time $t_1+T$ 5404. FIG. 55 illustrates consideration, at the current point of time, of past events and environmental changes that may result in the previously calculated state function being out-of-date, and not optimal, at the current point of time, as well as an approach to incorporating information from the previous state function in finding a new, optimal state function for the current frame of reference represented by the current window.

In FIG. 55, vertical lines 5502–5505 represent events that occurred during the time of calculation of the state function, $t_1-\Delta T$, and the current time, $t_1$. Such events may alter the state and environment of the system in such a way that the previously calculated state function is no longer optimal. For example, in the manufacturing plant, a large number of employees may have decided to go on strike, or a flu virus may have greatly increased the number of workers unavailable for being scheduled to perform tasks within the manufacturing plant. Therefore, previously calculated optimal scheduling may be exceedingly suboptimal in the face of a shortage of workers. As shown in FIG. 55, various projections of time-dependent parameters on which the state function was calculated may have changed at time $t_1$. The change in these projections is represented by the dashed line 5506. For example, in the context of the manufacturing plant, a major customer may have indicated an immediate need for twice as many products as the customer normally buys, or the arrival of a new product produced by a competitor may suddenly dampen the demand for the products produced by the manufacturing plant. Thus, previously projected demand for products may not reflect the current and forecast demand.

In addition, priorities originally assigned to various considerations and parameters on which the state function is based may have changed. The dotted line 5508 in FIG. 55 indicates a change in priorities that has arisen for the current frame of reference with respect to a prior frame of reference. For example, at the time that the state function was calculated, there was no knowledge of an impending road closure on Thursday, announced during the time interval $t_1 - \Delta T$ to $t_1$. Knowledge of the road closure on Thursday may greatly increase the priority of scheduling south-side-resident workers for work at times when the bridge closure will least affect their commutes.

Also, in order to prevent serious disturbances to the operation of a system, the system may require that previously calculated state for the system needs to be adhered to, regardless of whether or not a newly calculated state function would provide for the same state over certain intervals. For example, in FIG. 55, two time windows 5510 and 5512, beginning at times $T_2$ and $T_4$ 5514 and 5516, respectively, and ending at times $T_3$ and $T_5$ 5518 and 5520, respectively, have been established, within which the old value of the state function 5522 and 5524 needs to be maintained in a newly computed state function. Thus, historical information obtained in the previous state-function calculation is maintained in the current frame of reference. Such fence intervals may be necessary to prevent undue disruption and disturbances in system control established based on the previously calculated state function.

Figure 56:
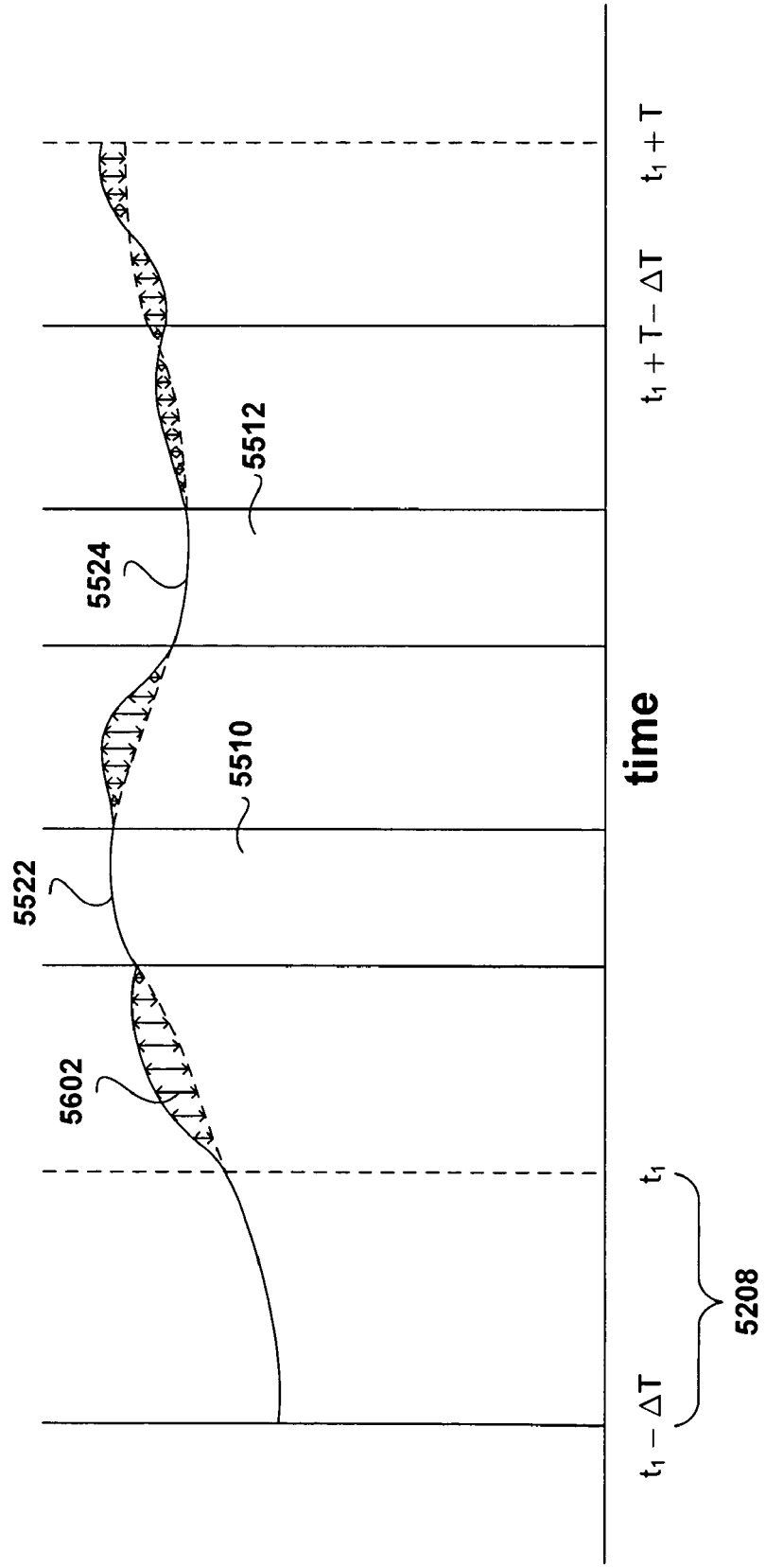
FIG. 56 shows repair of a previously calculated state function in order to provide a near optimal state function for a current time window.

Using the knowledge of events, knowledge of changes in circumstances and priorities, and the need for maintaining certain state previously calculated, the previously calculated and extended state function can be modified, without a de novo state function calculation, in order to produce a near-optimal state function for the current time window. FIG. 56 shows repair of the previously calculated state function in order to provide a near optimal state function for a current time window. As shown in FIG. 56, the repair of the previously calculated state function involves computing differences, such as difference 5602, at points in time within the current time window, between the previously calculated state function and a new, near optimal, repaired state function for the current time window. Computation of the differences, such as difference 5602, takes into account the occurrence of events in the prior interval of time $t1 - \Delta T$ 5208, changes in circumstances and priorities (5508 and 5506 in FIG. 55), and the need to maintain previously computed state 5522 and 5524 for particular intervals of time 5510 and 5512. Thus, the repair-based continuous optimization technique allows for a somewhat continuous recalculation of state functions without full reoptimization in a way that minimizes disturbance and disruption of system control and prevents discontinuities in control.

The following is a more formal description of the repair method that represents one embodiment of the present invention. The control optimization problem, solutions for which provide the control state functions that are repaired by the above-described repair method, are given by:

$$\min_{v(\tau)} \int_{t_1}^{t_1+T} \tilde{\phi}(x(t), v(t), d(t)) dt$$

subject to constraints:

$$x_i(t) - x_i(t_1) - \int_{t_1}^{t} \tilde{f}_i(x(\tau), v(\tau)) d\tau = 0$$

$$g(x(t), v(t)) \geq 0$$

$$v \in V$$

$$t \in [t_1, t_1 + T]$$

where V is a compact subset of $R^r$ and $d(t)$ is a driving function (e.g. deterministic or forecasted demand). $\tilde{\phi}$, $\{\tilde{f}_i, i=1,\ldots,n-1\}$, and $\{g_j, j=1,\ldots,m\}$ are sufficiently smooth. A scalar variable $x_n(t) \geq 0$ is introduced such that:

$$x_n(t) = \int_{t_1}^{t} \tilde{\phi}(x(\tau), v(\tau), d(\tau)) d\tau$$

$$x_n(t_1) = 0$$

The control optimization problem then becomes:

$$\min_{v(t)} x_n(t_1 + T)$$

subject to, for $t \in [t_1, t_1+T]$ $$x_i(t) - x_i(t_1) - \int_{t_1}^{t} f_i(x(\tau), v(\tau), d(\tau)) d\tau = 0$$

$$g_i(x(t), v(t)) \geq 0$$

$$v \in V$$

where:

$$f_i = \begin{cases} \tilde{f}_i(x(t), v(t)) & \text{for } i = 1, \ldots, n-1 \\ \tilde{\phi}(x(t), v(t), d(t)) & \text{for } i = n \end{cases}$$

The solution of this problem, $v^*(t)$, is called the "optimal control" and the corresponding trajectory, $x^*(t)$, is called the optimal trajectory. The above-described control state function (e.g. 4906 and 4916 in FIG. 49) is a combination of $x(t)$ and $v(t)$, $t \in [t_1, T)$.

A previously computed control state function, with respect to the conventions used in FIGS. 52–56, is a combination of:

$$v^{(t_1 - \Delta T)*}(t)$$

$$x^{(t_1 - \Delta T)*}(t)$$

The computed differences (e.g. 5602 in FIG. 56), called "the repair," are defined to be a combination of:

$$\delta x_i^{t_1}(t)$$

$$\delta v_k^{t_1}(t)$$

Fencing indicator functions specify whether t is in an interval in which no deviations are allowed in the repaired control state function with respect to each control state variable:

$$S_{x_i}^{t_1}(t) = \begin{cases} 0 & \text{if } t \text{ is in the "fenced" interval for } x_i \\ 1 & \text{otherwise} \end{cases}$$

$$S_{v_k}^{t_1}(t) = \begin{cases} 0 & \text{if } t \text{ is in the "fenced" interval for } v_k \\ 1 & \text{otherwise} \end{cases}$$

Assuming a finite number of fenced intervals in the interval $[t_1, t_1+T]$, then for (i=1, ..., n), where n is the dimension of the model, the incremental state trajectory $\delta x_i^{t_1}(t)$ is given by:

$$\delta x_i^{t_1}(t) = x_i^{t_1}(t_1) - x_i^{(t_1-\Delta T)^*}(t_1) - A_i^{t_1} +$$

$$S_{x_i}^{t_1}(t) \int_{t_1}^{t} \begin{bmatrix} \sum_{j=1}^{n} \frac{\partial f_i}{\partial x_j}((t_1-\Delta t)^*) S_{x_j}^{t_1}(\tau) \delta x_j^{t_1}(\tau) \\ + \sum_{k=1}^{r} \frac{\partial f_i}{\partial v_k}((t_1-\Delta t)^*) S_{v_k}^{t_1}(\tau) \delta v_k^{t_1}(\tau) \\ + \sum_{l=1}^{n} \frac{\partial f_i}{\partial d_l}((t_1-\Delta t)^*) \delta d_l^{t_1}(\tau) \end{bmatrix} d\tau$$

where the notation $(t_1-\Delta t)^*$ means that the partial derivatives are evaluated along the reference trajectory.

The set $\{[t_s^{i,a}, t_s^{i,b}], s=1, \ldots, M_i\}$ is the fenced time sub-intervals for state i=1, ..., n. All of the events $A_i^e \delta(t-t_e)$ that happen during the time interval $[t_1-\Delta T, t_1]$ are approximated with a single event $A_i^{t_1} \delta(t-t_1)$ at $t_1$ as follows:

$$\int_{t_1^-}^{t_1^+} e_i(\tau) d\tau = \int_{t_1^-}^{t_1^+} A_i^{t_1} \delta(\tau - t_1) d\tau = A_i^{t_1}$$

$\delta x_i^{t_1}(t_1) = x_i^{t_1}(t_1) - x_i^{(t_1-\Delta T)^*}(t_1) - A_i^{t_1}$ provides the initial conditions for $\delta x_i^{t_1}(t)$ Notice that $v^{(t-\Delta T)^*}(t)$ and $x^{(t_1-\Delta T)^*}(t)$ are defined on $[t_1-\Delta T, t_1+T-\Delta T]$. As discussed above, the control state function needs to be extended to the interval $[t_1, t_1+T]$. Assuming that the extension is due to a constant control, and not allowing fencing in the extension:

$$\delta x_i^{t_1}(t) =$$

$$\delta x_i^{t_1}(t_1+T-\Delta T) + \int_{t_1+T-\Delta T}^{t} \begin{bmatrix} \sum_{j=1}^{n} \frac{\partial f_i^{(t_1-\Delta T)^*}}{\partial x_j}(t_1+T-\Delta T) \delta x_j^{t_1}(\tau) \\ + \sum_{k=1}^{n} \frac{\partial f_i^{(t_1-\Delta T)^*}}{\partial v_k}(t_1+T-\Delta T) \delta \bar{v}_k^{t_1}(\tau) \\ + \sum_{l=1}^{n} \frac{\partial f_i^{(t_1-\Delta T)^*}}{\partial d_l}(t_1+T-\Delta T) \delta d_l(\tau) \end{bmatrix} d\tau$$

$t \in [t_1+T-\Delta T, t_1+T]$, i=1, ..., n where $\delta \bar{v}^{t_1}(t) = v(t_1+T) - v^*(t_1+T-\Delta T)^*$ The dynamics on interval $[t_1, t_1+T]$ then are given by:

$$\delta x_i^{t_1}(t) = \begin{cases} x_i^{t_1}(t_1) - x_i^{(t_1-\Delta T)^*}(t_1) - A_i^{t_1} \\ + S_{x_i}^{t_1}(t) \int_{t_1}^{t} \begin{bmatrix} \sum_{j=1}^{n} \frac{\partial f_i}{\partial x_j}((t_1-\Delta t)^*) S_{x_j}^{t_1}(\tau) \delta x_j^{t_1}(\tau) \\ + \sum_{k=1}^{r} \frac{\partial f_i}{\partial v_k}((t_1-\Delta t)^*) S_{v_k}^{t_1}(\tau) \delta v_k^{t_1}(\tau) \\ + \sum_{l=1}^{n} \frac{\partial f_i}{\partial d_l}((t_1-\Delta t)^*) \delta d_l^{t_1}(\tau) \end{bmatrix} d\tau, t \in [t_1, t_1+T-\Delta T] \\ \delta x_i^{t_1}(t_1+T-\Delta T) + \int_{t_1+T-\Delta T}^{t} \begin{bmatrix} \sum_{j=1}^{n} \frac{\partial f_i^{(t_1-\Delta T)^*}}{\partial x_j}(t_1+T-\Delta T) \delta x_j^{t_1}(\tau) \\ + \sum_{k=1}^{n} \frac{\partial f_i^{(t_1-\Delta T)^*}}{\partial v_k}(t_1+T-\Delta T) \delta \bar{v}_k^{t_1}(\tau) \\ + \sum_{l=1}^{n} \frac{\partial f_i^{(t_1-\Delta T)^*}}{\partial d_l}(t_1+T-\Delta T) \delta d_l(\tau) \end{bmatrix} d\tau, t \in [t_1+T, t_1+T] \end{cases}$$

Expressing min $_{v(t)}x_n(t_1+T)$ as $\Phi(x(t_1+T))$, expansion up to the second order gives:

$$\frac{1}{2}(\delta x(t_1+T))^T \Phi_{xx}(x(t_1+T))\delta x(t_1+T)$$

The goal of repair is to minimize the above criterion while minimizing the change with respect to a nominal trajectory. The combined criterion is:

$$\frac{1}{2}(\delta x^{t_1}(t_1+T))^T \Phi_{xx}(x(t_1+T))\delta x^{t_1}(t_1+T) +$$
$$\frac{1}{2}(\delta x^{t_1}(t))^T Q \delta x^{t_1}(t) + \frac{1}{2}(\delta v^{t_1}(t))^T R \delta v^{t_1}(t)$$

where Q and R are constant positive definite matrices specified by a user that define a balance between satisfaction of the enterprise criterion and minimizing change.

The constraints for the repair problem are:

$$g_j(x^{(t_1-\Delta T)*}(t)+\delta x^{t_1}(t), v^{(t_1-\Delta T)*}(t)+\delta v^{t_1}(t)) \geq 0, \quad j=1,\ldots,m$$

When expanded to the first order:

$$g_j(x^{(t_1-\Delta T)*}(t)+\delta x^{t_1}(t), v^{(t_1-\Delta T)*}(t)+\delta v^{t_1}(t)) \approx$$
$$g_j(x^{(t_1-\Delta T)*}(t), v^{(t_1-\Delta T)*}(t)) + \frac{\partial g_j}{\partial x}(x^{(t_1-\Delta T)*}(t), v^{(t_1-\Delta T)*}(t))\delta x^{t_1}(t) +$$
$$\frac{\partial g_j}{\partial v}(x^{(t_1-\Delta T)*}(t), v^{(t_1-\Delta T)*}(t))\delta v^{t_1}(t)$$

a.e., $j=1,\ldots,m$

In order to satisfy the constraint inequality, given that $$g_j(x^{(t_1-\Delta T)*}(t), v^{(t_1-\Delta T)*}(t)) \geq 0, j=1,\ldots,m$$

the second and third terms of the expanded constraint must satisfy $$\frac{\partial g_j}{\partial x}(x^{(t_1-\Delta T)*}(t), v^{(t_1-\Delta T)*}(t))\delta x^{t_1}(t) +$$
$$\frac{\partial g_j}{\partial v}(x^{(t_1-\Delta T)*}(t), v^{(t_1-\Delta T)*}(t))\delta v^{t_1}(t) \geq 0,$$

a.e., $j=1,\ldots,m$

Meta-Control and Heirarchical Process Construction

The discussion, up to this point, has focused on optimization and adjustment of controlling state functions generated by optimization methods at subsequent points in time. However, the present invention encompasses a far more general and powerful method for constructing complex, hierarchical computational systems and models, and for controlling general computation, whether simple or complex. An example of this general method for computational control has been presented above, when additional constraints are added to the original optimization problem in order to produce the meta-level, minimal-time-control-problem problem objective functional $\mathcal{J}$, and the Hamiltonian for the meta-level problem is minimized in order to generate a near-optimal control policy.

Figure 57:
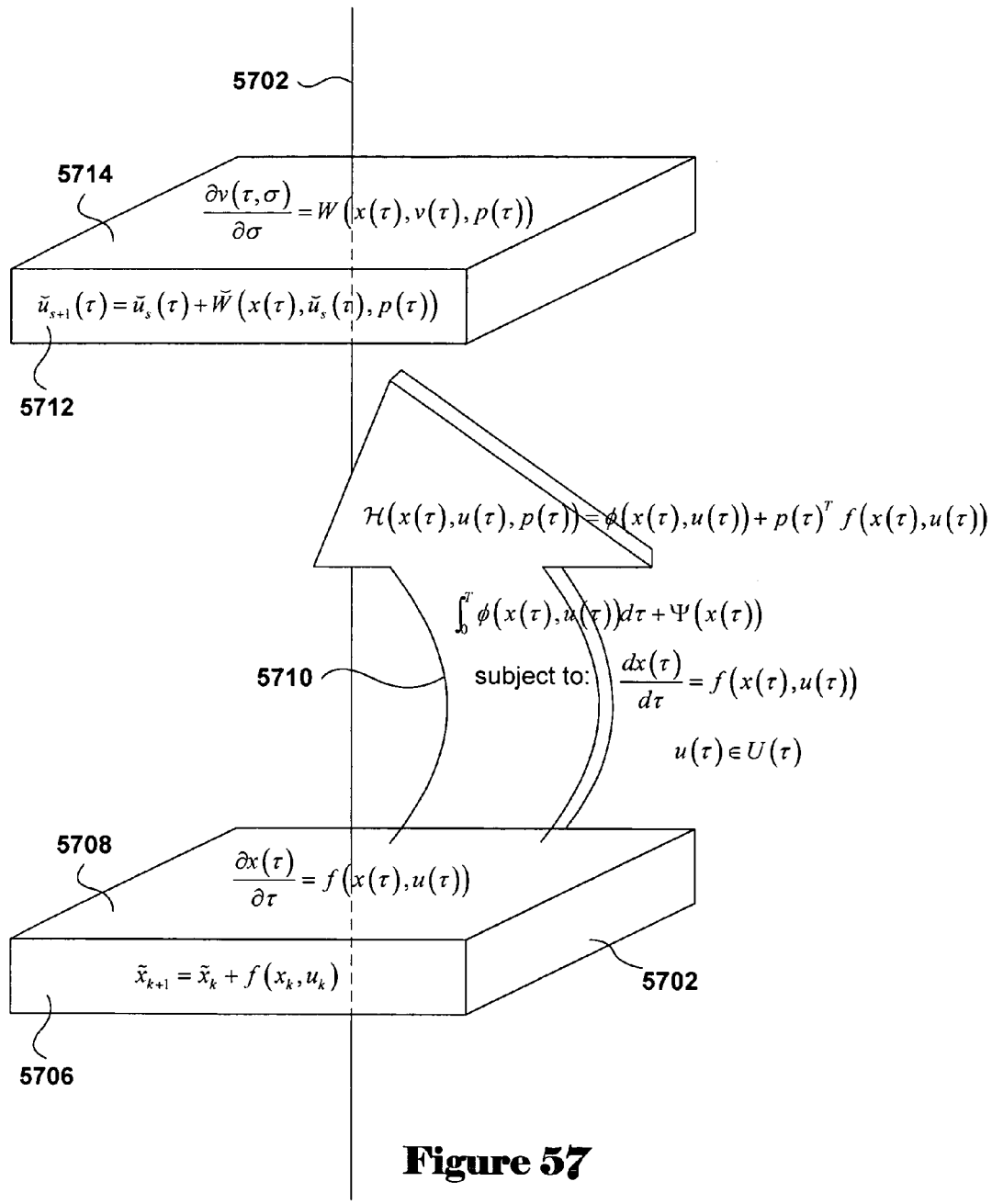
FIG. 57 illustrates a single level of meta-control of a computational process.

FIG. 57 illustrates a single level of meta-control of a computational process. In FIG. 57, a first computational problem, or computational model, 5702 appears at a lowest level along a meta-level axis 5704. The computational problem, or model, is discrete, and can be formally described by an iteration $\tilde{x}_{k+1} = \tilde{x}_k + \tilde{f}(x_k, u_k)$. As discussed above introducing the continuous-iteration-variable parameterization of the discrete computational problem, or model, the original computational problem can be viewed as continuous, in order to allow for powerful continuous mathematical methods to be applied in order to solve the problem. Thus, as shown in FIG. 57, the problem may be viewed as discrete, on one face 5706, and as continuous, $$\frac{dx(\tau)}{d(\tau)} = f(x(\tau), u(\tau)),$$

on another face 5708. The discrete-to-continuous transformation is an important enabling feature of the meta-control method. Using the continuous view of the problem, additional constraints may be added to form a new problem, such as the minimum-time control problem constructed in the above-described optimization problem. An important aspect of this ability to add constraints is that the newly added constraints are not limited or necessarily tied to the original problem. Again, in the above-described embodiment, the initial problem involves finding an optimal control solution for an optimization problem, but the added constraints relate to finding near-optimal control policies for steering the computation towards a time-efficient computation of the original optimization problem. Other types of constraints might be added. For example, one might wish to add meta-level constraints dealing with days of the week when optimizations should be performed, or constraints that steer the computation towards both time and memory-usage efficiencies. The added constraints thus represent a meta-level view superimposed on the original problem. The ability to add new constraints facilitates a hierarchical computational approach to solving problems, similar to the levels of conceptual design used in designing complex software—such as the well-known top-down approach to problem solving.

In FIG. 57, addition of constraints is shown as a first part of a transformation represented by the large arrow 5710. Notice that the entire original problem is carried forward into the new problem both within the constraints for the new problem and within the terms of the new objective function. Thus, the new problem includes the original problem, and solution of the original problem is a subset of the solution of the new problem. Thus, although at the meta-level, one can focus on new constraints and an entirely different view of the original problem, the original problem is encoded in the new problem. In a second part of the transformation, the Hamiltonian is used in order provide an expression for determining a discrete computational method for computing a meta-control policy. The discrete meta-control policy expression 5712 can itself be viewed as a continuous problem 5714 with introduction of a new continuous iteration variable σ.

Figure 58:
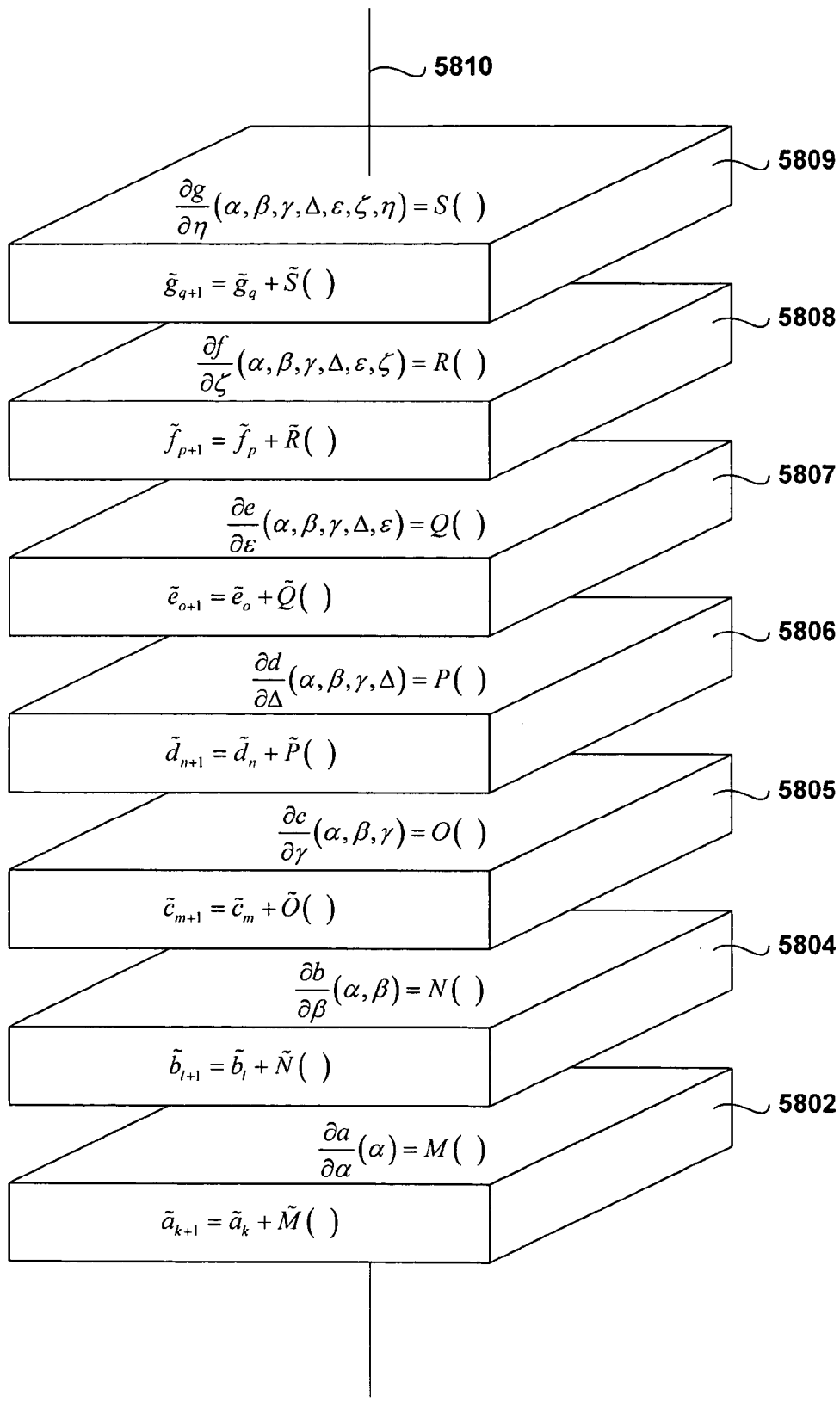
FIG. 58 illustrates multiple levels of meta-control and/or hierarchical construction of a complex computational process.

FIG. 58 illustrates multiple levels of meta-control and/or hierarchical construction of a complex computational process. As shown in FIG. 58, repeated meta-level transformations may lead from an original, discrete problem 5802 through an arbitrary number of meta-level problems along a meta-level axis 5810. As described above, each new meta-level allows for addition of new constrains and creation of new problems, while carrying forward the original problem and all lower meta-levels into the higher-level meta levels. As an example, consider a computational modeling problem of modeling a living cell, a current area of much interest in the scientific community. The cell may be viewed hierarchically as a large number of conceptual levels, beginning with a molecular level governed by quantum mechanics and statistical mechanics, and ascending through supermolecular complexes, macromolecular structures and compartments, organelles, genetic control, environmental influences, and myriad other conceptual levels, each viewed in a different way and as being driven by different kinds of forces and principles. However, each level contributes to the whole of the cell, and the effects of molecular-level events and conditions may profoundly influence higher conceptual levels. For example, spontaneous conversion of a particular nucleic-acid base to a different nucleic acid base within a chromosome may lead to an altered gene that, in turn, may lead to an altered gene product that is a component of a crucial organizing structure or temporal control mechanism that, in turn, may severely impact the viability of the entire cell. Moreover, various portions of the problems at each level may be naturally expressed in integer, Boolean, or other types of variables, while other portions of the problems may be defined in terms of continuous variables.

The methods of the present invention are applicable to developing a complex computational model for a system such as a living cell or a real-time distributed operating system. The methods discussed above for transforming non-real variables to real-number variables and then to floating point variables provides a way to incorporate the natural expression of different sub-problems into an all-floating-point problem space to which the methods of the present invention may be applied. The ability to define different meta-level views of the cell-modeling problem, while carrying forward the lower-level views, allows for a hierarchical modeling that preserves the full complexity of lower-level views without requiring the lower-level views to be explicitly revisited at higher meta-levels.

More formally, assume that an iteration algorithm is provided as follows:

$$\tilde{x}_{k+1} = \tilde{x}_k + \tilde{f}(x_k, u_k)$$

where $u_k$ are control variables and $x_k$ are decision variables. The algorithm converges to $$\lim_{k \to \infty} x_k = \bar{x}$$

The specifics of the algorithm are encoded in the function $\tilde{f}$ and the parameters $u_k$.

In a continualization procedure, the iteration is converted to a controlled differential equation in terms of $x(\tau)$ and $u(\tau)$ such that $$\lim_{k \to \infty} x(\tau) \approx \bar{x} = \lim_{k \to \infty} x_k.$$

The variable $\tau$ is a continuous iteration variable corresponding to the discrete iteration variable k.

The differential equation is of the form:

$$\frac{dx(\tau)}{d\tau} = f(x(\tau), u(\tau))$$

for all $u(\cdot) \in U(\cdot)$, where $U(\cdot)$ is the set of feasible parameter values.

The optimal control problem is formulated as follows:

$$\underset{u(r), T}{\text{minimize}} \int_0^T \phi(x(\tau), u(\tau)) d\tau + \Psi(x(\tau))$$

$$\text{subject to } \frac{dx(\tau)}{d\tau} = f(x(\tau), u(\tau))$$

$$u(\tau) \in U(\tau)$$

The functions $\phi$ and $\Psi$ are chosen by the algorithm designer in order to achieve meta objectives.

Using the minimum principle of Pontryagin, and with the Hamiltonian given by $$H(x(\tau), u(\tau), p(\tau)) = \phi(x(r), u(\tau)) + p(\tau)^T f(x(\tau), u(\tau))$$

where $p(\tau)$ is the costate, the necessary conditions for $x^*(\tau)$, $u^*(\tau)$, $\in [0, T)$ to be optimal are:

$$\frac{dx^*(\tau)}{d\tau} = \left( \frac{\partial H(x^*(\tau), u^*(\tau), p(\tau))}{\partial p} \right)$$

$$\frac{dp(\tau)}{d\tau} = -\left( \frac{\partial H(x^*(\tau), u^*(\tau), p(\tau))}{\partial x} \right)^T$$

$$p(T) = \frac{\partial \Psi(x(T))}{\partial x}$$

$$x^*(0) = x_0$$

$$u^*(\tau) \in U(\tau)$$

where the Hamiltonian has an absolute minimum as a function of u at $u^*(r)$:

$$H(x^*(\tau), u^*(\tau), p(\tau)) \leq H(x^*(\tau), u(\tau), p(\tau)), \forall u^*(\tau) \in U(\tau), \tau \in [0, T)$$

A convergence sequence $\{\hat{u}_s(\tau)\}$ is generated by:

$$\hat{u}_{s+1}(\tau) = \hat{u}_s(\tau) + \hat{W}(x(\tau), \hat{u}_s(\tau), p_{(\tau)})$$

such that $$\lim_{s \to \infty} \check{u}_s(\tau) = u^*(\tau), \text{ when } x(\tau) = x^*(\tau), \tau \in [0, T)$$

The above convergence sequence generation expression is analogous to the original iteration algorithm $$\tilde{x}_{k+1} = \tilde{x}_k + \tilde{f}(x_k, u_k)$$

where $\hat{u}_s(\tau)$ is analogous to $\tilde{x}_k$.

Using the continualization procedure described above with σ being a continuous parameterization of s, one obtains:

$$\frac{\partial v(\tau, \sigma)}{\partial \sigma} = W(x(\tau), v(\tau), p(\tau))$$

where $v(\tau, \sigma)$ is a continulaized version of $\hat{u}_s(\tau)$ and $W(x(\tau), v(\tau), p(\tau))$ is a continualized version of $\hat{W}(x(\tau), \hat{u}_s(\tau), p(\tau))$.

To summarize:

$$\frac{\partial v(\varepsilon, G)}{\partial G} = w(x(\tau), v(\tau), p(\tau))$$

$$\frac{\partial p(\tau)}{\partial \tau} = -\left(\frac{\partial H(x(\tau), u(\tau), p(\tau))}{\partial x}\right)^T$$

$$\frac{\partial v(\tau, \sigma)}{\partial \sigma} = W(x(\tau), v(\tau), p(\tau))$$

with $p(T) = \frac{\partial \Psi(x(T))}{\partial x}$ and $x(0)$ given

Although the present invention has been described in terms of a particular embodiment, it is not intended that the invention be limited to this embodiment. Modifications within the spirit of the invention will be apparent to those skilled in the art. For example, an almost limitless number of different implementations using different operating-system platforms, programming languages, data structures, control structures, and other such variations are possible.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

The invention claimed is:

1. A method for computationally modeling a complex, hierarchical problem with n hierarchical levels, the method comprising:
    encoding a first, discrete problem in a computer readable form to represent a first level of the hierarchical problem;
    parameterizing the first discrete problem using a continuous iteration variable to produce a next, continuous problem encoded in a computer readable medium;
    for each subsequent level of the remaining n−1 levels of the hierarchical problem,
    adding additional constraints to the next continuous problem to produce a next discrete problem; and
    parameterizing the next discrete problem using a continuous iteration variable to produce a next, continuous problem encoded in a computer readable medium.

* * * * *